(12) United States Patent
Earle et al.

(10) Patent No.: US 10,988,207 B1
(45) Date of Patent: Apr. 27, 2021

(54) BICYCLE GEARBOX HAVING SEGMENTED SPROCKETS

(71) Applicant: Praxis Works LLC, Santa Cruz, CA (US)

(72) Inventors: David M. Earle, Santa Cruz, CA (US); William A. Hilgenberg, Ben Lomond, CA (US); David Allen, Santa Cruz, CA (US); Kyle Bennett, Santa Cruz, CA (US); Ryan Kent Miller, Santa Cruz, CA (US)

(73) Assignee: Praxis Works LLC, Santa Cruz, CA (US)

( * ) Notice: Subject to any disclaimer, the term of this patent is extended or adjusted under 35 U.S.C. 154(b) by 0 days.

(21) Appl. No.: 17/152,483

(22) Filed: Jan. 19, 2021

Related U.S. Application Data

(63) Continuation-in-part of application No. 16/998,010, filed on Aug. 20, 2020, which is a continuation-in-part of application No. 16/792,050, filed on Feb. 14, 2020.

(60) Provisional application No. 63/067,911, filed on Aug. 20, 2020, provisional application No. 62/963,064, filed on Jan. 19, 2020, provisional application No. 62/963,063, filed on Jan. 19, 2020, provisional application No. 62/805,746, filed on Feb. 14, 2019.

(51) Int. Cl.
*B62M 9/136* (2010.01)
*B62M 25/08* (2006.01)
*B62M 9/1342* (2010.01)

(52) U.S. Cl.
CPC .......... *B62M 9/136* (2013.01); *B62M 9/1342* (2013.01); *B62M 25/08* (2013.01)

(58) Field of Classification Search
CPC . B62M 1/36; B62M 9/14; F16H 55/54; F16H 55/56; F16H 9/24
USPC .......................... 474/47, 48, 52, 53, 54, 57
See application file for complete search history.

(56) References Cited

U.S. PATENT DOCUMENTS

| | | | | |
|---|---|---|---|---|
| 519,781 | A * | 5/1894 | Timm | F16H 55/54 474/47 |
| 593,932 | A * | 11/1897 | Golding | F16H 55/54 474/47 |
| 601,990 | A * | 4/1898 | Suter | F16H 55/54 474/47 |
| 1,662,037 | A * | 3/1928 | Wichtendahl | F16H 9/24 474/53 |
| 2,782,649 | A * | 2/1957 | Shortland | F16H 9/10 474/47 |
| 2,827,795 | A * | 3/1958 | Caballeros | F16H 9/24 474/9 |

(Continued)

*Primary Examiner* — Henry Y Liu
(74) *Attorney, Agent, or Firm* — Kolitch Romano LLP

(57) ABSTRACT

A gearbox may include a drive spindle and several interconnected gear clusters arranged in a housing. A first of the gear clusters is coaxially fastened to the spindle, and has an outboard gear and an inboard gear. The first gear cluster drives a belt or chain to operate one or more of the other gear clusters, and the inboard gear is physically divided into a plurality of segments. A shifting system for the gearbox includes an actuator configured to urge the segments of the inboard gear of the first gear cluster into and out of the plane of the belt or chain via a toggle and slider mechanism, such that a gear ratio of the gearbox is changeable without displacing the belt or chain out of the plane.

20 Claims, 46 Drawing Sheets

(56) References Cited

U.S. PATENT DOCUMENTS

| | | | | |
|---|---|---|---|---|
| 3,769,848 A * | 11/1973 | McGuire | B62M 9/14 474/70 |
| 3,800,613 A * | 4/1974 | Clark | F16H 9/24 474/54 |
| 3,861,227 A * | 1/1975 | Hunt | B62M 9/08 474/47 |
| 4,127,038 A * | 11/1978 | Browning | B62M 9/10 280/236 |
| 4,457,739 A * | 7/1984 | Iseman | B62M 9/08 474/49 |
| 4,580,997 A * | 4/1986 | Browning | B62M 9/14 474/160 |
| 4,592,738 A * | 6/1986 | Nagano | B62M 9/14 474/162 |
| 4,713,042 A * | 12/1987 | Imhoff | B62M 9/14 474/69 |
| 5,073,152 A * | 12/1991 | Browning | B62M 9/14 474/162 |
| 5,152,720 A * | 10/1992 | Browning | B62M 9/1242 474/80 |
| 5,205,794 A * | 4/1993 | Browning | B62M 9/14 474/160 |
| 5,354,243 A * | 10/1994 | Kriek | B62M 9/14 474/135 |
| 5,443,423 A * | 8/1995 | Ha | F16H 55/52 474/47 |
| 5,637,046 A * | 6/1997 | Ha | F16H 9/10 474/53 |
| 5,984,814 A * | 11/1999 | Davenport | B62M 9/08 474/50 |
| 6,173,982 B1 * | 1/2001 | Westergard | B62M 9/085 280/261 |
| 6,267,699 B1 * | 7/2001 | Gruich | F16H 55/52 474/49 |
| 8,257,209 B1 * | 9/2012 | Lane | B62M 9/08 474/53 |
| 8,753,236 B2 * | 6/2014 | Wong | F16H 55/54 474/47 |
| 9,447,852 B2 * | 9/2016 | Williams | B62M 9/04 |
| 9,499,233 B2 * | 11/2016 | Schuster | B62M 9/06 |
| 9,816,598 B2 * | 11/2017 | Wong | F16H 9/06 |
| 10,259,532 B2 * | 4/2019 | Schuster | F16H 55/54 |
| 2002/0084618 A1 * | 7/2002 | Lerman | B62M 1/36 280/261 |
| 2005/0215367 A1 * | 9/2005 | Thomasberg | B62M 9/14 474/78 |
| 2006/0068956 A1 * | 3/2006 | Matsumoto | B62M 9/14 474/80 |
| 2009/0124440 A1 * | 5/2009 | Milne | B62M 9/14 474/80 |
| 2013/0267362 A1 * | 10/2013 | Gheciu | B62M 9/08 474/80 |
| 2014/0248982 A1 * | 9/2014 | Schuster | B62M 9/14 474/69 |
| 2014/0323253 A1 * | 10/2014 | Williams | B62M 9/04 474/69 |
| 2016/0257373 A1 * | 9/2016 | Emura | B62M 6/50 |
| 2017/0233037 A1 * | 8/2017 | Hara | B62M 9/10 474/78 |
| 2017/0283006 A1 * | 10/2017 | Schuster | B62M 9/14 |
| 2018/0290713 A1 * | 10/2018 | Tetsuka | B62M 9/12 |
| 2019/0135376 A1 * | 5/2019 | Kakinoki | B62M 9/122 |

* cited by examiner

BICYCLE GEARBOX HAVING SEGMENTED SPROCKETS

CROSS-REFERENCES

The following applications and materials are incorporated herein, in their entireties, for all purposes: U.S. patent application Ser. No. 16/792,050, filed Feb. 14, 2020; U.S. patent application Ser. No. 16/998,010, filed Aug. 20, 2020; U.S. Provisional Patent Application Ser. No. 62/963,064, filed Jan. 19, 2020; and U.S. Provisional Patent Application Ser. No. 63/067,911, filed Aug. 20, 2020.

FIELD

This disclosure relates to systems and methods for shifting gears on a bicycle or other geared vehicle. More specifically, this disclosure relates to gearboxes.

INTRODUCTION

A bicycle drivetrain transmits power from a rider of a bicycle to the bicycle's wheels. The drivetrain typically includes two pedals attached to respective crankarms on opposing sides of the bicycle frame. The pedals are rotationally coupled to a gearing system, which typically has a plurality of different gear ratios and a mechanism for shifting gears to effect a desired gear ratio. On a bicycle having a gearbox, the gearing system is at least partially enclosed in a gearbox disposed on and/or incorporated into the bicycle frame. An advantage of the gearbox is that the gearing system within the box may be protected from exposure to dirt and moisture, as well as from damaging impacts. Another advantage is that the gearbox is suitable for mounting on the bicycle frame adjacent the crankarms, where the weight of the gearbox has a lower impact on bicycle handling than it typically would if the gearbox were mounted elsewhere (e.g., further from the bicycle center of gravity). Accordingly, further advancements in bicycle gearbox technology are desirable.

SUMMARY

The present disclosure provides systems, apparatuses, and methods relating to bicycle gearboxes having segmented sprockets.

In some examples, a vehicle drivetrain includes a rotatable gear coupled to a continuous chain or belt defining a plane, the gear divided into a plurality of pivotable segments, such that an outer edge of each of the pivotable segments is transitionable into and out of the plane; a plurality of segment actuators, each of the segment actuators rotatable with and coupled to a respective one of the pivotable segments; a linear actuator coupled to a toggle, wherein the linear actuator is configured to transition the toggle between: (a) a first position, in which a first ramped face of the toggle is disposed in a path of the segment actuator of each segment when the segment is out of the plane of the chain or belt, such that rotating the segment actuator into the first ramped face urges the segment into the plane, and (b) a second position, in which a second ramped face of the toggle is disposed in the path of the segment actuator when the segment is in the plane of the chain or belt, such that rotating the segment actuator into the second ramped face urges the segment out of the plane.

In some examples, a gearbox for a vehicle includes: a drive spindle; a first gear cluster coaxially fastened to the spindle such that the first gear cluster rotates with the spindle, wherein an inboard gear of the first gear cluster includes a plurality of pivotable inboard segments, each of which is coupled to a respective actuator; a second gear cluster having one or more gears coaxially fastened to a layshaft spaced from and parallel to the spindle, such that the layshaft rotates with the second gear cluster; a continuous first belt or chain coupling the first gear cluster to the second gear cluster, such that the first gear cluster drives the second gear cluster and the first belt or chain defines a first plane, wherein the segments of the inboard gear of the first gear cluster are each pivotable into and out of the first plane; a third gear cluster having one or more gears coaxially fastened to the layshaft and spaced from the second gear cluster, such that the third gear cluster rotates with the layshaft; a fourth gear cluster having one or more gears coupled to a sleeve coaxially mounted over the spindle such that the sleeve rotates independently of the spindle; a continuous second belt or chain coupling the third gear cluster to the second gear cluster, such that the third gear cluster drives the fourth gear cluster and the second belt or chain defines a second plane parallel to the first plane; a chainring fastened to the sleeve, such that the chainring rotates with the fourth gear cluster; and a shifting system including a first shifting toggle transitionable between: (a) a first position, in which a first ramped face of the toggle is disposed in a path of the actuator of each segment of the inboard gear of the first gear cluster when the segment is out of the first plane, such that rotating the actuator into the first ramped face is configured to urge the segment into the first plane, and (b) a second position, in which a second ramped face of the toggle is disposed in the path of the actuator of each segment of the inboard gear of the first gear cluster when the segment is in the first plane such that rotating the actuator into the second ramped face is configured to urge the segment out of the first plane.

In some examples, a gearbox for a vehicle includes: a drive spindle; a first gear cluster coaxially fastened to the spindle such that the first gear cluster rotates with the spindle, the first gear cluster including an outboard gear and an inboard gear, wherein the inboard gear is physically divided into a plurality of segments; a second gear cluster having one or more gears coaxially fastened to a layshaft spaced from and parallel to the spindle, such that the layshaft rotates with the second gear cluster; a continuous first belt or chain coupling the first gear cluster to the second gear cluster, such that the first gear cluster drives the second gear cluster and the first belt or chain defines a first plane, wherein the segments of the inboard gear of the first gear cluster are each movable into and out of the first plane; a third gear cluster having one or more gears coaxially fastened to the layshaft and spaced from the second gear cluster, such that the third gear cluster rotates with the layshaft; a fourth gear cluster having one or more gears coupled to a sleeve coaxially mounted over the spindle such that the sleeve rotates independently of the spindle; a continuous second belt or chain coupling the third gear cluster to the second gear cluster, such that the third gear cluster drives the fourth gear cluster; a chainring fastened to the sleeve, such that the chainring rotates with the fourth gear cluster; and a shifting system including a pivoting toggle configured to interact with a segment actuator of each of the segments of the inboard gear of the first gear cluster, selectively transitioning each of the segments of the inboard gear of the first gear cluster into and out of the first plane, such that a gear ratio of the gearbox is changeable without displacing the first belt or chain out of the first plane.

Features, functions, and advantages may be achieved independently in various embodiments of the present disclosure, or may be combined in yet other embodiments, further details of which can be seen with reference to the following description and drawings.

DETAILED DESCRIPTION

Figure 1:
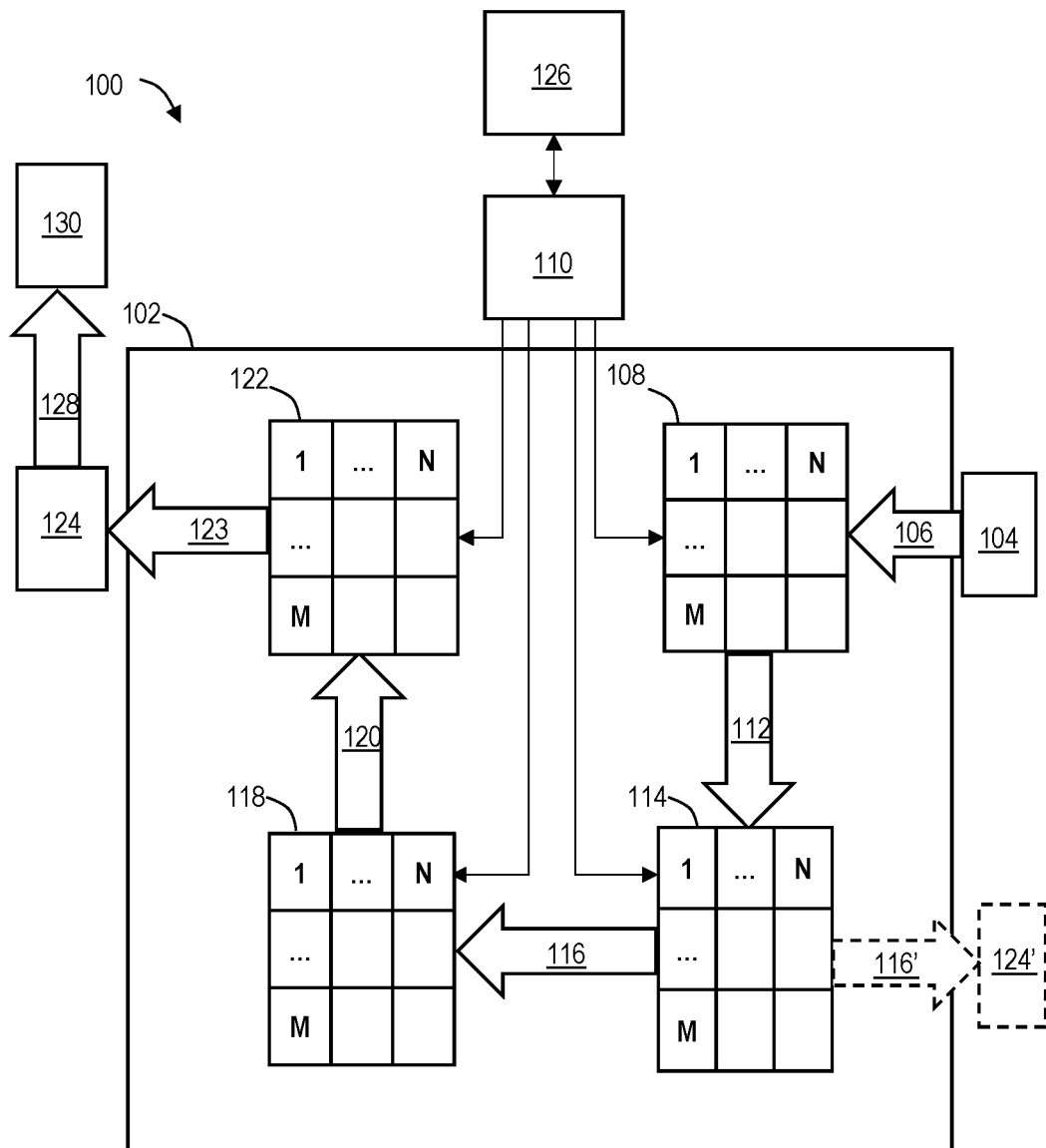
FIG. 1 is a schematic view of an illustrative gearbox in accordance with aspects of the present disclosure.

Various aspects and examples of a gearbox having segmented sprocket clusters and a corresponding shifting system, as well as related methods, are described below and illustrated in the associated drawings. Unless otherwise specified, a gearbox in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," and "aft" (and the like) are intended to be understood in the context of a host vehicle, such as a bicycle, on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a component may have a "forward" edge, based on the fact that the component would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a gearbox in accordance with aspects of the present teachings includes gear clusters (AKA cogsets, cassettes, and/or sprocket clusters) coupled by one or more chains and/or belts and at least partially contained within a housing, wherein one or more of the gear clusters has a segmented sprocket. A shifter is configured to move the sprocket segments relative to a plane defined by a chain or belt associated with that sprocket. The housing may be mounted on and/or integral with a bicycle or other suitable vehicle. Each gear cluster includes at least one sprocket, also referred to as a gear. At least one of the gear clusters is mounted on a spindle (AKA an axle or a shaft) coupled at either end to bicycle crankarms (AKA cranks) and/or a drive motor, and at least one other of the gear clusters is mounted on a layshaft. Chains, belts, and/or any other suitable coupling device couple a gear cluster on the spindle to a gear cluster on the layshaft, such that rotation of one of the gear clusters causes rotation of the other gear cluster. Each chain or belt may selectively engage individual sprockets in a cluster. The combination of sprockets coupled to each chain or belt at a given moment determines the current gear ratio of the gearbox.

Shifting gear ratios of the gearbox may include sequential displacement of the segments of a selected segmented gear, such that the chain or belt is shifted onto a different sprocket or gear of the gear cluster without displacing the chain or belt in a lateral direction. Repositioning of the gear segments is performed at a respective time when each segment is unloaded (i.e., free of the chain/belt), such that shifting may be performed under load without negative consequences. Multiple segmented sprockets of the gearbox may be simultaneously shifted in this manner, if desired.

Examples, Components, and Alternatives

The following sections describe selected aspects of illustrative bicycle gearboxes as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Schematic Diagram of a Gearbox of the Present Disclosure

As shown schematically in FIG. 1, this section describes an illustrative gearbox 100 having segmented gear clusters. Gearbox 100 includes a housing 102 having a gearing system disposed within. The gearing system includes a plurality of (e.g., four) gear clusters, namely a first gear cluster 108, a second gear cluster 114, a third gear cluster 118, and a fourth gear cluster 122, arranged as shown in FIG. 1. Each gear cluster has a plurality of individual gears labeled 1 through N. Each gear of the cluster has a plurality of individual gear segments labeled 1 through M. In some examples, each gear of each gear cluster has the same number of gear segments. In some examples, the number of segments may vary from gear to gear.

Each gear comprising gear segments is referred to as a segmented gear. Each gear segment is shaped as an annular sector. In some examples, a segmented gear comprises four gear segments. A selected gear of each gear cluster is coupled to (i.e., engaged with) a chain by teeth arranged around a periphery thereof. In some examples, two or more gear clusters may be engaged with the same chain. Each gear segment of a segmented gear is movable with respect to the chain. The movement of gear segments is utilized to shift between gear ratios. In some examples, each gear segment may be pivotable about a hinge joint disposed at an axle end of the segment. In some examples, each gear segment may be linearly displaceable (e.g., translated or shifted axially).

Gearbox 100 includes an associated shifting system 110. Shifting system 110 is configured to individually move segments of the segmented gears into and out of engagement with the respective chain. Shifting system 110 may be coupled to a controller 126, which is configured to send command signals to one or more actuators of the shifting system to change gear ratios. For example, controller 126 may signal the shifting system to increase the gear ratio. Shifting is described further in sections below.

In principle, gearbox 100 may be operable with any gear ratio achievable by the installed cogsets. In some cases, however, controller 126 is configured to allow a rider to select only a subset of gear ratios. For example, in some cases two or more different combinations of gears may produce identical or nearly identical gear ratios. Providing the vehicle operator with a set of selectable gear combinations that includes different gear combinations that result in substantially the same gear ratio may be unhelpful and confusing. Accordingly, shifting system 110 and/or controller 126 may be configured to enable selection of only one of the redundant gear combinations.

Gearbox 100 includes a crankset 104 disposed outside of housing 102 and coupled to a spindle 106. Spindle 106 passes through housing 102 to engage first gear cluster 108, such that rotation of the crankset causes rotation of the spindle which, in turn, causes rotation of the first gear cluster.

First gear cluster 108 is coupled to a first chain 112 such that rotation of the gear cluster causes rotation of the chain. First chain 112 may be oriented orthogonally with respect to spindle 106.

First chain 112 is coupled to second gear cluster 114, thereby transmitting power from cluster 108 to cluster 114. Second gear cluster 114 is coupled to third gear cluster 118 via a layshaft 116. Accordingly, rotation of chain 112 using the crankshaft and first gear cluster drives the rotation of second gear cluster 114, which rotates layshaft 116 and third gear cluster 118. Layshaft is generally parallel to and spaced from spindle 106. Third gear cluster 118 is coupled to a second chain 120 which is further coupled to a fourth gear cluster 122, such that rotation of third gear cluster 118 causes rotation of fourth gear cluster 122.

Fourth gear cluster 122 is coupled to an external chainring 124 (i.e., disposed outside of housing 102) via an output shaft 123 that passes through housing 102. Output shaft 123 is coaxial with spindle 106, such that spindle 106 passes through the center of output shaft 123. Spindle 106 and output shaft 123 are configured to rotate independently with respect to one another. Chainring 124 is coupled to an output system 130 (e.g., a rear wheel) via a third chain 128.

In some examples, more or fewer gear clusters and/or layshafts may be included. For example, a two-cluster version of gearbox 100 may include first gear cluster 108 on spindle 106, chain 112, and second gear cluster 114 on layshaft 116. In this example, gear clusters 118 and 122 are excluded, and the drive output is via a chainring 124' coupled to layshaft 116' as shown in dashed outline in FIG. 1. In other examples, additional gear clusters may be interspersed with those shown in FIG. 1, to provide additional gear ratios and combinations.

B. First Illustrative Gearbox

This section describes a gearbox 200, which is an example of gearbox 100 described above. See FIGS. 2-27.

Figure 2:
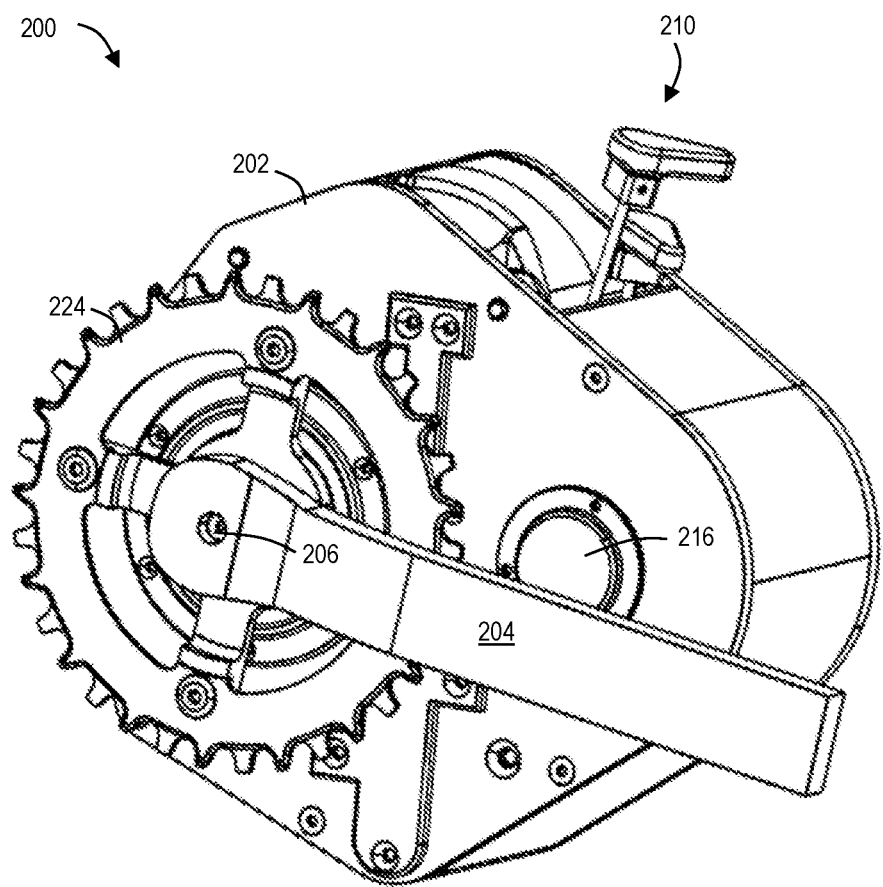
FIG. 2 is an isometric view of a gearbox which is an example of the gearbox depicted in FIG. 1.
Figure 3:
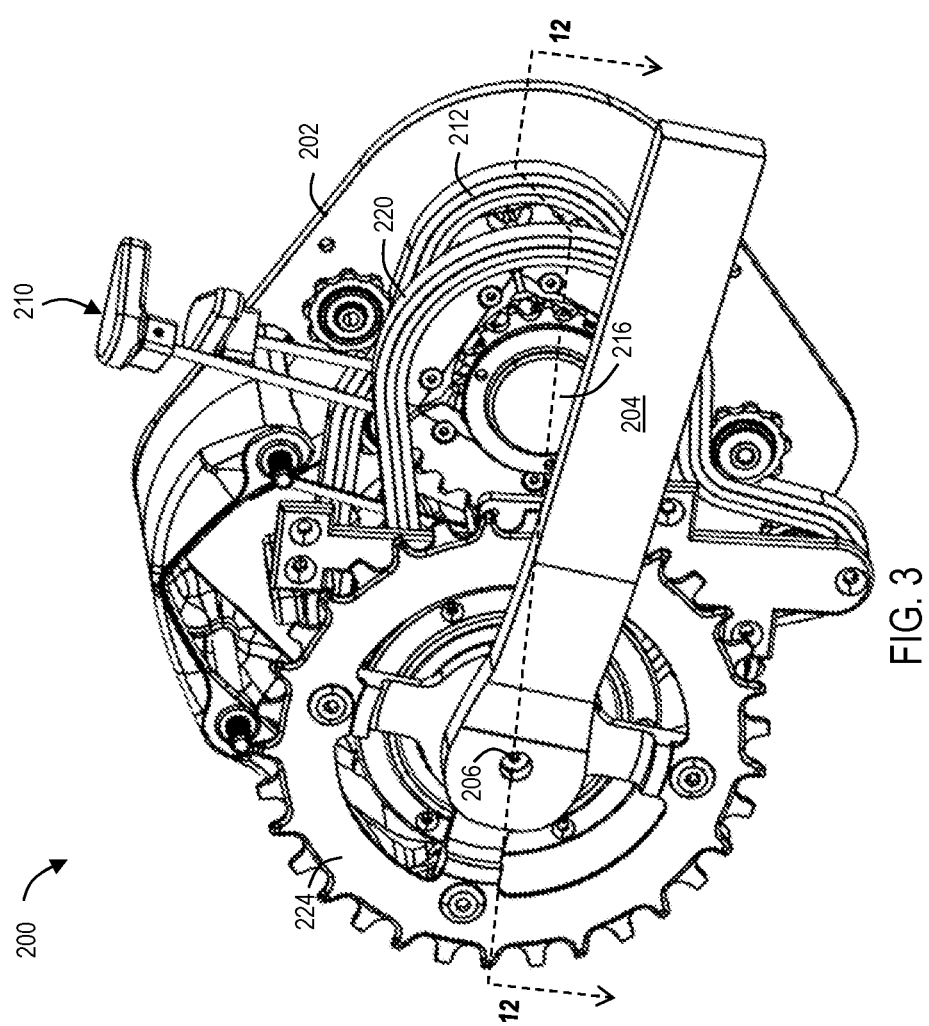
FIG. 3 is an isometric view of the gearbox of FIG. 2 with portions of the housing removed.

As shown in FIGS. 2 and 3, gearbox 200 includes a housing 202. The housing at least partially contains a gearing system, as described above. An Illustrative gearing system for gearbox 200 is described further below. A spindle 206 extends through the housing. A first crankarm 204 and a second crankarm (not shown) are coupled to respective ends of spindle 206. A chainring 224 couples gearbox 200 to a wheel, e.g., a rear wheel, via an external drive chain or belt (not shown).

Figure 4:
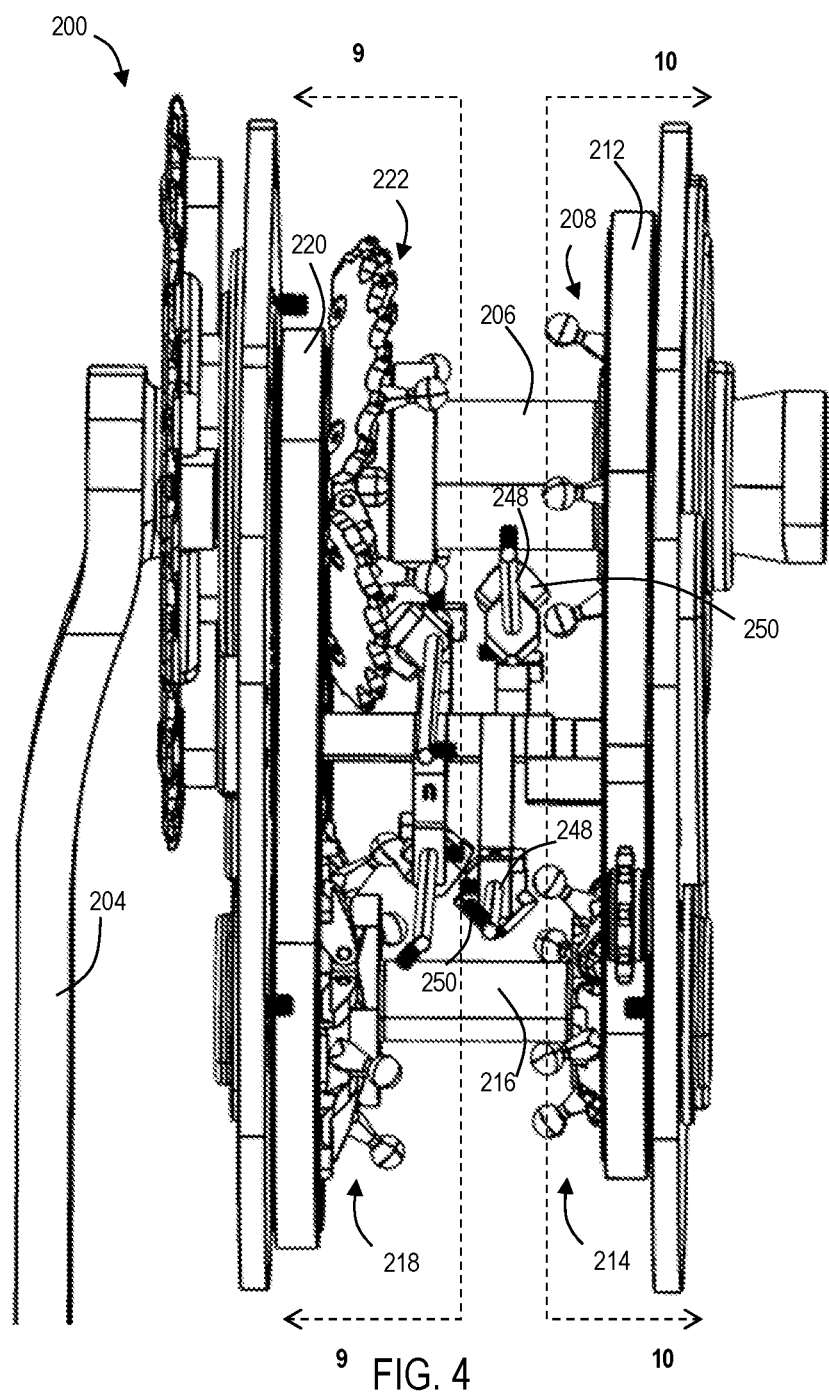
FIG. 4 is a top-down view of the gearbox of FIG. 2 with the housing removed.

FIG. 4 is a top view of gearbox 200. Gearbox 200 includes a layshaft 216 and four gear clusters: a first (input) gear cluster 208 (also referred to as cluster 1) disposed on spindle 206, a second gear cluster 214 (also referred to as cluster 2) disposed on layshaft 216, a third gear cluster 218 (also referred to as cluster 3) disposed on layshaft 216, and a fourth gear cluster 222 (also referred to as cluster 4) disposed on an output shaft 223 (AKA a driven shaft), an example of output shaft 123. First gear cluster 208 is coupled to second gear cluster 214 by a first chain 212. Similarly, third gear cluster 218 is coupled to fourth gear cluster 222 by a second chain 220.

Accordingly, rotation of spindle 206 (e.g., by a bicycle rider operating pedals attached to the crankarms and/or by a motor) transmits power from first gear cluster 208 via first chain 212 to second gear cluster 214, and from the second gear cluster via the layshaft to third gear cluster 218. Second chain 220 transmits power from third gear cluster 218 to fourth gear cluster 222, and power is transmitted from the fourth gear cluster via output shaft 223 to chainring 224, and/or to another suitable system.

Each of the gear clusters may include a plurality of gears, one or more gears of the plurality of gears having a plurality of gear segments. Gears comprising gear segments may be referred to as segmented gears. Each gear segment may be shaped as an annular sector. In one example, each segmented gear comprises four gear segments. Each gear segment is rotatably attached to a hinge disposed near the center of the segmented gear. One or more gear clusters may have a non-segmented sprocket having a smaller diameter than the respective segmented gear. Each gear segment may be attached to a pin. Each gear segment pivots (or folds) in a direction transverse to the plane of the gear. In other words, each gear segment may transition between a coplanar position and a pivoted (AKA folded) position. This configuration may enable a segmented gear to transition (e.g., stepwise) between a coplanar configuration (i.e., with all segments aligned to form a substantially coplanar gear) and a pivoted (AKA pyramidal) configuration (i.e., with all gear segments rotationally skewed in the same direction away from the plane formed in the coplanar configuration)

As shown in FIG. 4, a shifting system 210 is disposed at least partially within the gearbox, in a generally central location. Shifting system 210 is an example of shifting system 110 described above.

Shifting system 210 includes a shift rod 248 attached to a shift wedge 250 configured to selectively and mechanically interface with portions of the gear segments. Although shift rods are depicted and described herein, any suitable actuator configured to rotate the shift wedges may be utilized, such as a flexible cable or the like, whether manually or electromechanically operated, e.g., by an electronic controller. Manual handles at the upper ends of the shift rods, depicted in FIG. 3 and elsewhere, are shown for purposes of understanding, e.g., where a controller would actuate the shifting system.

Shift wedge 250 includes a pair of ramps referred to herein as a ramped first face 252 and a ramped second face 254 (i.e., a first ramp and a second ramp), generally configured such that planar extensions of each face intersect at an angle (e.g., an acute angle). Rotation of shift rod 248 simultaneously rotates shift wedge 250, thereby changing the orientation of shift wedge 250 (and the first and second faces/ramps).

Figure 25:
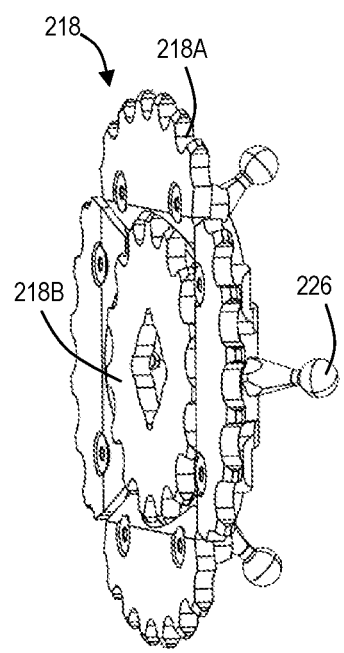
FIG. 25 is an isometric view of the gear cluster of FIG. 23.
Figures 26, 27:
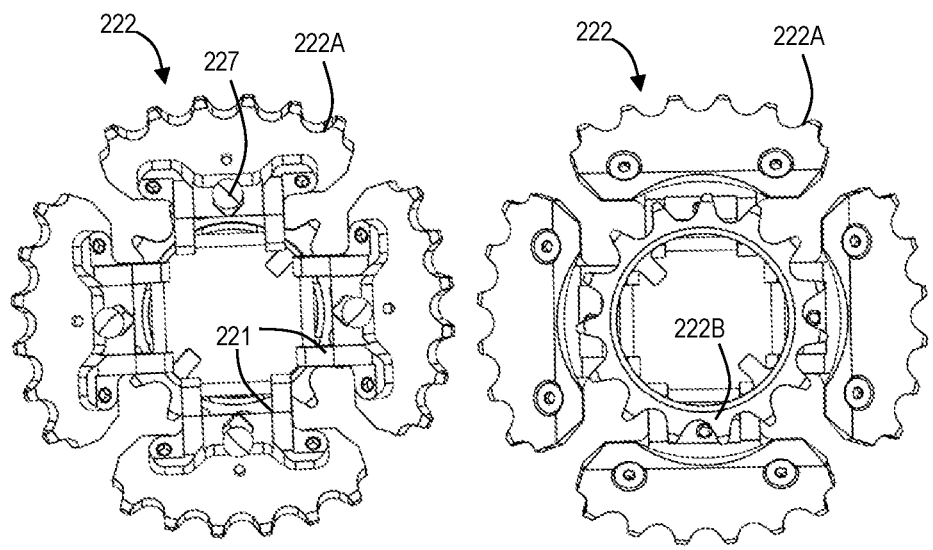
FIG. 26 is a front view of a fourth gear cluster in accordance with aspects of the present disclosure.
FIG. 27 is a rear view of the gear cluster of FIG. 26.

In the current example, shifting system 210 has a shift rod and shift wedge for each gear cluster. In some examples, two or more gear clusters may share a shift wedge. For example, third gear cluster 218 and fourth gear cluster 222 may share the same shift wedge. FIGS. 25 and 26 depict system 210 shifting the gear ratio of gearbox 200 by causing the segments of a segmented gear to pivot into or out of alignment with the chain.

Figure 5:
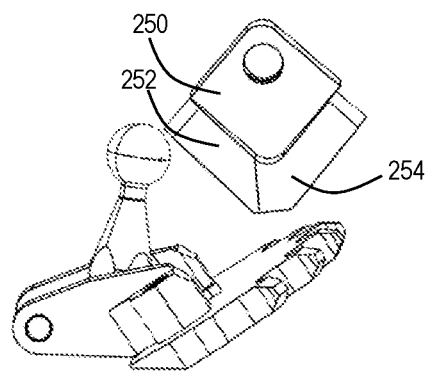
FIG. 5 is an illustrative gear segment in a pivoted position and shift wedge in a first position in accordance with aspects of the present disclosure.

FIGS. 5-8 depict a portion of the shifting system to facilitate the following description thereof. Each of FIGS. 5-8 depict a single gear segment, which is rotating in a generally horizontal plane into the page, and a shift wedge in a series of positions configured to either cause the gear segment to pivot in a selected direction or to avoid the gear segment, as the case may be. FIG. 5 is an isometric view of the single gear segment and shift wedge 250. Shift wedge 250 is in a first position configured such that the shift wedge does not interfere with the pin of the gear segment. In this configuration, the gear segment is in its pivoted position. This position of the gear segment corresponds to a first gear ratio in which the present gear segment is tilted out of the plane of the chain (i.e., not engaged with the chain).

Figure 6:
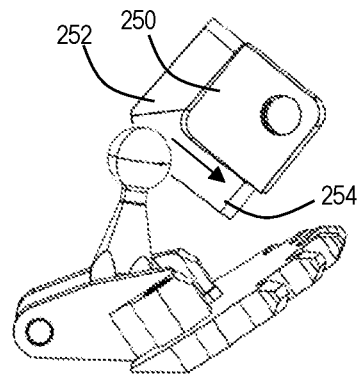
FIG. 6 is an illustrative gear segment in a pivoted position and shift wedge in a second position in accordance with aspects of the present disclosure.

In FIG. 6, shift wedge 250 is shown in a second position configured such that the shift wedge is in the path of the pin of the gear segment. More specifically, in this position, second face 254 has been brought into the path of the pin of the gear segment. Accordingly, further rotation of the gear segment brings the pin into contact with second face 254 and thereby slides along face 254 in the direction indicated by the arrow. This pivots the gear segment into its coplanar position (see FIG. 7) (i.e., in the plane of the chain) and thus the chain engages the segment.

Figure 7:
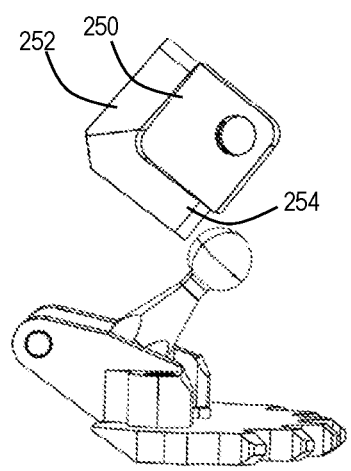
FIG. 7 is an illustrative gear segment in a planar position and shift wedge in a second position in accordance with aspects of the present disclosure.
Figure 8:
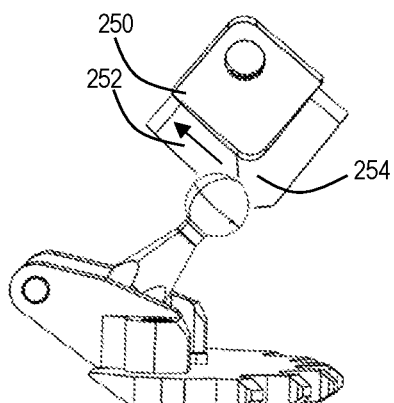
FIG. 8 is an illustrative gear segment in a planar position and shift wedge in a first position in accordance with aspects of the present disclosure.

FIG. 7 depicts the gear segment in its coplanar position and shift wedge 250 in the second position. In this configuration, the shift wedge does not interfere with the pin of the gear segment. In other words, this configuration corresponds to operation of the system in a second gear ratio in which the present gear segment is engaged with the chain and able to freely rotate without striking the shift wedge.

In FIG. 8, shift wedge 250 is again in the first position. Because the gear segment is coplanar with the chain, the shift wedge is now in the path if the pin of the gear segment. More specifically, in this position, first face 252 has been brought into the path of the pin of the gear segment. Accordingly, further rotation of the gear segment brings the pin into contact with first face 252 and thereby slides along face 252 in the direction indicated by the arrow. This pivots the gear segment into its pivoted (i.e., non-coplanar) position, and the gear segment and wedge are again as depicted in FIG. 5.

Accordingly, shifting system 210 includes a shifting wedge transitionable between: (a) a first configuration, in which a first ramped face of the wedge is in line with the pin of each segment of the inboard gear of the first gear cluster when the segment is out of the plane of its chain, such that rotating the pin into the first ramped face is configured to urge the segment into the plane of the chain, and (b) a second configuration, in which a second ramped face of the wedge is in line with the pin of each segment of the inboard gear of the first gear cluster when the segment is in the plane of its chain, such that rotating the pins into the second ramped face is configured to urge the segment out of the plane of the chain.

Figure 9:
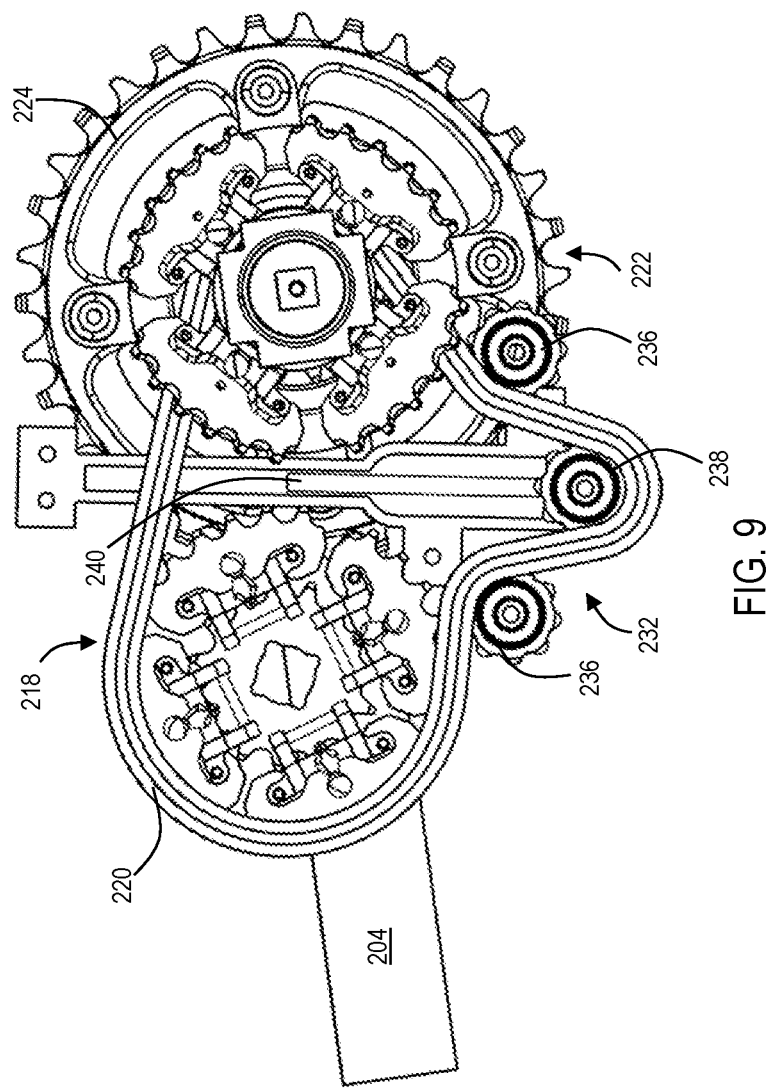
FIG. 9 is a sectional view of the gearbox of FIG. 2 taken along a line indicated in FIG. 4.

As shown in FIG. 9, gearbox 200 includes a first chain tensioner 232. Chain tensioner 232 has at least one idler 236 having a fixed location and at least one adjustable gear 238 configured to be moved or translated by a pushrod 240. In some examples, chain tensioner 232 includes two idlers and one adjustable gear. A spring is coaxially mounted to pushrod 240 to provide a biasing force. Chain tensioner 232 may be configured to engage any of the chains described above. In the current example, idler 236 and gear 238 of chain tensioner 232 are configured to engage chain 220. Accordingly, chain 220 interfaces with third gear cluster 218, fourth gear cluster 222, and chain tensioner 232.

Chain tensioner 232 is configured such that pushrod 240 can be utilized to displace gear 238, thereby applying more or less tension to the engaged chain. Manipulation of pushrod 240 may be manual (e.g., by a user), and/or may be automatic (e.g., using mechanical and/or electric components).

Figure 10:
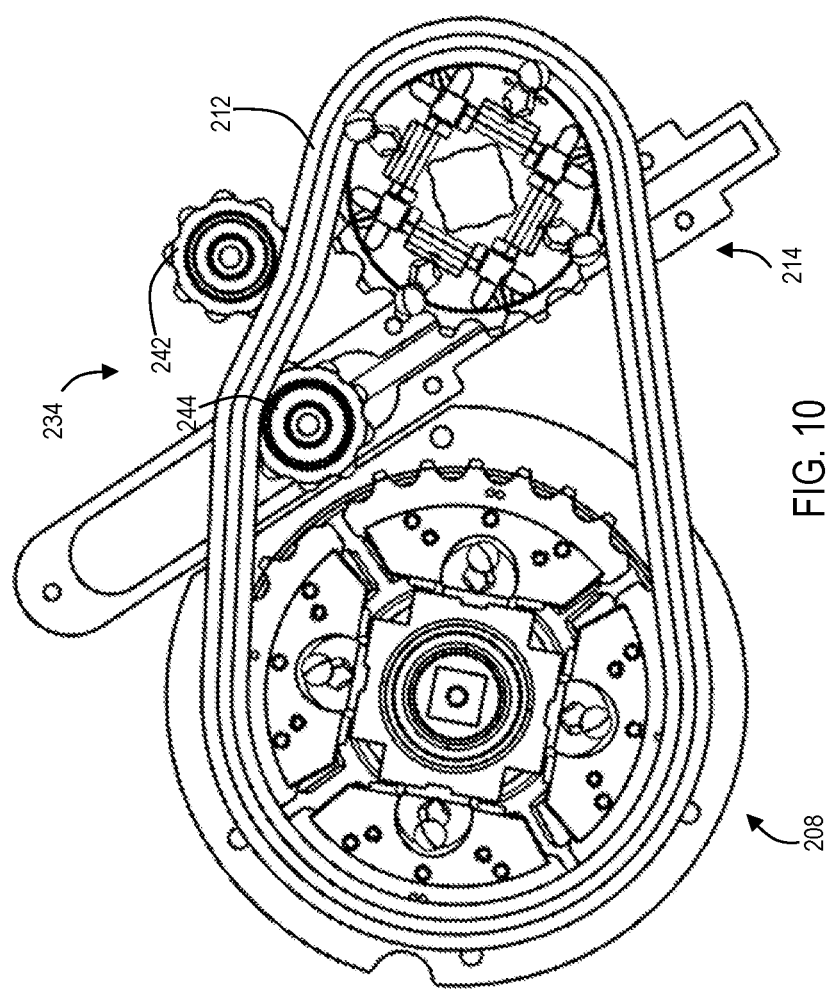
FIG. 10 is a sectional view of the gearbox of FIG. 2 taken along a line indicated in FIG. 4.

As shown in FIG. 10, gearbox 200 includes a second chain tensioner 234, which is substantially similar to chain tensioner 232. In the current example, chain tensioner 234 includes a single idler 242 and a movable gear 244 attached to a pushrod 246. Second chain tensioner is configured to engage first chain 212. Accordingly, chain 212 is configured to interface with first gear cluster 208, second gear cluster 214, and chain tensioner 234. Any suitable chain tensioners may be utilized.

Figure 11:
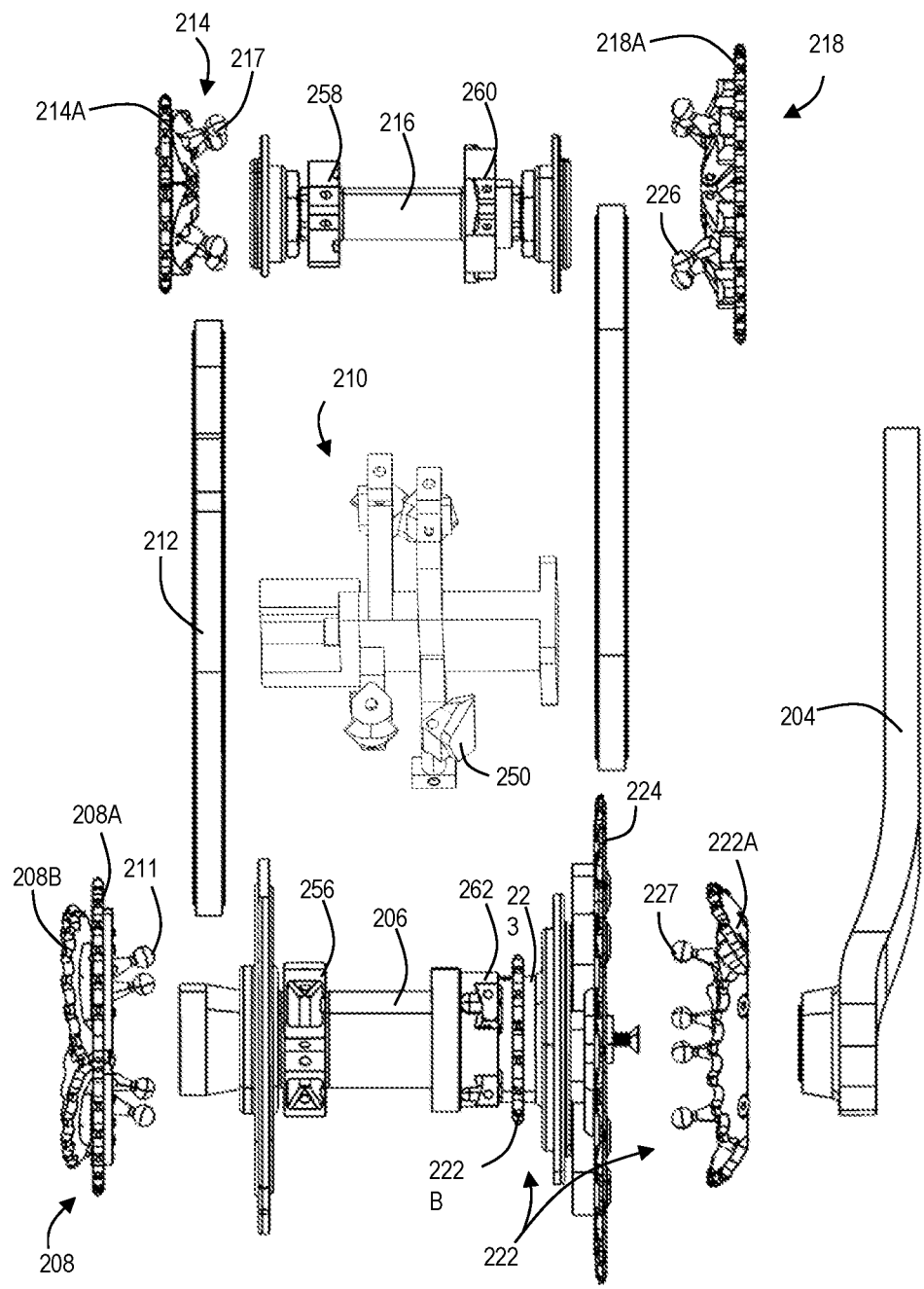
FIG. 11 is an exploded view of the gearbox of FIG. 2.

FIG. 11 depicts an exploded view of portions of gearbox 200. The first gear cluster is configured to be driven by the vehicle's prime mover (e.g., human-powered pedaling and/or electric motor) via spindle 206. Each gear of first gear cluster 208 is configured to selectively engage first chain 212, which may include one or more chains, belts, and/or any other suitable power transfer devices.

In the current example, first gear cluster 208 comprises two segmented gears, 208A and 208B. Affixed to each gear segment of segmented gear 208A is a pin 211. Each gear segment of segmented gear 208A shares a common hinge portion 209 with a corresponding gear segment of segmented gear 208B, in a fixed angular relationship. Hinge portion 209 is configured to mate with a hinge receiver 256 disposed on spindle 206. Hinge receiver 256 may be unitary with spindle 206 or may be affixed by a suitable mechanism (e.g., screws, friction fit, etc.). Corresponding segments of the two gears are configured to pivot together, rather than independently (see FIGS. 17-19). In other words, when a segment of gear 208A is shifted out of the plane of chain 212, the corresponding segment of 208B is brought into the plane of chain 212 (thereby engaging the chain).

First gear cluster 208 is coupled to second gear cluster 214 by first chain 212. The system is configured such that first chain 212 directly engages a single one of the gears of first gear cluster 208 and a single one of the gears of second gear cluster 214 at any given time; however, the chain may partially engage more than one of the gears of each cluster at some stages of operation, such as when the chain is being segmentally shifted from one gear to another (e.g., in response to user and/or controller input).

Second gear cluster 214 is securely mounted on layshaft 216 such that rotation of second gear cluster 214 also rotates the layshaft. Second gear cluster 214 has a nested arrangement, such that a segmented gear 214A and a non-segmented sprocket 214B are nestable together (see FIGS. 20-22). Affixed to the inboard face of each gear segment of segmented gear 214A is a pin 217. Each gear segment of segmented gear 214A includes a hinge portion 215 coupled to a hinge receiver 258 disposed on layshaft 216. Hinge receiver 258 may be unitary with layshaft 216 or may be affixed by a suitable fastening mechanism (e.g., screws, friction fit, etc.).

Figures 23, 24:
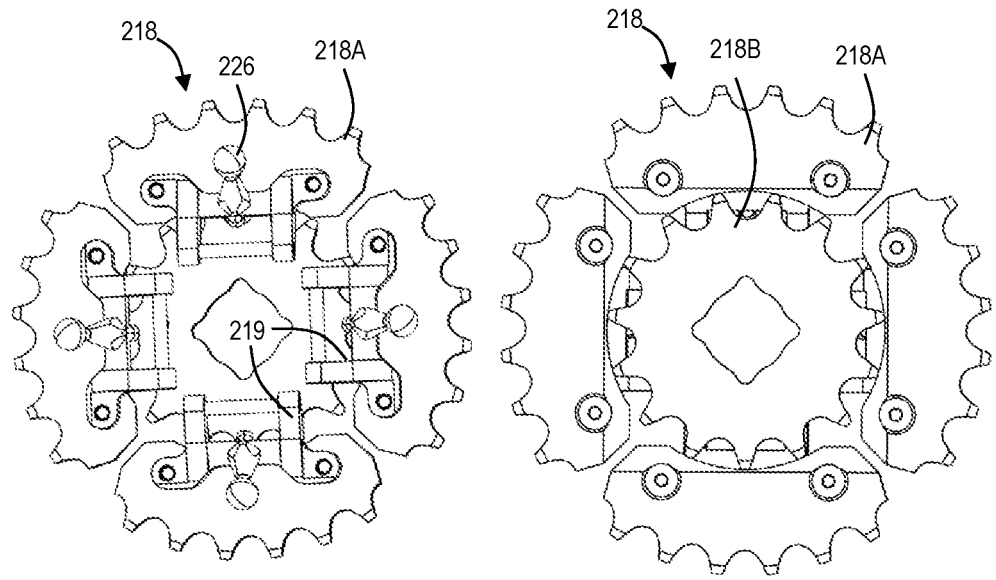
FIG. 23 is a front view of a third gear cluster in accordance with aspects of the present disclosure.
FIG. 24 is a rear view of the gear cluster of FIG. 23.

Third gear cluster 218 comprises a segmented gear 218A and a non-segmented sprocket 218B nestable therein (see FIGS. 23-25). Affixed to the inboard face of each gear segment of segmented gear 218A is a pin 226. Each gear segment of segmented gear 218A includes a hinge portion 219 coupled to a hinge receiver 260 disposed on layshaft 216. Hinge receivers 258 and 260 may be unitary with layshaft 216 or may be affixed by a suitable mechanism (e.g., screws, friction fit, etc.).

Third gear cluster 218 is configured to engage second chain 220. Second chain 220 couples a selected one of the gears to fourth gear cluster 222, thereby transmitting rotation of third gear cluster 218 to fourth gear cluster 222. Typically, second chain 220 directly engages a single one of gears of third gear cluster 218 and fourth gear cluster 222 at any given time; however, the chain may engage more than one of the gears of the clusters at some stages of operation, such as when the chain is being shifted from one gear to another (e.g., in response to user and/or controller input).

Fourth gear cluster 222 is securely mounted on output shaft 223 such that the output shaft rotates with the fourth gear cluster. Fourth gear cluster 222 comprises a segmented gear 222A and a non-segmented sprocket 222B (see FIGS. 26-28). Affixed to the inboard face of each gear segment of segmented gear 222A is a pin 227. Sprocket 222B includes an opening for mating with output shaft 223. Each gear segment of segmented gear 222A includes a hinge portion 221 configured to mate with a hinge receiver 262 disposed on layshaft 216. Hinge receiver 258 may be unitary with layshaft 216 or may be attached by a suitable mechanism (e.g., screws, friction fit, etc.).

Figure 12:
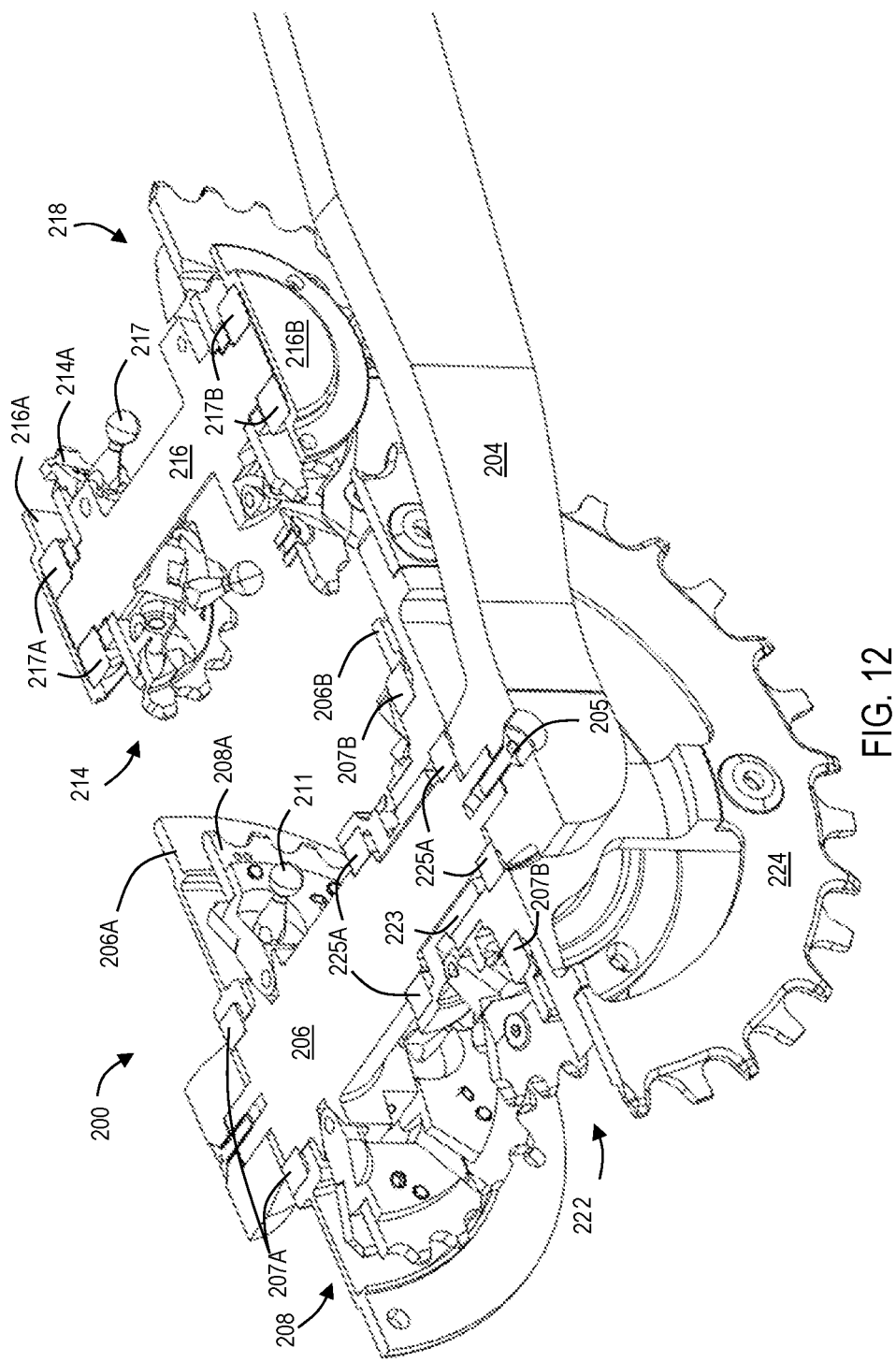
FIG. 12 is a section view of the gearbox of FIG. 2 taken along a line indicated in FIG. 3.

Hollow output shaft 223 (AKA an output sleeve) surrounds and is coaxial with spindle 206 (see. FIG. 12), such that the output shaft and the spindle are freely able to rotate independently of one another. Output shaft 223 is affixed to chainring 224 (e.g., by a spider), such that the chainring rotates with the output shaft independently of the spindle. Chainring 224 thus transmits power from gearbox 200 to an external system, typically a rear wheel of a bicycle or another suitable wheel or vehicle.

FIG. 12 depicts a sectional view of the gearing system of gearbox 200 taken at line 12-12 of FIG. 3. Crankarm 204 is coupled to spindle via crank screw 205. Output shaft 223 is situated coaxially on an end of spindle 106 and rotationally isolated from the spindle by bearings 225A and 225B.

Disposed at one end of spindle 206 is a flange 206A and disposed at the opposite end, encircling output shaft 223 is a flange 206B. Spindle 206 is rotationally isolated from flange 206A via bearing 207A, and similarly, output shaft 223 is rotationally isolated from flange 206B via bearing 207B.

Similarly, disposed at one end of layshaft 216 is a flange 216A and disposed at the opposite end is a flange 216B. Layshaft 216 is rotationally isolated from flange 216A via bearing 117A, and similarly, layshaft 216 is rotationally isolated from flange 216B via bearing 117B.

Figure 13:
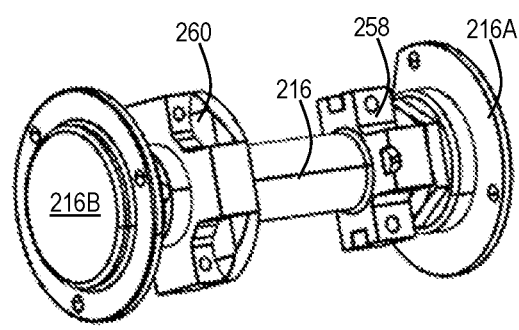
FIG. 13 is an isometric view of a layshaft in accordance with aspects of the present disclosure.
Figure 14:
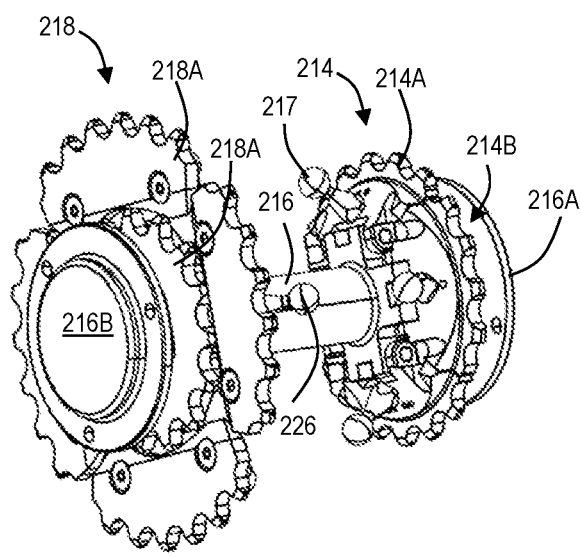
FIG. 14 is an isometric view of the layshaft of FIG. 13 having gear clusters attached thereon.

FIGS. 13 and 14 show layshaft 216 with gear clusters 214 and 218 removed and coupled, respectively. As shown in FIGS. 13 and 14, sprocket 214B mates with layshaft 216 in the space between hinge receiver 258 and flange 216A. Similarly, sprocket 218B mates with layshaft 216 in the space between hinge receiver 260 and flange 216B. FIGS. 17-28 depict various views of portions of the gear clusters described above.

Figure 15:
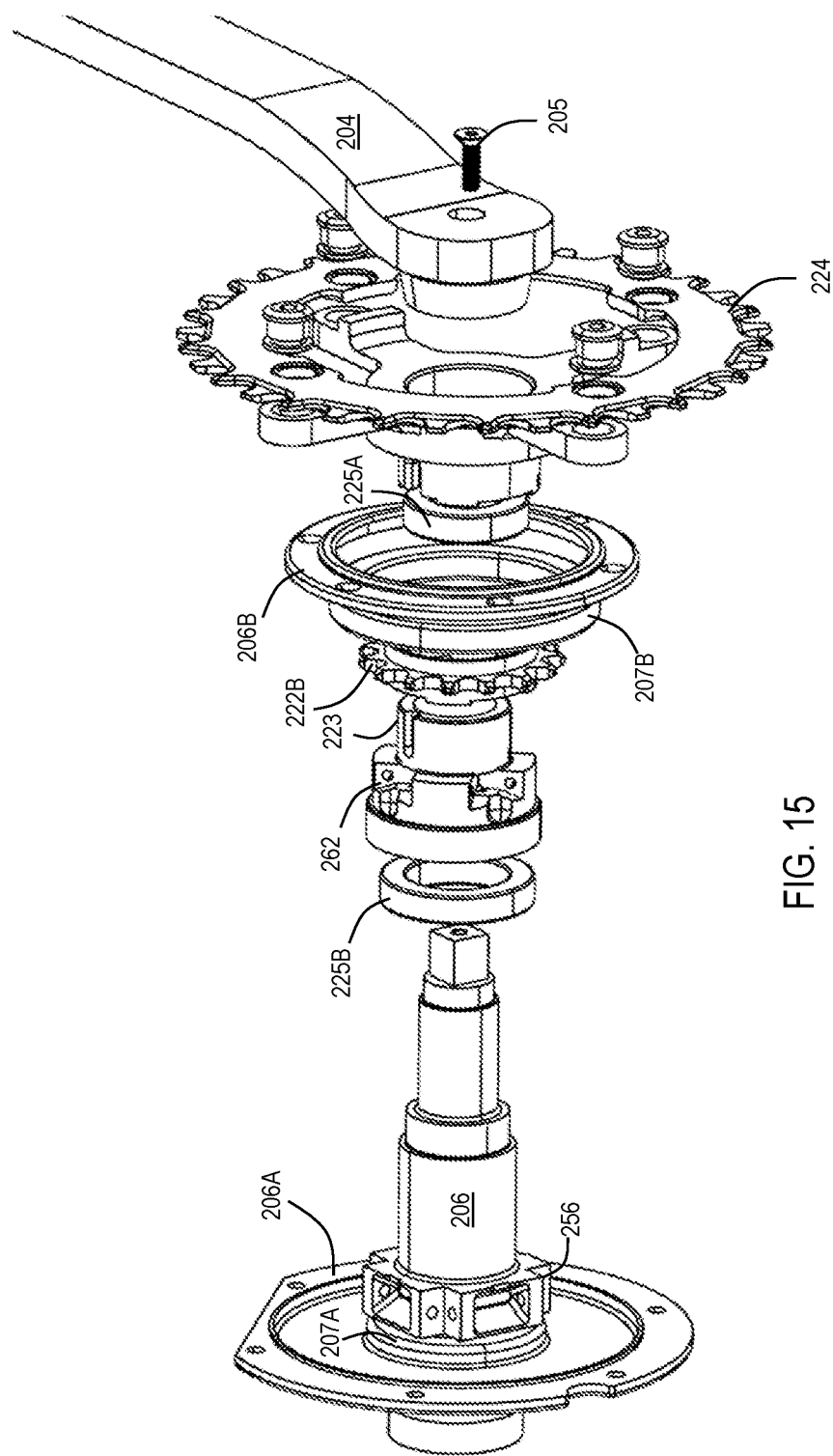
FIG. 15 is an exploded view of a portion of the gearbox of FIG. 2.
Figure 16:
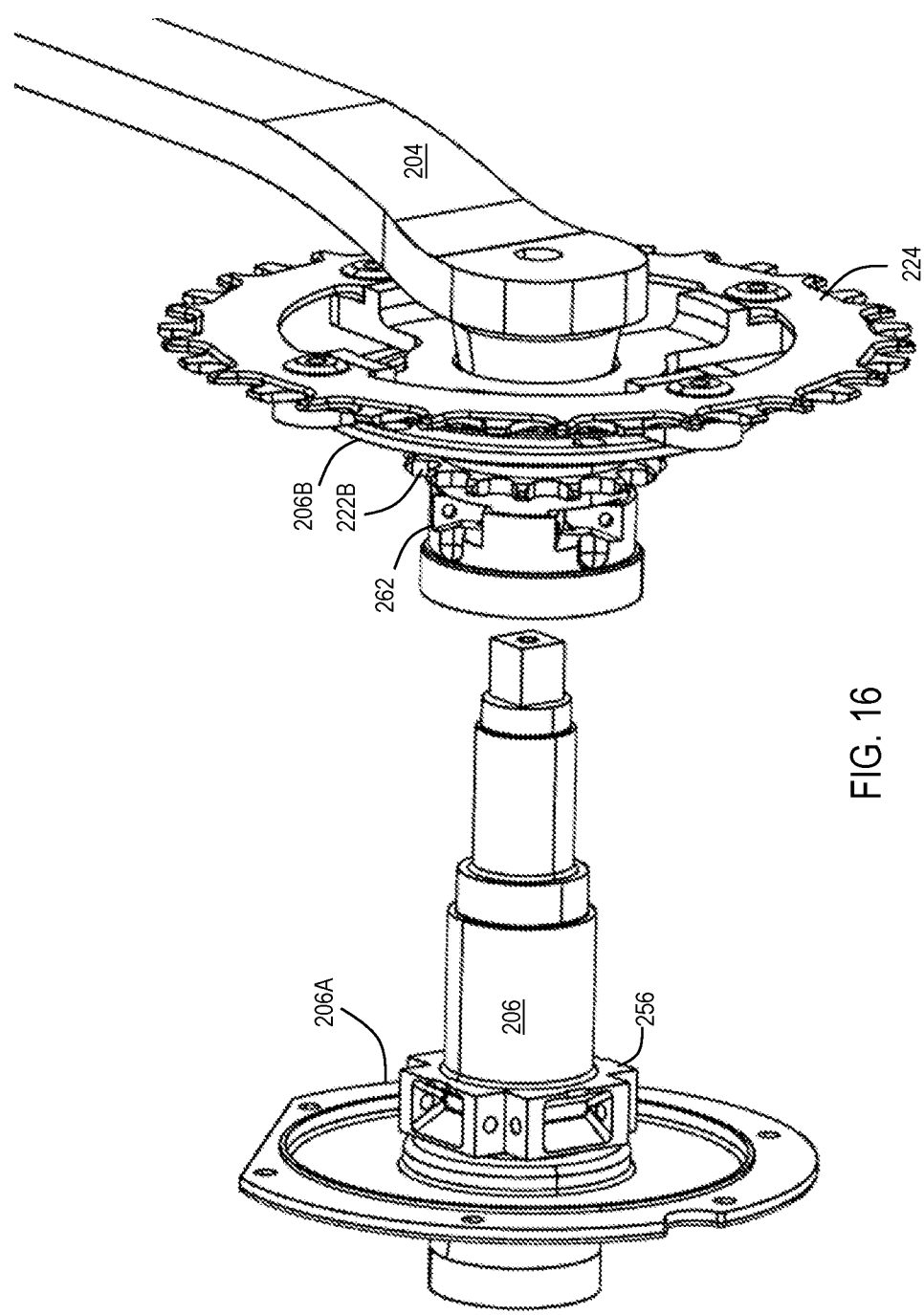
FIG. 16 is a partial exploded view of the portion of FIG. 15.

FIGS. 15 and 16 show an exploded view and partial exploded view, respectively, of spindle 206 and output shaft 223 with various components for attachment thereon.

Figure 17:
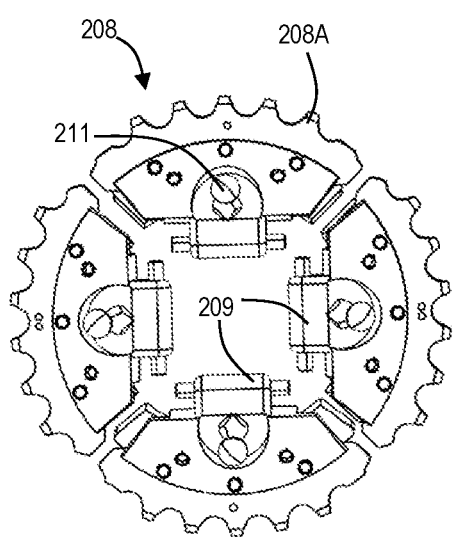
FIG. 17 is a front view of a first gear cluster in accordance with aspects of the present disclosure.
Figure 18:
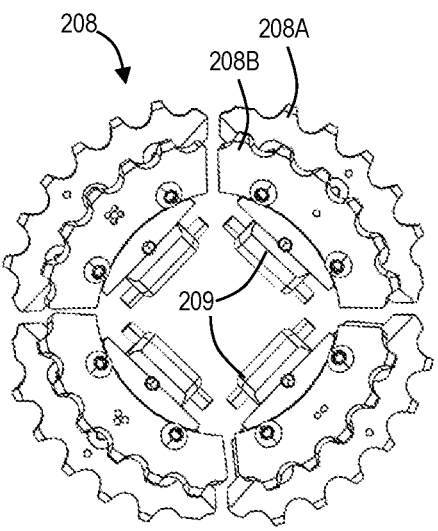
FIG. 18 is a rear view of the gear cluster of FIG. 17.
Figure 19:
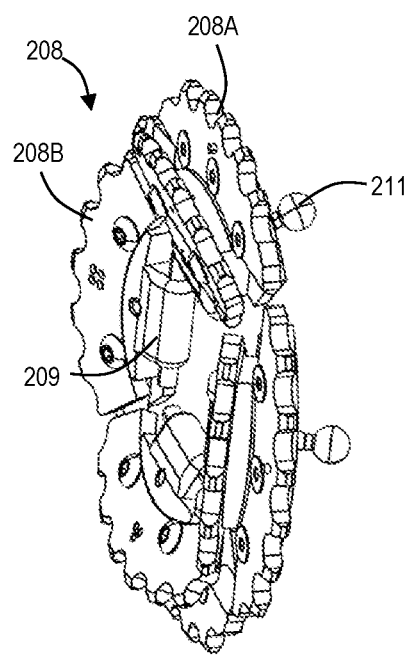
FIG. 19 is an isometric view of the gear cluster of FIG. 17.

As shown in FIGS. 17-19, first gear cluster 208 comprises a plurality of segmented gears having different diameters. In the current example, first gear cluster 208 comprises two gears (one inboard and one outboard). In another example, the first gear cluster may comprise more or fewer gears. Gears are arranged within first gear cluster 208 from largest-diameter gear to smallest-diameter gear. Each segment of the segmented gear 208A shares a hinge with a corresponding segment of segmented gear 208B.

Figures 20, 21:
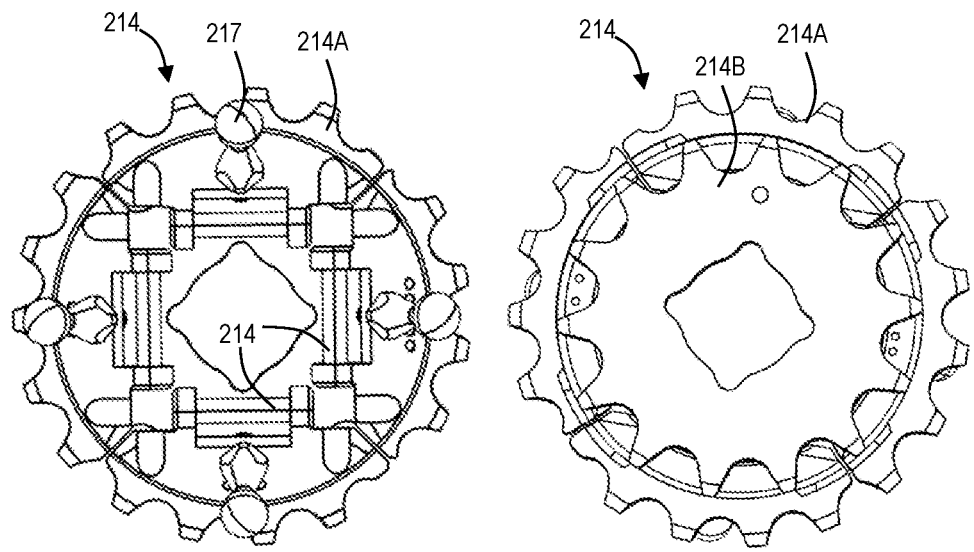
FIG. 20 is a front view of a second gear cluster in accordance with aspects of the present disclosure.
FIG. 21 is a rear view of the gear cluster of FIG. 20.
Figure 22:
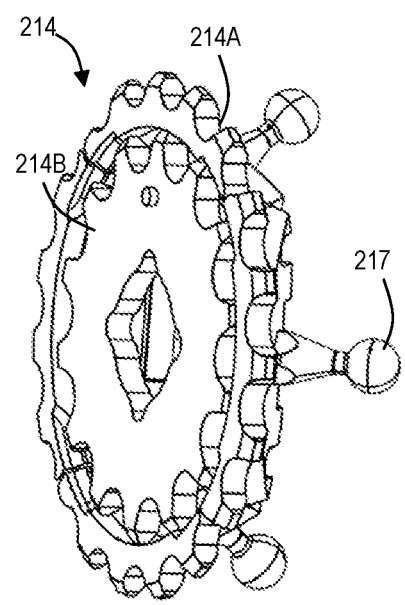
FIG. 22 is an isometric view of the gear cluster of FIG. 20.

As shown in FIGS. 20-22, second gear cluster 214 comprises a sprocket or cog (e.g., a single non-segmented gear) having a first diameter and a segmented gear having a second (larger) diameter, the segmented gear being capable of transitioning into and out of the same plane as the smaller sprocket.

As shown in FIGS. 23-25, third gear cluster 218 includes a non-segmented cog or sprocket having a first diameter and a segmented gear having a second (larger) diameter, the segmented gear being capable of transitioning into and out of the same plane as the smaller sprocket.

Figure 28:
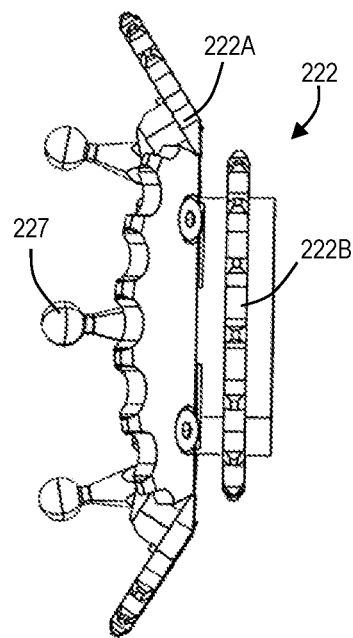
FIG. 28 is an isometric view of the gear cluster of FIG. 26.

As shown in FIGS. 26-28, fourth gear cluster 222 comprises a cog having a first diameter and a segmented gear having a second (larger) diameter, the segmented gear being capable of transitioning into and out of the same plane as the smaller sprocket.

Figure 29:
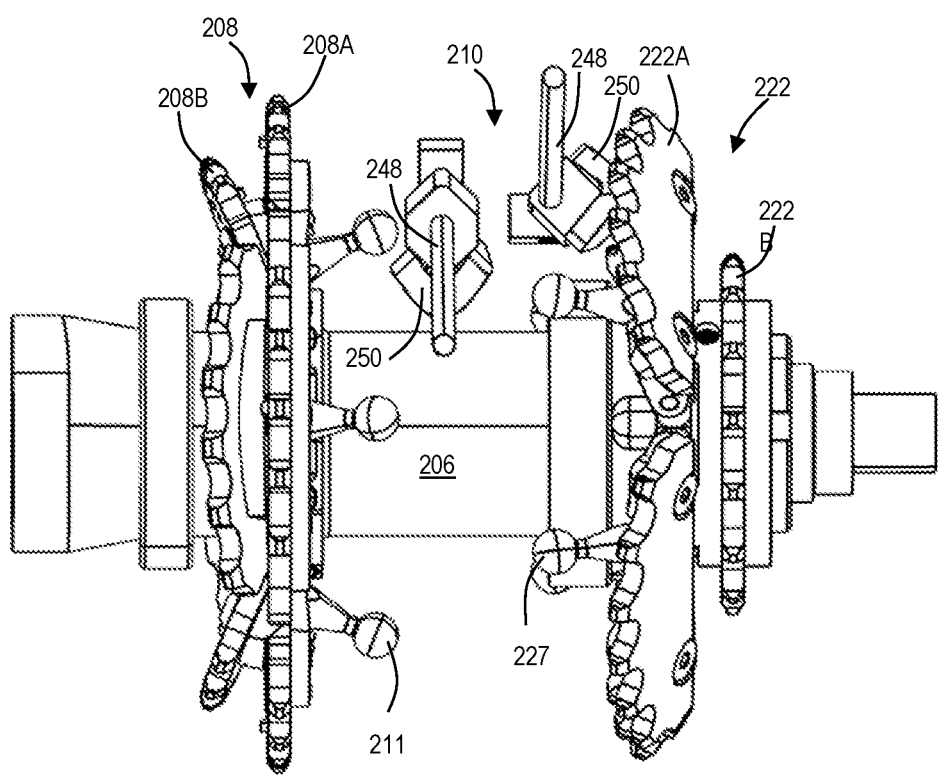
FIG. 29 is a portion of an illustrative shifting system engaged with gear clusters in accordance with aspects of the present disclosure.

FIG. 29 shows the engagement of portions of shifting system 210 with gear clusters 208 and 222. As shown in the figure, the shift wedge corresponding to gear cluster 208 is in its second position and the gear segments of gear 208B are in their pivoted position. Accordingly, the gear segments of gear 208A are in their coplanar position. In contrast, the shift wedge corresponding to gear cluster 222 is in its first position and the gear segments of gear 222A are in their pivoted position.

In the current example, gearbox 200 includes two gear options for first gear cluster 208, corresponding to gears 208A and 208B. These options may be identified as A1 and A2, respectively. In the current example, gearbox 200 includes two gear options for second gear cluster 214, corresponding to gears 214A and 214B. These options may be identified as B1 and B2, respectively. In the current example, gearbox 200 includes two gear options for third gear cluster 218, corresponding to gears 218A and 218B. These options may be identified as C1 and C2, respectively. In the current example, gearbox 200 includes two gear options for fourth gear cluster 222, corresponding to gears 222A and 222B. These options may be identified as D1 and D2, respectively.

A combination of any one of the gear options of the first gear cluster 208, any one of the gear options of second gear cluster 214, any one of the gear options for third gear cluster 218, and any one of the gear options for fourth gear cluster 222 determines a gear ratio of gearbox 200. Each combination of the available options may be referred to as a "gear" and/or "speed" of the vehicle that includes gearbox 200.

An operator of the vehicle may switch between gear ratios by switching any of the selected options to another available option. For example, if the selected options are presently A1, B1, C2, and D2, the operator may change the present gear ratio by switching D2 to D1. Alternatively, or additionally, the operator may change A1 to A2, and/or may change C2 to C1. Switching gear ratios is typically achieved by actuating a mechanical and/or electronic control to pivot the gear segments of a segmented gear, thereby engaging the chain with a different gear.

C. Illustrative Belt-Driven Gearing System

This section describes a belt-driven gearing system 300 for use with gearboxes of the present disclosure. See FIGS. 30-43.

The components and configurations described in this section may be utilized in gearboxes such as gearbox 200, described above, as substitutions and/or additions to the components and configurations already described with respect to gearbox 200. The components described in this section may be utilized in gearbox 200, e.g., as a replacement for the corresponding components described above. For example, one or more of the belt-driven gear clusters described in this section may be utilized in gearboxes 200 and/or 400 in place of the corresponding chain-engaging gear clusters described herein (e.g., gear clusters 208, 214, 218, and/or 222), and/or with system 510.

With continuing reference to FIGS. 30-43, belt-driven gearing system 300 includes: a first gear cluster 308 configured to be disposed on spindle 206, a second gear cluster 314 configured to be disposed on layshaft 216, a third gear cluster 318 configured to be disposed on layshaft 216, and a fourth gear cluster 322 configured to be disposed on output shaft 223. First gear cluster 308 is coupled to second gear cluster 314 by a first belt 312. Similarly, third gear cluster 318 is coupled to fourth gear cluster 322 by a second belt 320.

Accordingly, rotation of spindle 206 (e.g., by a bicycle rider operating pedals attached to the crankarms and/or by a motor) transmits power from first gear cluster 308 via first belt 312 to second gear cluster 314, and from the second gear cluster via the layshaft to third gear cluster 318. Second belt 320 transmits power from third gear cluster 318 to fourth gear cluster 322, and power is transmitted from the fourth gear cluster via output shaft 223 to chainring 224, and/or to another suitable system.

Figure 30:
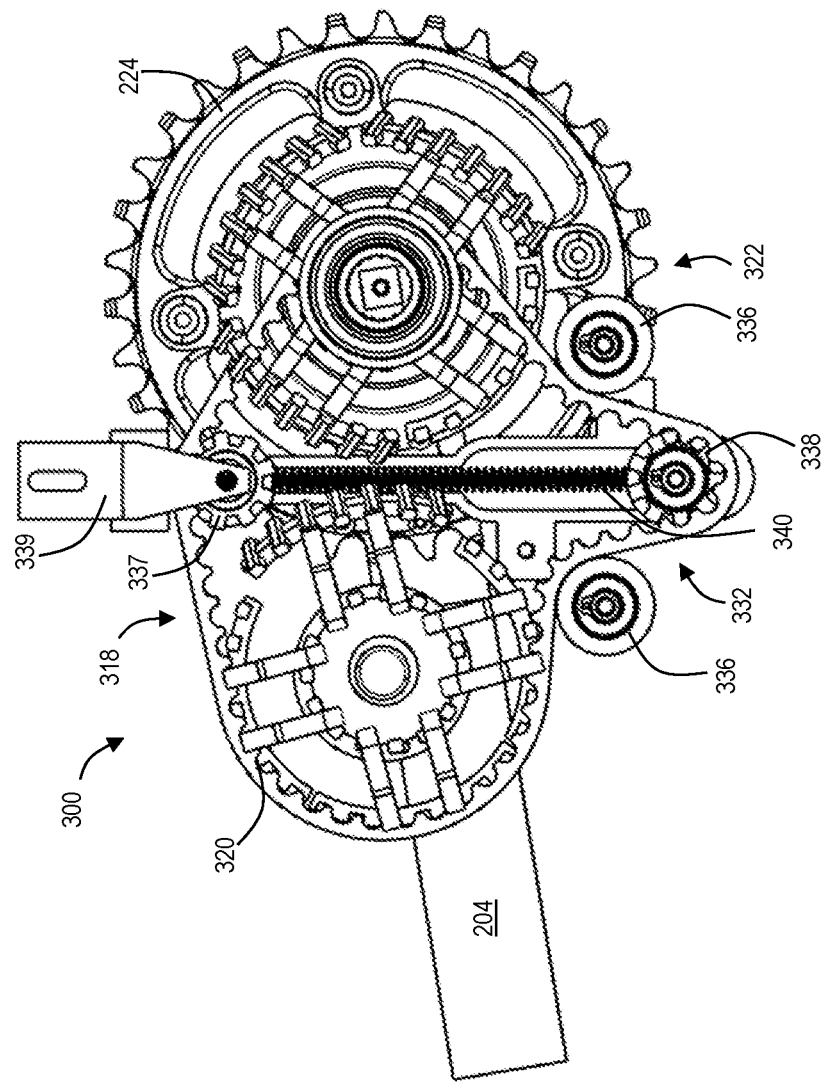
FIG. 30 is a sectional view of a belt-driven gearing system in accordance with aspects of the present disclosure.
Figure 31:
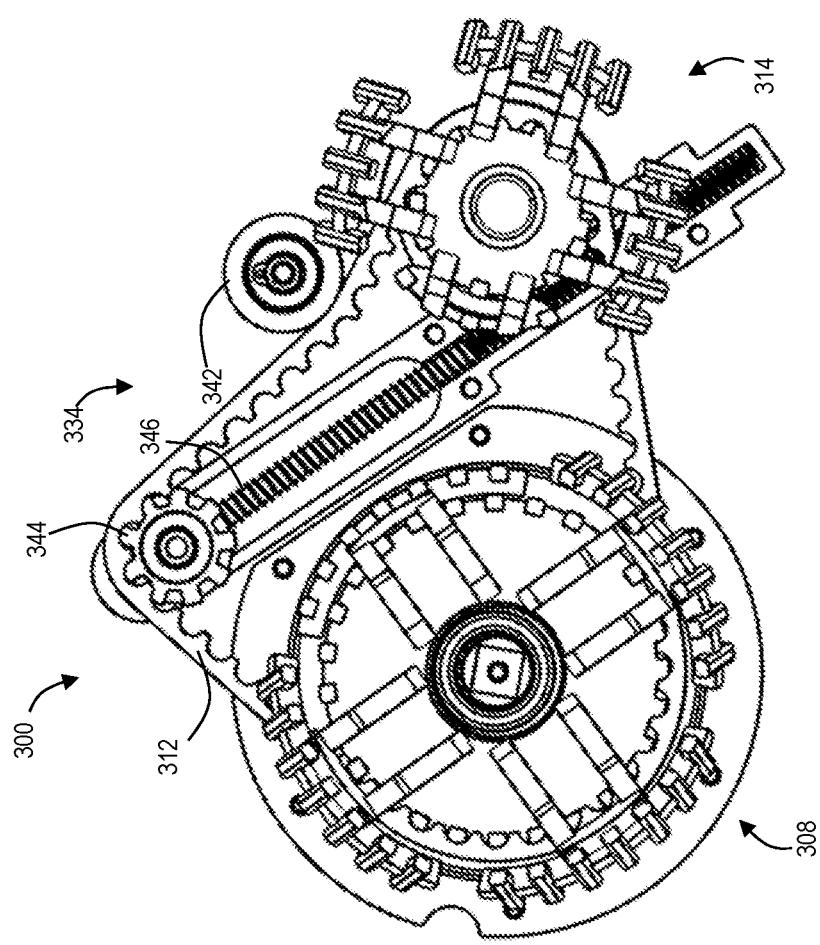
FIG. 31 is a sectional view of the belt-driven gearing system of FIG. 30.

In the example shown in FIGS. 30 and 31, first and second belts 312, 320 are toothed belts (AKA timing belts), although other ridged or castellated belts may be utilized. In this example, each belt has a toothed surface and a non-toothed surface. In some examples, friction belts are utilized, e.g., flat belts, V-belts, ribbed belts (i.e., poly-V belts), hexagonal belts, etc., with gears of the system having a corresponding profile to engage the selected belt. As each type of belt provides a different response with respect to maximum torque, slippage, etc., suitable belts may be selected based on the expected application and load.

In the example shown in FIGS. 30-43, gear clusters 308, 314, 318, 322 are configured to engage the timing belts. In other words, the gear clusters include a plurality of complimentary castellations configured to engage the toothed surfaces of belts 312, 320. In some examples, the gear clusters are adapted to engage a friction belt, e.g., by having a profile or contour complimentary to that of the friction belt.

Each of the gear clusters may include a plurality of gears, one or more of which have a plurality of gear segments. Gears that have gear segments may be referred to as segmented gears. Each gear segment may be shaped as an annular sector. In some examples, each segmented gear comprises four gear segments. Each gear segment is rotatably attached to a hinge disposed near the center of the segmented gear. One or more gear clusters may have a non-segmented sprocket having a smaller diameter than the respective segmented gear. Each gear segment may be attached to a shifting pin. Each gear segment pivots (or folds) in a direction transverse to the plane of the gear. In other words, each such gear segment is transitionable between a coplanar position and a pivoted (AKA folded) position. This configuration enables a segmented gear to transition (e.g., stepwise) between a coplanar configuration (i.e., with all segments aligned to form a substantially coplanar gear) and a pivoted (AKA pyramidal) configuration (i.e., with all gear segments rotationally skewed in the same direction away from the plane formed in the coplanar configuration)

The shifting of gear clusters 308, 314, 318, and 322 is substantially similar to the shifting of gear clusters 208, 214, 218, and 222, e.g., utilizing shifting system 210 as described above or shifting system 510 described below.

As shown in FIG. 30, third gear cluster 318 is configured to engage second belt 320. Second belt 320 couples a selected one of the gears to fourth gear cluster 322, thereby transmitting rotation of third gear cluster 318 to fourth gear cluster 322. Typically, second belt 320 directly engages a single one of the gears of third gear cluster 318 and fourth gear cluster 322 at any given time; however, the belt may engage more than one of the gears of the clusters at some stages of operation, such as when the belt is being shifted from one gear to another (e.g., in response to user and/or controller input). Fourth gear cluster 322 may be securely mounted on output shaft 223 (see above) such that the output shaft rotates with the fourth gear cluster.

As shown in FIG. 30, gearing system 300 includes a first belt tensioner 332. First belt tensioner 332 includes at least one idler 336 having a fixed location, at least one stationary gear 337 attached to a mounting bracket 339, and at least one adjustable gear 338 configured to be moved or translated by a pushrod 340. In the example shown in FIG. 30, first belt tensioner 332 includes two idlers. Idlers 336 have a smooth outer surface configured to engage the smooth, non-toothed side or surface of belt 320. Conversely, stationary gear 337 and adjustable gear 338 have castellations configured to engage the toothed surface of belt 320. A spring is coaxially mounted to pushrod 340 to provide a biasing force.

First belt tensioner 332 may be configured to engage any of the belts described above. In the current example, idler 336 and gears 337, 338 of first belt tensioner 332 are configured to engage belt 320. Accordingly, belt 320 interfaces with third gear cluster 318, fourth gear cluster 322, and belt tensioner 332.

First belt tensioner 332 is configured such that pushrod 340 can be utilized to linearly displace gears 338 with respect to gear 337, thereby applying more or less tension to the engaged belt. Manipulation of pushrod 340 may be manual (e.g., by a user), and/or may be automatic (e.g., using mechanical and/or electric components).

As shown in FIG. 31, first gear cluster 308 is coupled to second gear cluster 314 by first belt 312. The system is configured such that first belt 312 directly engages a single one of the gears of first gear cluster 308 and second gear cluster 314 at any given time; however, the belt may partially engage more than one of the gears of each cluster at some stages of operation, such as when the belt is being segmentally shifted from one gear to another (e.g., in response to user and/or controller input). Second gear cluster 314 is securely mounted on layshaft 216 (see above) such that rotation of second gear cluster 314 also rotates the layshaft.

Additionally, as shown in FIG. 31, gearing system 300 includes a second belt tensioner 334. Second belt tensioner 334 is configured to engage first belt 312. Accordingly, belt 312 is configured to interface with first gear cluster 308, second gear cluster 314, and belt tensioner 334.

In the example shown in FIG. 31, belt tensioner 334 includes a single idler 342 and an adjustable gear 344 attached to a pushrod 346. Idler 342 has a smooth outer surface configured to engage the non-toothed surfaced of belt 312. Conversely, adjustable gear 338 includes castellations configured to engage the toothed surface of belt 312. A spring is coaxially mounted to pushrod 340 to provide a biasing force.

Second belt tensioner 334 is configured such that pushrod 346 can be utilized to displace gear 344, thereby applying more or less tension to the engaged belt. Manipulation of pushrod 346 may be manual (e.g., by a user), and/or may be automatic (e.g., using mechanical and/or electric components).

Figure 32:
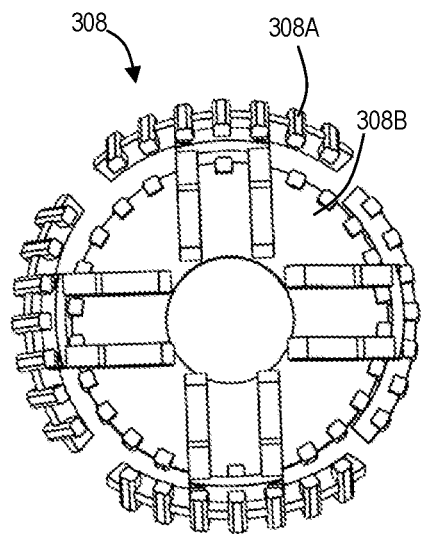
FIG. 32 is a front view of a first belt-driven gear cluster of the gearing system of FIG. 30.
Figure 33:
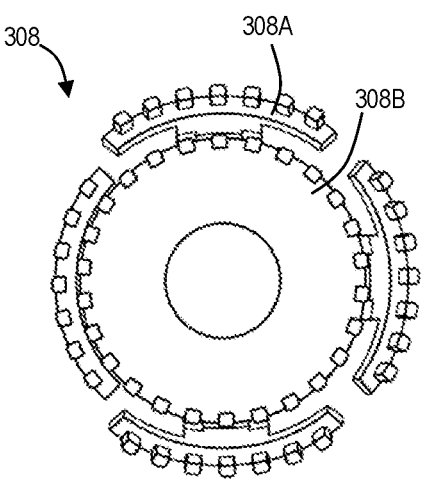
FIG. 33 is a rear view of the gear cluster of FIG. 32.
Figure 34:
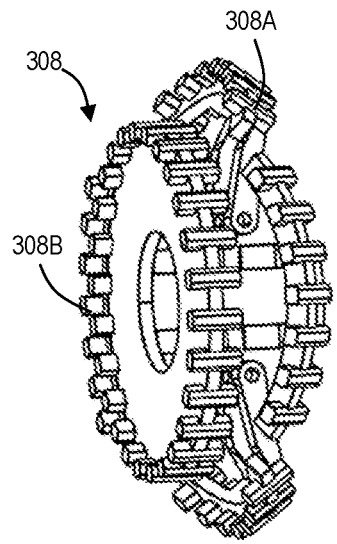
FIG. 34 is an isometric view of the gear cluster of FIG. 32.

As shown in FIGS. 32-34, first gear cluster 308 comprises a sprocket or cog 308B (e.g., a single non-segmented gear) having a first diameter and a segmented gear 308A having a second (larger) diameter. The segmented gear is capable of transitioning into and out of the same plane as the smaller sprocket. In the current example, first gear cluster 308 comprises two gears. In another example, the first gear cluster may comprise more or fewer gears. Gears are arranged within first gear cluster 308 from largest-diameter gear to smallest-diameter gear.

Each gear segment of segmented gear 308A includes a pin (e.g., pin 211) affixed in the same corresponding location as segmented gear 208A, described above. Additionally, each gear segment of segmented gear 308A is configured to include a hinge portion (e.g., hinge portion 209) in the same corresponding location as segmented gear 208A. The hinge portion is configured to mate with hinge receiver 256 disposed on spindle 206.

Figure 35:
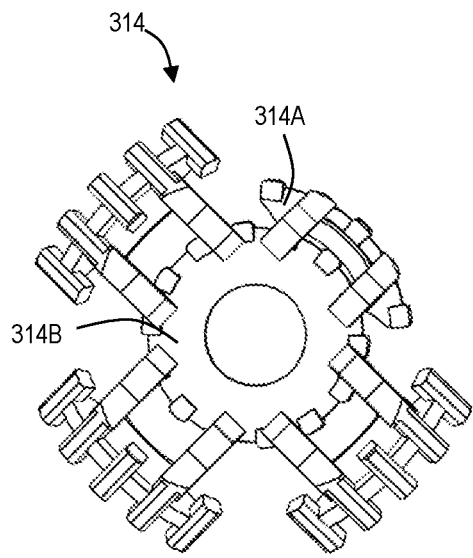
FIG. 35 is a front view of a second belt-driven gear cluster of the gearing system of FIG. 30.
Figure 36:
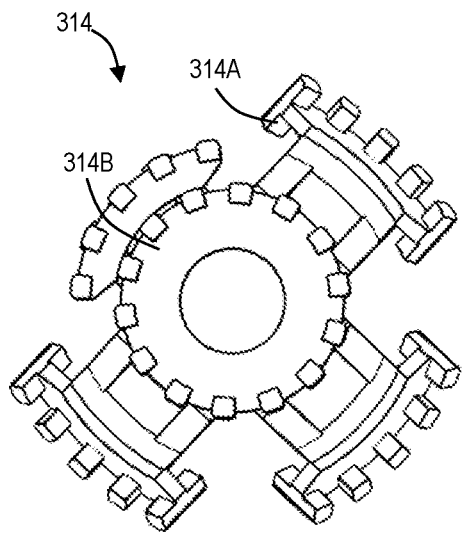
FIG. 36 is a rear view of the gear cluster of FIG. 35.
Figure 37:
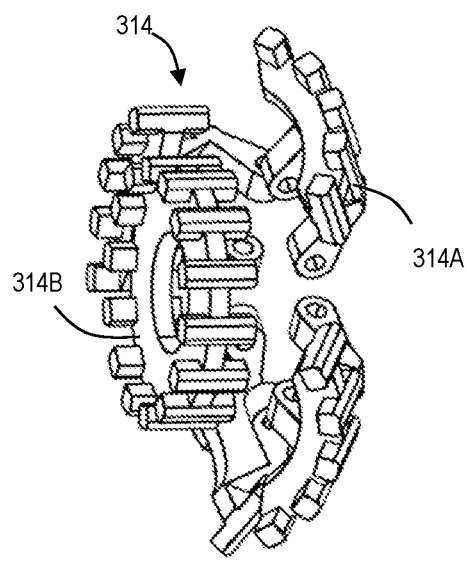
FIG. 37 is an isometric view of the gear cluster of FIG. 35.
Figure 38:
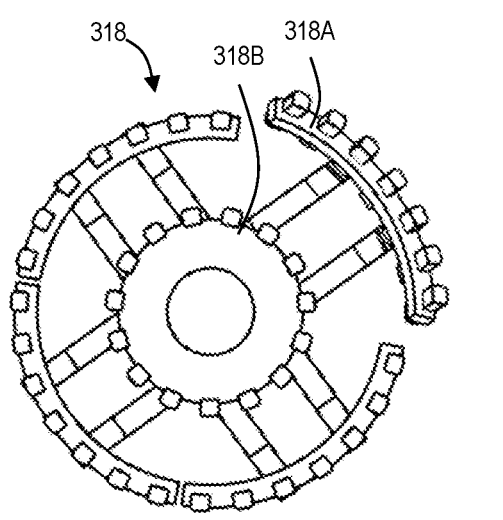
FIG. 38 is a front view of a third belt-driven gear cluster of the gearing system of FIG. 30.
Figure 39:
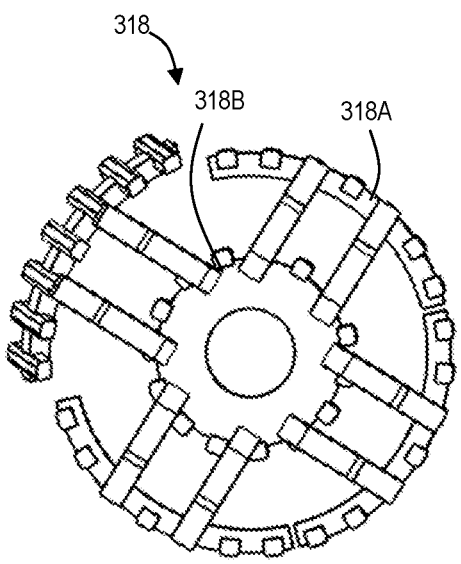
FIG. 39 is a rear view of the gear cluster of FIG. 38.
Figure 40:
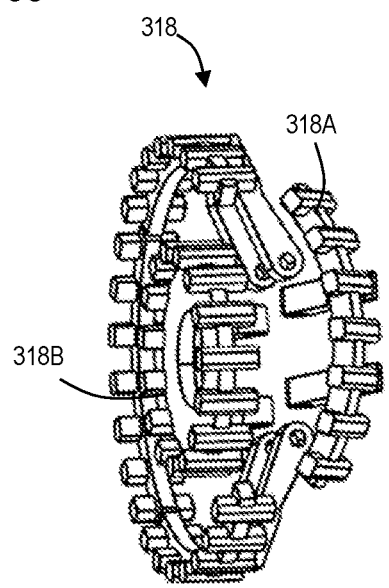
FIG. 40 is an isometric view of the gear cluster of FIG. 38.

As shown in FIGS. 35-37, second gear cluster 314 has a nested arrangement, such that a segmented gear 314A and a non-segmented sprocket 314B are nestable together. The segmented gear being capable of transitioning into and out of the same plane as the smaller sprocket. In the depicted example, second gear cluster 314 comprises two gears. In another example, the second gear cluster may comprise more or fewer gears. Gears are arranged within second gear cluster 314 from largest-diameter gear to smallest-diameter gear.

The inboard face of each gear segment of segmented gear 314A is configured to include a pin (e.g., pin 217) affixed in the same corresponding location as segmented gear 214A. Additionally, each gear segment of segmented gear 314A is configured to include a hinge portion (e.g., hinge portion 215) in the same corresponding location as segmented gear 214A. The hinge portion is configured to mate with hinge receiver 258 disposed on layshaft 216.

As shown in FIG. 38-43, third gear cluster 318 has a nested arrangement, such that a segmented gear 318A and a non-segmented sprocket 318B are nestable together. The segmented gear being capable of transitioning into and out of the same plane as the smaller sprocket. In the current example, third gear cluster 318 comprises two gears. In another example, the third gear cluster may comprise more or fewer gears. Gears are arranged within third gear cluster 318 from largest-diameter gear to smallest-diameter gear.

The inboard face of each gear segment of segmented gear 318A includes a pin (e.g., pin 226) affixed in the same corresponding location as segmented gear 218A. Additionally, each gear segment of segmented gear 318A is configured to include a hinge portion (e.g., hinge portion 219) in the same corresponding location as segmented gear 218A. The hinge portion is configured to be coupled to hinge receiver 260 disposed on layshaft 216.

Figures 41, 42:
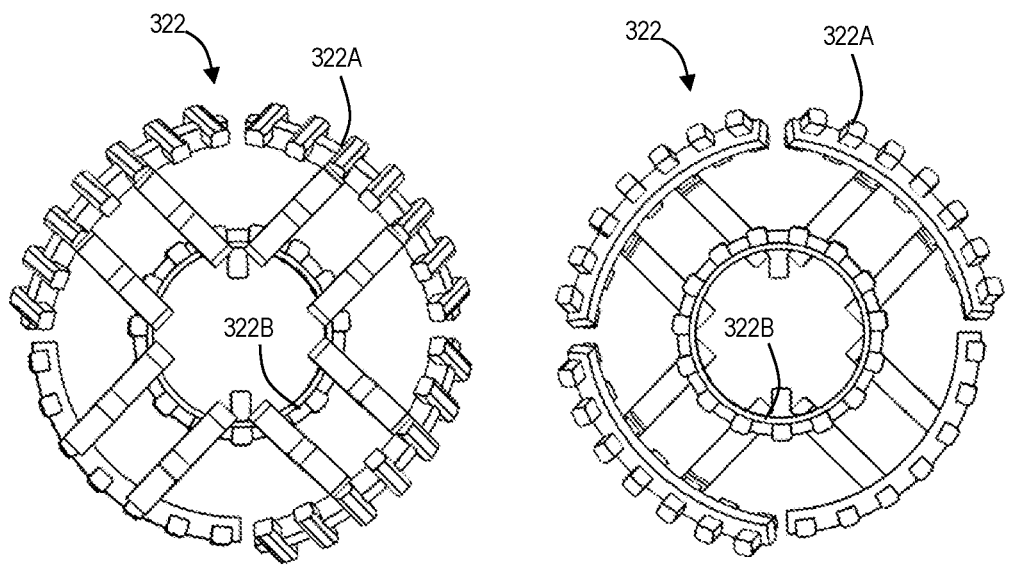
FIG. 41 is a front view of a fourth belt-driven gear cluster of the gearing system of FIG. 30.
FIG. 42 is a rear view of the gear cluster of FIG. 41.
Figure 43:
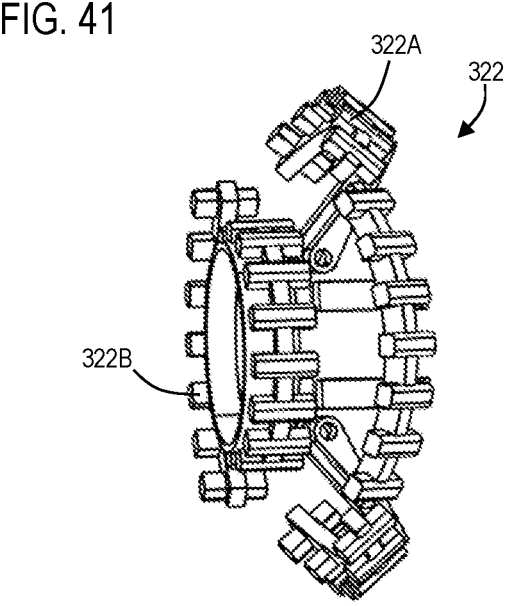
FIG. 43 is an isometric view of the gear cluster of FIG. 41.

As shown in FIG. 41-43, fourth gear cluster 322 has a nested arrangement, such that a segmented gear 322A and a non-segmented sprocket 322B are nestable together. The segmented gear being capable of transitioning into and out of the same plane as the smaller sprocket. In the current example, fourth gear cluster 322 comprises two gears. In another example, the fourth gear cluster may comprise more or fewer gears. Gears are arranged within third gear cluster 318 from largest-diameter gear to smallest-diameter gear.

The inboard face of each gear segment of segmented gear 322A has a pin (e.g., pin 227) affixed in the same corresponding location as segmented gear 222A. Sprocket 322B includes an opening for mating with output shaft 223. Each gear segment of segmented gear 322A is configured to include a hinge portion (e.g., hinge portion 221). The hinge portion is configured to mate with hinge receiver 262 disposed on layshaft 216.

In the depicted example, gearing system 300 includes two gear options for first gear cluster 308, corresponding to gears 308A and 308B. These options are identified as A1 and A2, respectively. In the current example, gearing system 300 includes two gear options for second gear cluster 314, corresponding to gears 314A and 314B. These options are identified as B1 and B2, respectively. In the current example, gearing system 300 includes two gear options for third gear cluster 318, corresponding to gears 318A and 318B. These options are identified as C1 and C2, respectively. In the current example, gearing system 300 includes two gear options for fourth gear cluster 322, corresponding to gears 322A and 322B. These options are identified as D1 and D2, respectively.

A combination of any one of the gear options of the first gear cluster 308, any one of the gear options of second gear cluster 314, any one of the gear options for third gear cluster 318, and any one of the gear options for fourth gear cluster 322 determines a gear ratio of gearing system 300. Each combination of the available options may be referred to as a "gear" and/or "speed" of the vehicle that includes gearbox 300.

An operator of the vehicle may switch between gear ratios by switching any of the selected options to another available option. For example, if the selected options are presently A1, B1, C2, and D2, the operator may change the present gear ratio by switching D2 to D1. Alternatively, or additionally, the operator may change A1 to A2, and/or may change C2 to C1. Switching gear ratios is typically achieved by actuating a mechanical and/or electronic control to pivot the gear segments of a segmented gear, thereby engaging the belt with a different gear.

D. Third Illustrative Gearbox

This section describes a gearbox 400, which is an example of gearbox 100 described above. See FIGS. 44-69.

Figure 44:
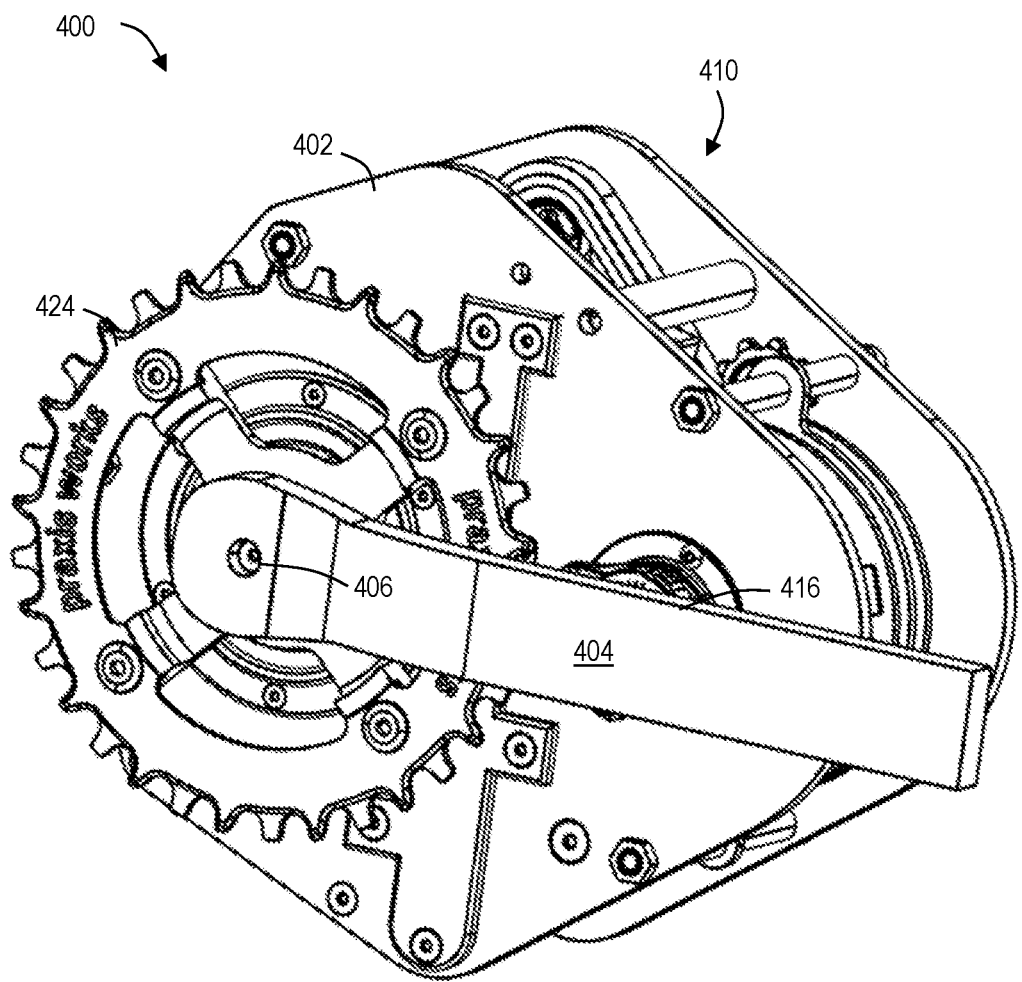
FIG. 44 is an isometric view of a gearbox which is an example of the gearbox depicted in FIG. 1.
Figure 45:
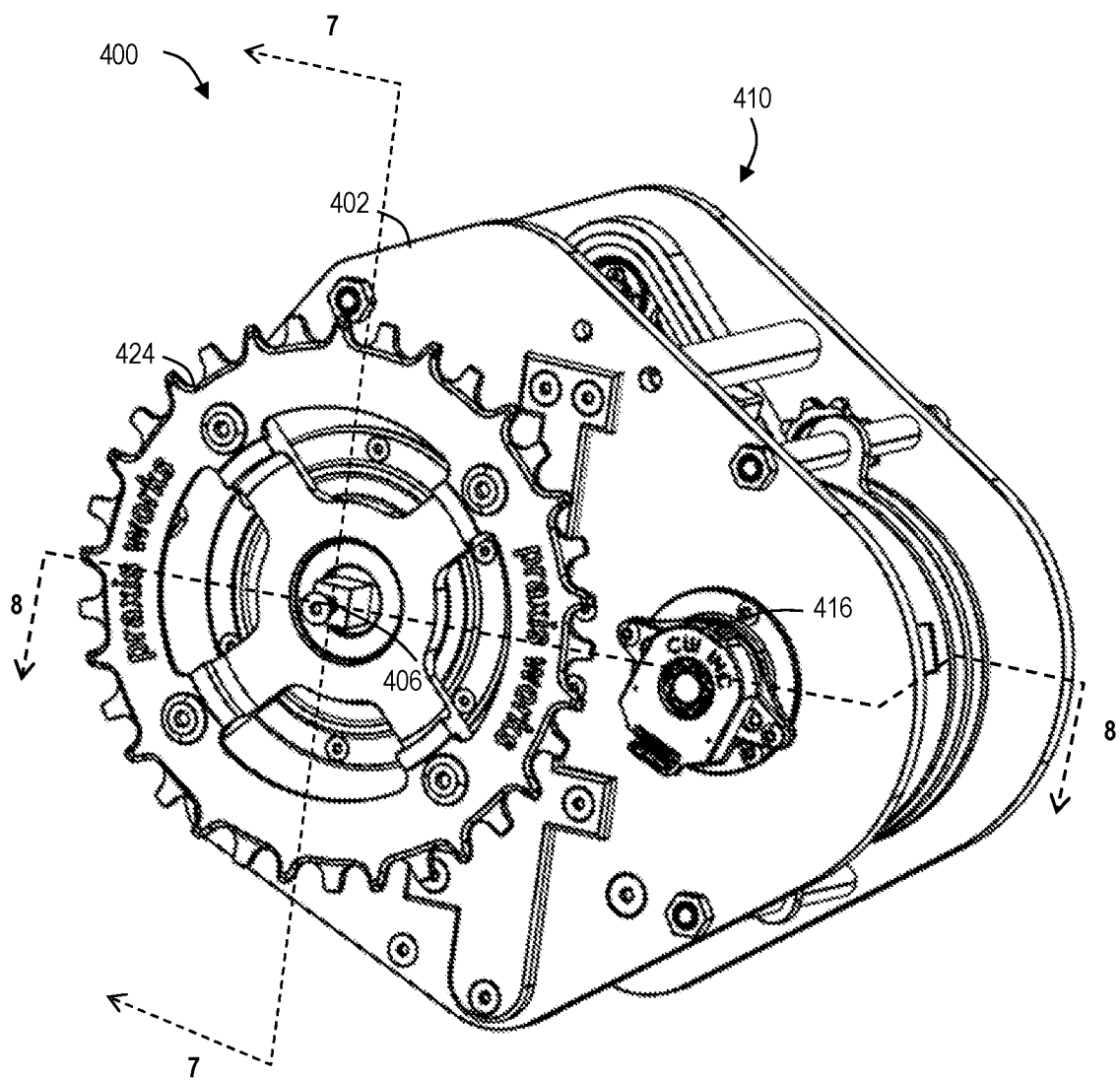
FIG. 45 is an isometric view of the gearbox of FIG. 44 with the crankarm removed.

As shown in FIGS. 44 and 45, gearbox 400 includes a housing 402. The housing at least partially contains a gearing system, as described above. An Illustrative gearing system for gearbox 400 is described further below. A spindle 406 extends through the housing. A first crankarm 404 and a second crankarm (not shown) are coupled to respective ends of spindle 406, and a chainring 424 couples gearbox 400 to a wheel (e.g., a rear wheel, via an external drive chain or belt).

FIG. 4 is a top view of gearbox 400. Gearbox 400 includes a layshaft 416 and four gear clusters: a first (input) gear cluster 408 (also referred to as cluster 1) disposed on a sheath 407 rotationally coupled to spindle 406, a second gear cluster 414 (also referred to as cluster 2) disposed on layshaft 416, a third gear cluster 418 (also referred to as cluster 3) disposed on layshaft 416, and a fourth gear cluster 422 (also referred to as cluster 4) disposed on an output shaft 423 (AKA a driven shaft), which is an example of output shaft 123. First gear cluster 408 is coupled to second gear cluster 414 by a first chain 412. Similarly, third gear cluster 418 is coupled to fourth gear cluster 422 by a second chain 420. Although chains are referred to herein, one or more belts (e.g., timing belts) may be used.

Accordingly, rotation of spindle 406 (e.g., by a bicycle rider operating pedals attached to the crankarms and/or by a motor) transmits power from first gear cluster 408 via first chain 412 to second gear cluster 414, and from the second gear cluster via the layshaft to third gear cluster 418. Second chain 420 transmits power from third gear cluster 418 to fourth gear cluster 422, and power is transmitted from the fourth gear cluster via output shaft 423 to chainring 424.

Each of the gear clusters may include a plurality of gears, one or more gears of the plurality of gears having a plurality of gear segments. Gears that have gear segments may be referred to as segmented gears. Each gear segment may be shaped as an annular sector. In some examples, each segmented gear comprises four gear segments, although more or fewer may be present. Each gear segment is pivotably attached to a hinge disposed near the center of the segmented gear.

One or more gear clusters may include a non-segmented sprocket having a smaller diameter than the respective segmented gear. Each gear segment pivots (or folds) in a direction transverse to the plane of the gear. In other words, each gear segment may transition between a coplanar position and a pivoted (AKA folded) position out of the original plane. This configuration enables the transition of a segmented gear (e.g., stepwise) between a coplanar configuration (i.e., with all segments aligned to form a substantially coplanar gear) and a pivoted (AKA pyramidal) configuration (i.e., with all gear segments rotationally skewed in the same direction away from the plane formed in the coplanar configuration)

Figure 46:
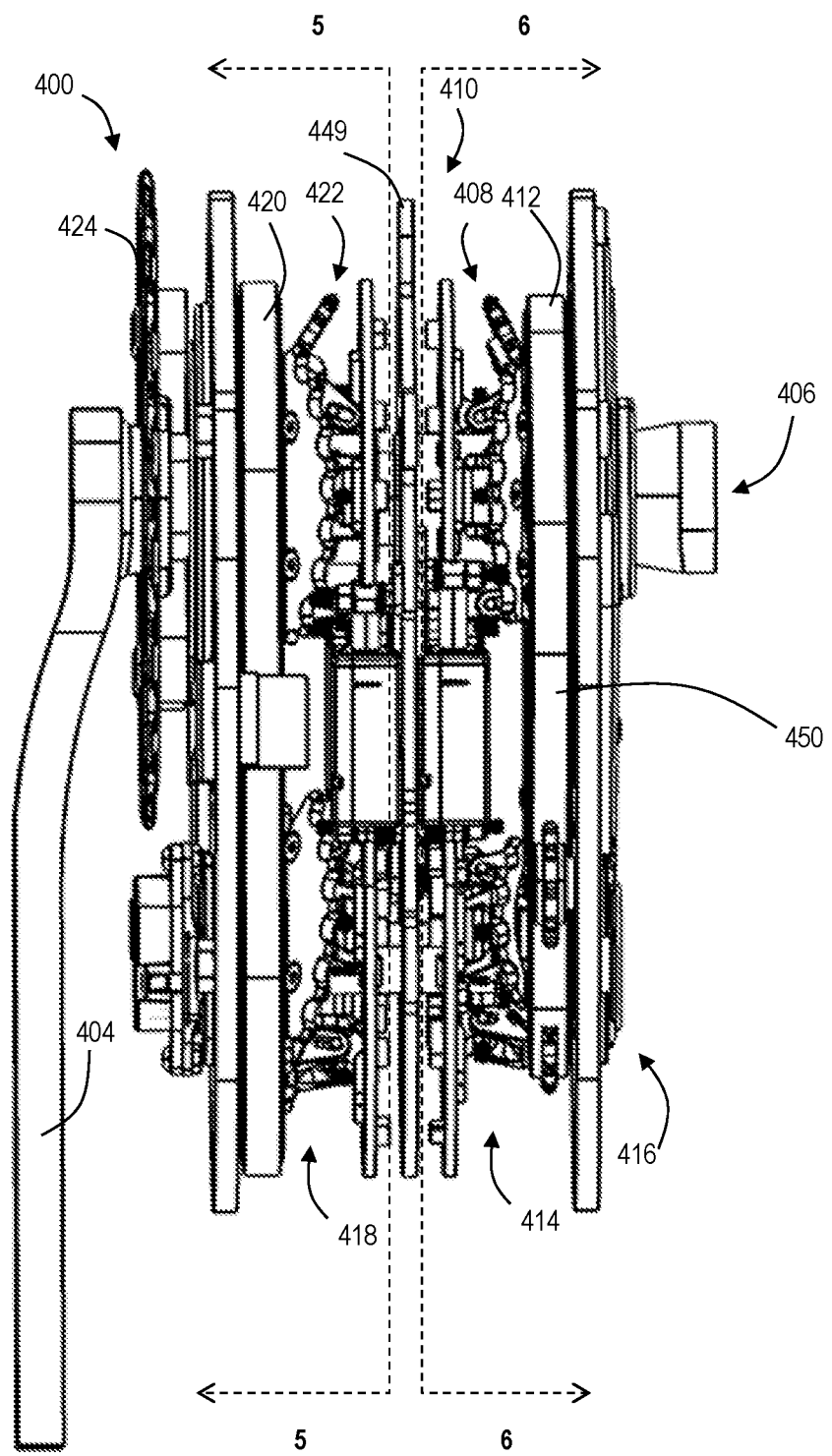
FIG. 46 is a top-down view of the gearbox of FIG. 44 with the housing removed.

As shown in FIG. 46, a shifting system 410 is disposed at within gearbox 400, in a generally central location. Shifting system 410 is an example of shifting system 110 described above. A more detailed description of shifting system 410 is provided below, with respect to FIGS. 51-57. Alternatively, shifting system 510 may be utilized, a detailed description of shifting system 510 is provided in Section E with respect to FIGS. 70-74 below.

Figure 47:
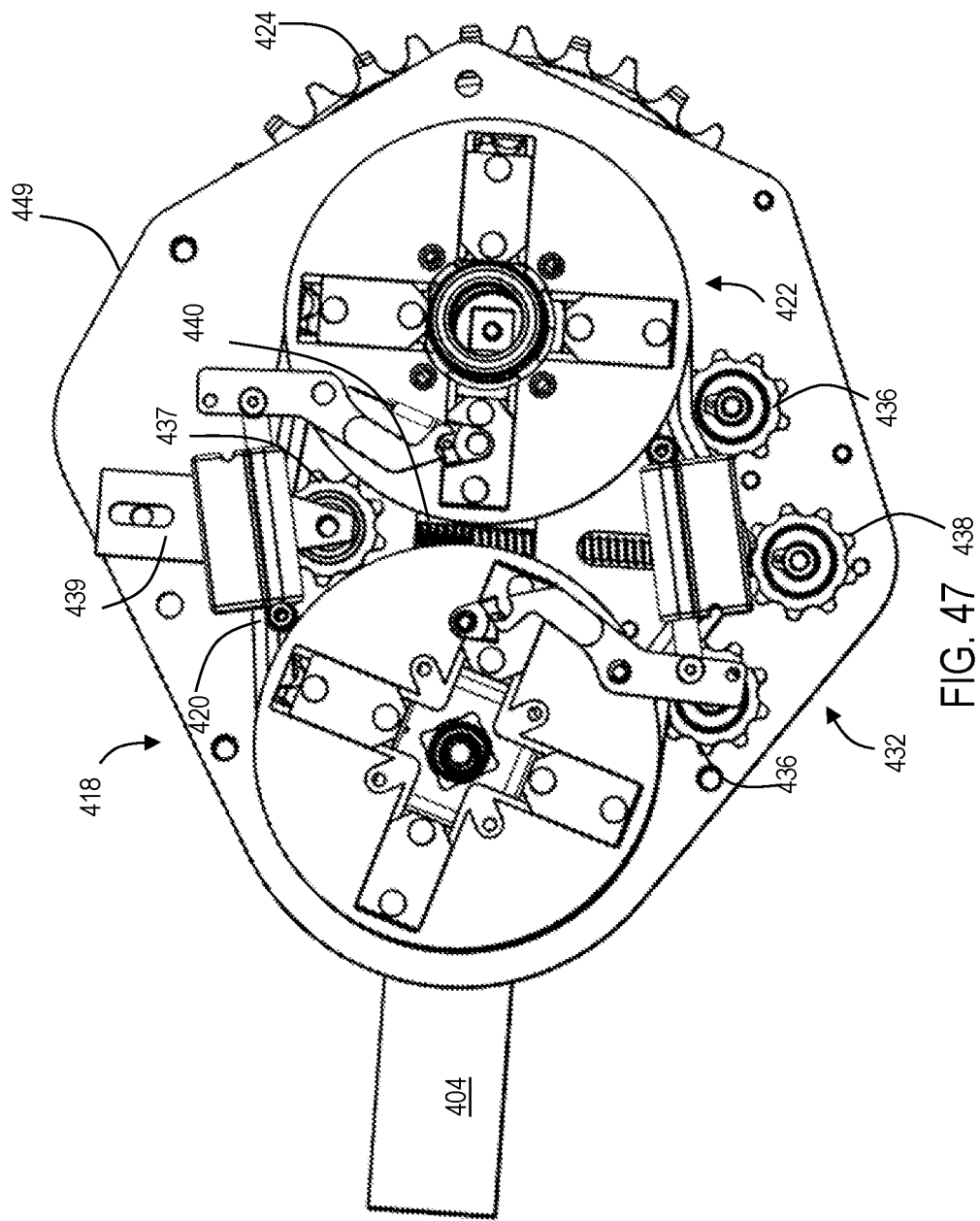
FIG. 47 is a sectional view of the gearbox of FIG. 44 taken along a line indicated in FIG. 46.

As shown in FIG. 47, gearbox 400 includes a first chain tensioner 432. First chain tensioner 432 includes at least one idler 436 having a fixed location, at least one idler 437 attached to an adjustable mounting bracket 439, and at least one adjustable gear 438 configured to be moved or translated by a pushrod 440. In the example shown in FIG. 47, first chain tensioner 432 includes two idlers. A spring is coaxially mounted to pushrod 440 to provide a biasing force.

First chain tensioner 432 may be configured to engage any of the chains described above. In the current example, idlers 436, 437 and gear 438 of first chain tensioner 432 are configured to engage chain 420. Accordingly, chain 420 interfaces with third gear cluster 418, fourth gear cluster 422, and chain tensioner 432.

First chain tensioner 432 is configured such that pushrod 440 can be utilized to linearly displace gears 438 with respect to idler 437, thereby applying more or less tension to the engaged chain. Manipulation of pushrod 440 may be manual (e.g., by a user), and/or may be automatic (e.g., using mechanical and/or electric components).

Figure 48:
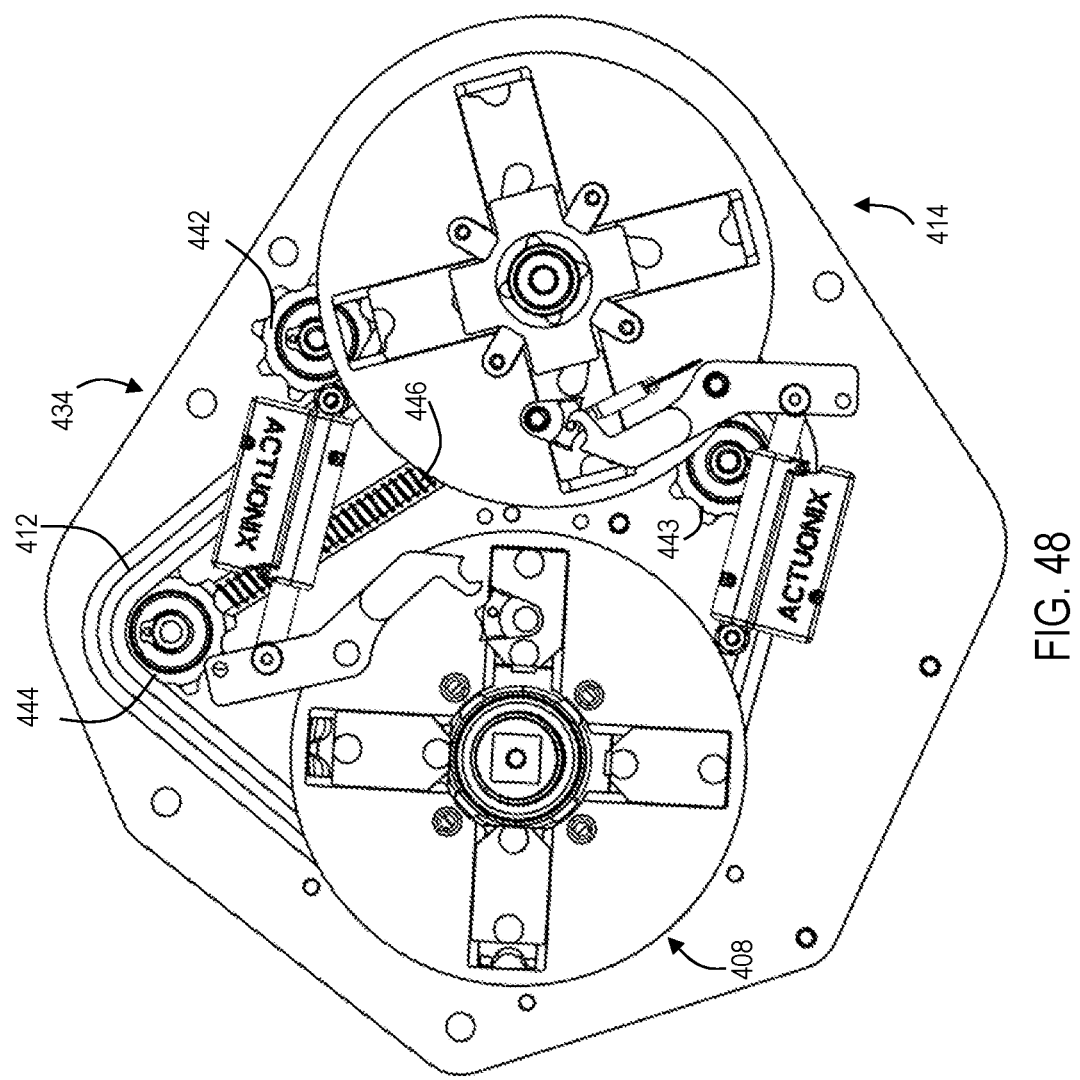
FIG. 48 is a sectional view of the gearbox of FIG. 44 taken along a line indicated in FIG. 46.

As shown in FIG. 48, first gear cluster 408 is coupled to second gear cluster 414 by first chain 412. The system is configured such that first chain 412 directly engages a single one of the gears of first gear cluster 408 and second gear cluster 414 at any given time; however, the chain may partially engage more than one of the gears of each cluster at some stages of operation, such as when the chain is being segmentally shifted from one gear to another (e.g., in response to user and/or controller input). Second gear cluster 414 is securely mounted on layshaft 416 (see above) such that rotation of second gear cluster 414 also rotates the layshaft.

Additionally, as shown in FIG. 48, gearbox 400 includes a second chain tensioner 434. Second chain tensioner 434 is configured to engage first chain 412. Accordingly, chain 412 is configured to interface with first gear cluster 408, second gear cluster 414, and chain tensioner 434.

In the example shown in FIG. 48, chain tensioner 434 includes an idler 442, a stationary gear 443, and an adjustable gear 444 attached to a pushrod 446. A spring is coaxially mounted to pushrod 446 to provide a biasing force.

Second chain tensioner 434 is configured such that pushrod 446 can be utilized to displace gear 444, thereby applying more or less tension to the engaged chain. Manipulation of pushrod 446 may be manual (e.g., by a user), and/or may be automatic (e.g., using mechanical and/or electric components).

Figure 49:
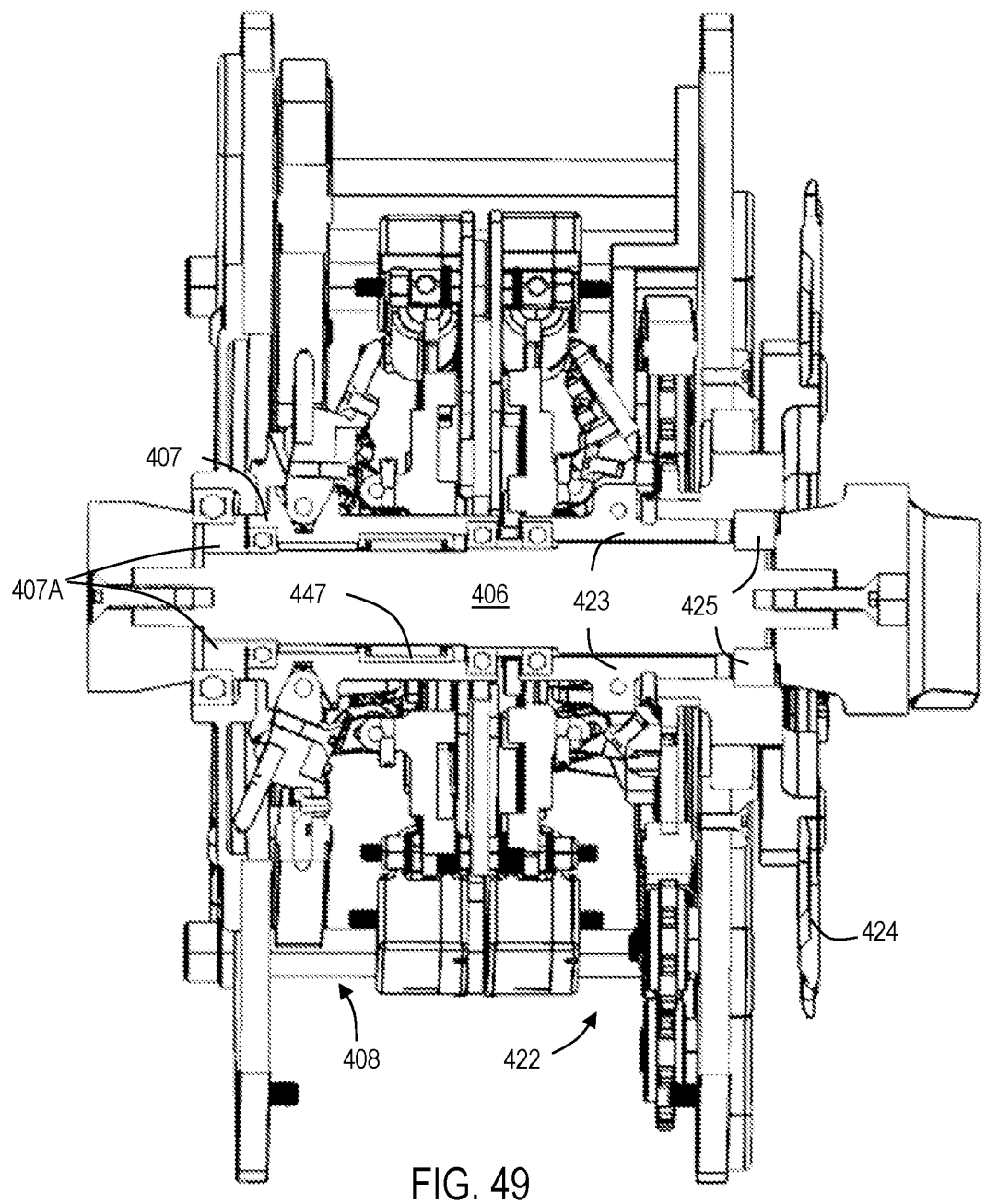
FIG. 49 is a sectional view of the gearbox of FIG. 44 taken along a line indicated in FIG. 45.

As shown in the sectional view of FIG. 49, gearbox 400 includes a sprag clutch 447 disposed coaxially between spindle 406 and sheath 407. Sprag clutch 447 is configured such that forward rotation of spindle 406 (e.g., by the pedaling of a user) causes a rotation of sheath 407 and thereby rotates first gear cluster 408. Conversely, sprag clutch 447 enables spindle 406 to freely rotate backwards without engaging sheath 407. In other words, sprag clutch 447 enables a user to pedal backwards without causing the gear clusters to similarly rotate backwards.

Figure 50:
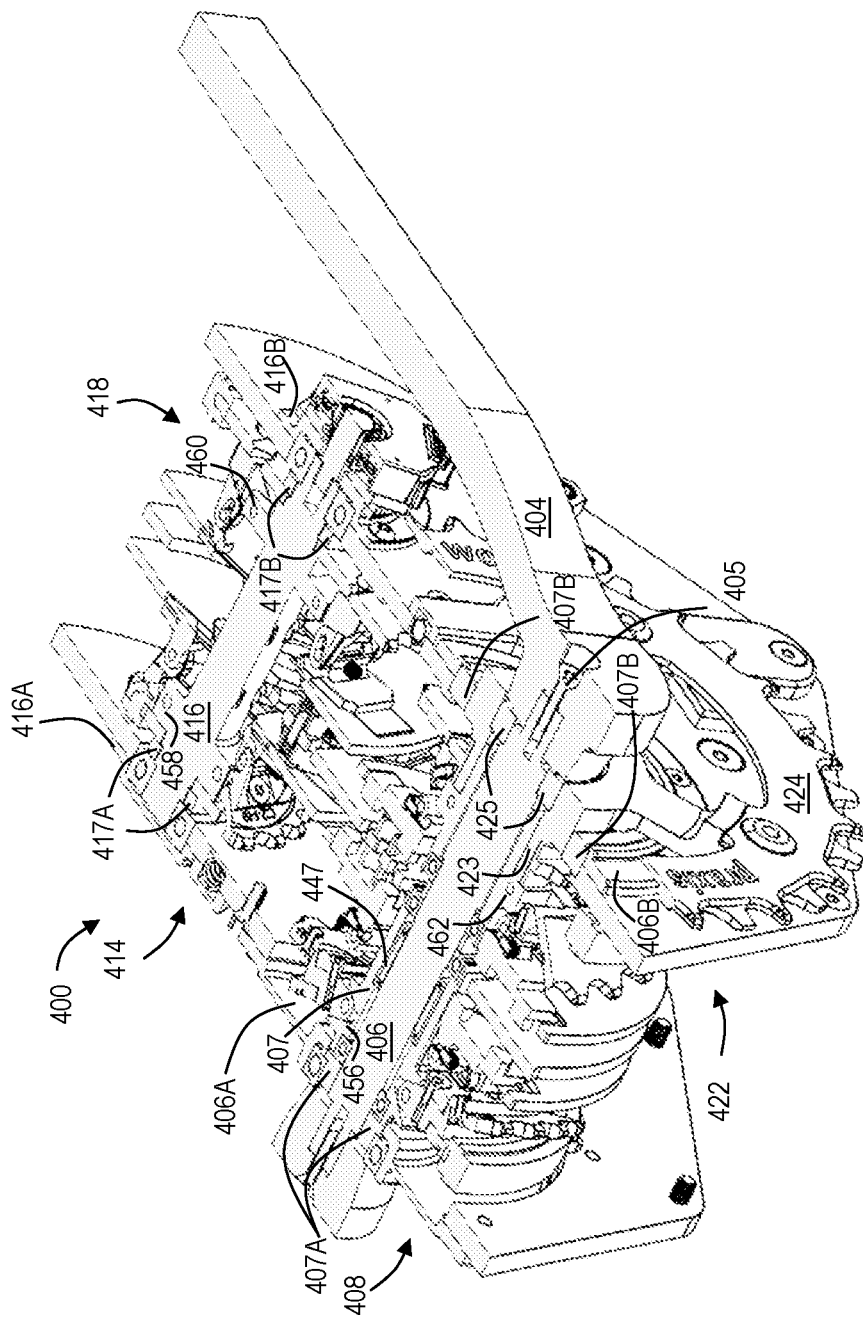
FIG. 50 is a sectional view of the gearbox of FIG. 44 taken along a line indicated in FIG. 45.

FIG. 50 depicts a sectional view of the gearing system of gearbox 400 taken at line 8-8 of FIG. 45. Crankarm 404 is coupled to spindle via crank screw 405. Output shaft 423 is situated coaxially on an end of spindle 406 and rotationally isolated from the spindle by bearings 425.

Disposed at one end of spindle 406 is a flange 406A and disposed at the opposite end, encircling output shaft 423 is a flange 406B. Spindle 406 is rotationally isolated from flange 406A via bearing 407A, and similarly, output shaft 423 is rotationally isolated from flange 406B via bearing 407B.

Similarly, disposed at one end of layshaft 416 is a flange 416A and disposed at the opposite end is a flange 416B. Layshaft 416 is rotationally isolated from flange 416A via bearing 417A, and similarly, layshaft 416 is rotationally isolated from flange 416B via bearing 417B.

In the current example, first gear cluster 408 comprises two segmented gears, 408A and 408B. Affixed to each gear segment of segmented gear 408A is a hinge knuckle 411. Each gear segment of segmented gear 408A additionally shares a common hinge portion 409 with a corresponding gear segment of segmented gear 408B, in a fixed angular relationship. Hinge portion 409 is configured to mate with a hinge receiver 456 disposed on sheath 407. Hinge receiver 456 may be unitary with sheath 407 or may be affixed by a suitable mechanism (e.g., screws, friction fit, etc.). Corresponding segments of the two gears are configured to pivot together, rather than independently (see FIGS. 58-60). In other words, when a segment of gear 408A is shifted out of the plane of chain 412, the corresponding segment of 408B is brought into the plane of chain 412 (thereby engaging the chain).

First gear cluster 408 is coupled to second gear cluster 414 by first chain 412. The system is configured such that first chain 412 directly engages a single one of the gears of first gear cluster 408 and a single one of the gears of second gear cluster 414 at any given time; however, the chain may partially engage more than one of the gears of each cluster at some stages of operation, such as when the chain is being segmentally shifted from one gear to another (e.g., in response to user and/or controller input).

Second gear cluster 414 is securely mounted on layshaft 416 such that rotation of second gear cluster 414 also rotates the layshaft. Second gear cluster 414 has a nested arrangement, such that a segmented gear 414A and a non-segmented sprocket 414B are nestable together (see FIGS. 61-21). Sprocket 414B mates with layshaft 416 in the space between hinge receiver 458 and flange 416A. Similarly, sprocket 418B mates with layshaft 416 in the space between hinge receiver 460 and flange 416B. Affixed to the inboard face of each gear segment of segmented gear 414A is a hinge knuckle 417. Each gear segment of segmented gear 414A includes a hinge portion 415 coupled to a hinge receiver 458 disposed on layshaft 416. Hinge receiver 458 may be unitary with layshaft 416 or may be affixed by a suitable fastening mechanism (e.g., screws, friction fit, etc.).

Figure 64:
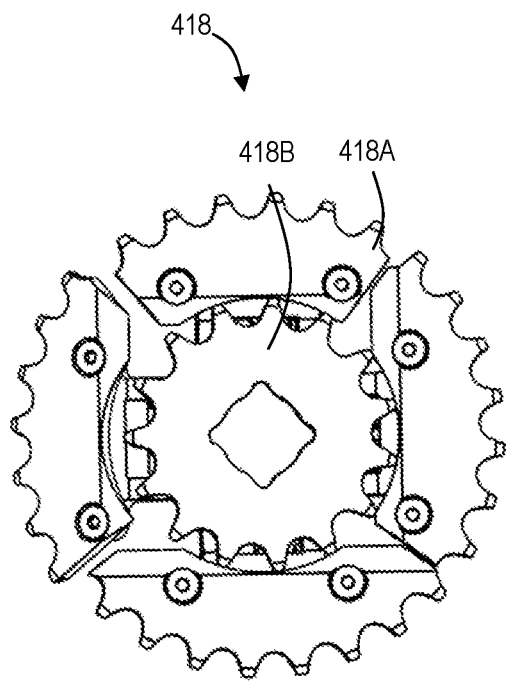
FIG. 64 is a front view of an illustrative third gear cluster in accordance with aspects of the present disclosure.

Third gear cluster 418 comprises a segmented gear 418A and a non-segmented sprocket 418B nestable therein (see FIGS. 64-24). Affixed to the inboard face of each gear segment of segmented gear 418A is a hinge knuckle 426. Each gear segment of segmented gear 418A includes a hinge portion 419 coupled to a hinge receiver 460 disposed on layshaft 416. Hinge receivers 458 and 460 may be unitary with layshaft 416 or may be affixed by a suitable mechanism (e.g., screws, friction fit, etc.).

Third gear cluster 418 is configured to engage second chain 420. Second chain 420 couples a selected one of the gears to fourth gear cluster 422, thereby transmitting rotation of third gear cluster 418 to fourth gear cluster 422. Typically, second chain 420 directly engages a single one of gears of third gear cluster 418 and fourth gear cluster 422 at any given time; however, the chain may engage more than one of the gears of the clusters at some stages of operation, such as when the chain is being shifted from one gear to another (e.g., in response to user and/or controller input).

Fourth gear cluster 422 is securely mounted on output shaft 423 such that the output shaft rotates with the fourth gear cluster. Fourth gear cluster 422 comprises a segmented gear 422A and a non-segmented sprocket 422B (see FIGS. 65-27). Affixed to the inboard face of each gear segment of segmented gear 422A is a hinge knuckle 427. Sprocket 422B includes an opening for mating with output shaft 423. Each gear segment of segmented gear 422A includes a hinge portion 421 configured to mate with a hinge receiver 462 disposed on output shaft 423. Hinge receiver 462 may be unitary with output shaft 423 or may be attached by a suitable mechanism (e.g., screws, friction fit, etc.).

Hollow output shaft 423 (AKA an output sleeve) surrounds and is coaxial with spindle 406, such that the output shaft and the spindle are freely able to rotate independently of one another. Output shaft 423 is affixed to chainring 424 (e.g., by a spider), such that the chainring rotates with the output shaft independently of the spindle. Chainring 424 thus transmits power from gearbox 400 to an external system, typically a rear wheel of a bicycle or another suitable wheel or vehicle.

Gearbox 400 utilizes a shifting system for transitioning the segmented gears between the coplanar configuration and the pivoted configuration. In general, gearbox 400 may utilize shifting system 410 described immediately below, or any other suitable system, such as shifting system 510 described in Section C with respect to FIGS. 70-74.

Figure 51:
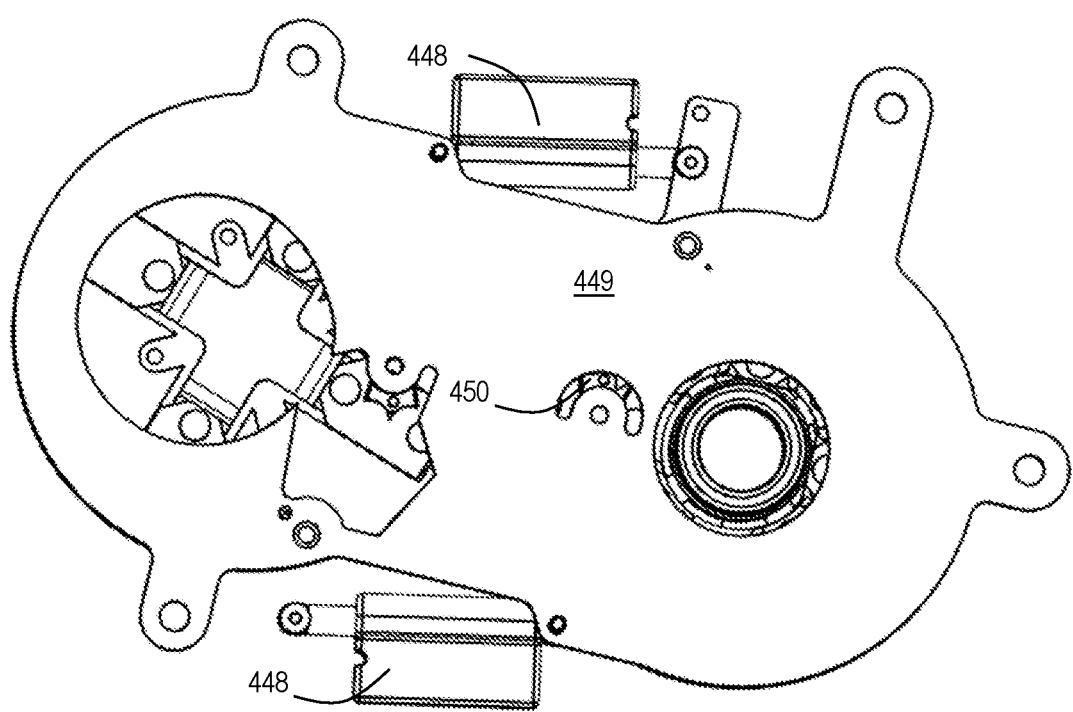
FIG. 51 is a profile view of an illustrative shifting system for use with the gearbox of FIG. 44.

Turning now to FIG. 51, shifting system 410 is depicted. Shifting system 410 includes a plurality of actuators 448 and a plurality of toggles 450, each of the actuators and toggles coupled to a mounting plate 449. Mounting plate 449 is disposed at a central location in gearbox 400, such that one actuator and one toggle correspond to each of the four gear clusters. Each actuator 448 may include a respective linear actuator (e.g., under control of an electronic controller and/or a user) coupled to a pivoting actuator arm.

Figure 52:
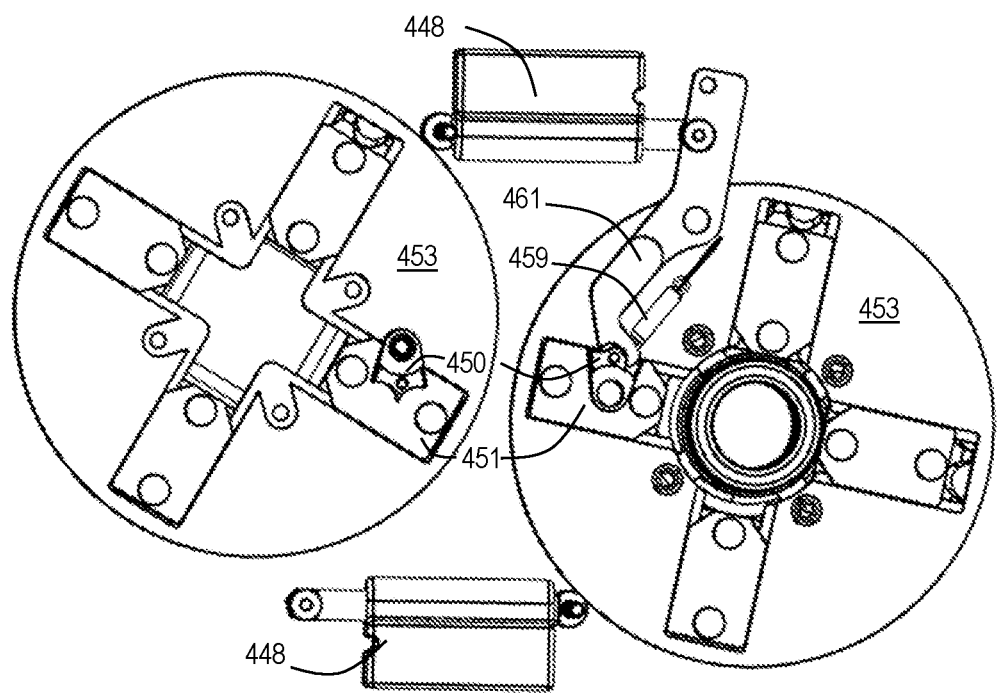
FIG. 52 is a profile view of the shifting system of FIG. 51 with the mounting plate removed.
Figure 53:
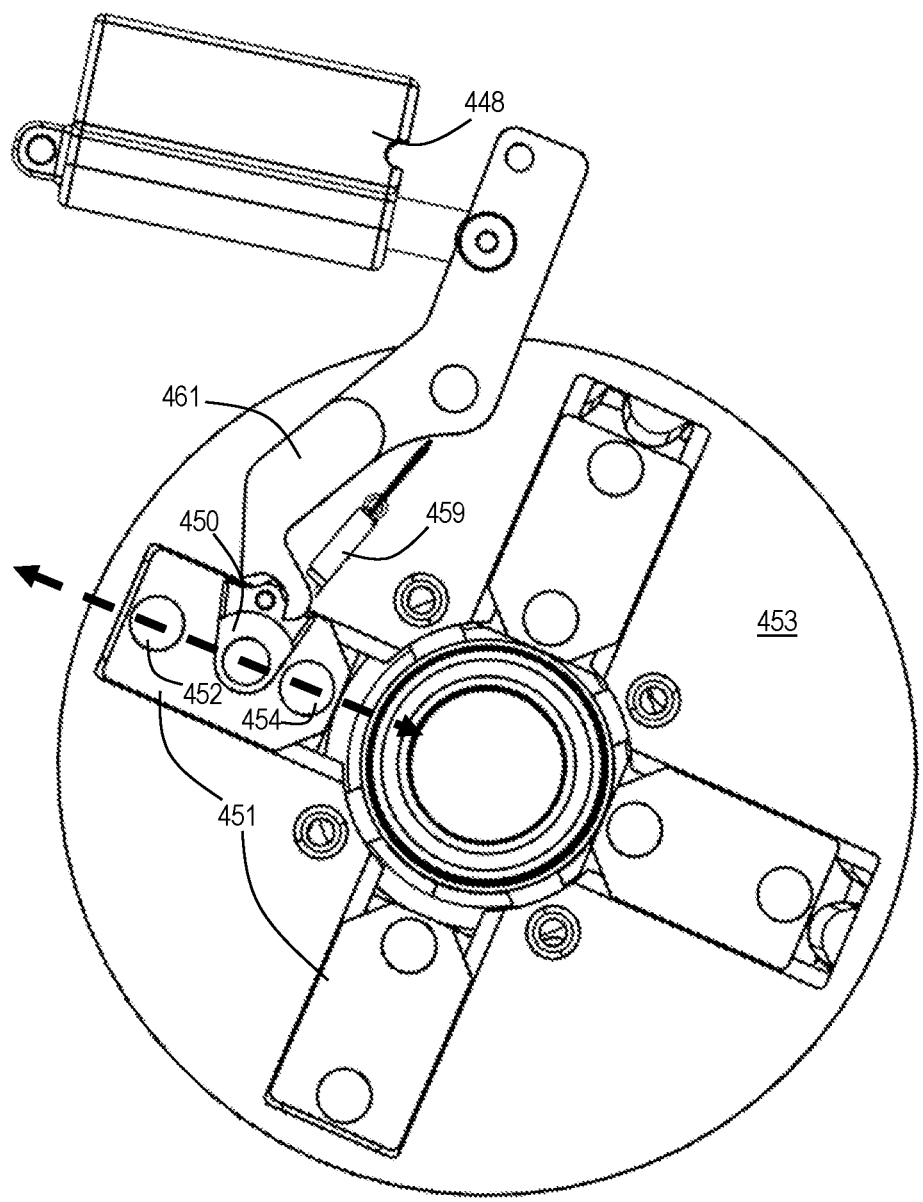
FIG. 53 is a profile view of the shifting system of FIG. 51 for use with a single gear cluster.

As shown in FIGS. 52 and 53, actuator 448 is configured to engage and manipulate toggle 450. Toggle 450 is configured to selectively and mechanically interface with portions of a plurality of shifting sliders 451 seated within a guiding plate 453. Each shifting slider is coupled to a gear segment of each of the segmented gears (e.g., segmented gears 408A, 414A, 418A, and 422A).

Shifting slider 451 includes a pair of protrusions referred to herein as first protrusion 452 and second protrusion 454, generally configured such that rotation of the corresponding gear cluster causes the shifting slider 451 to rotate, thus bringing first and second protrusions 452, 454 to opposing sides of toggle 450. Actuator 448 is configured to selectively transition between two positions, e.g., by way of a linear actuator under control of an electronic controller, thereby causing toggle 450 rotate, by way of lever 461, between two corresponding positions—one position for each of first and second protrusions 452, 454. The two positions of toggle 450 are herein referred to as a first position and a second position.

When toggle 450 is in the first position, rotation of the gear cluster (and therefore guiding plate 453 and shifting slider 451) causes toggle 450 to strike first protrusion 452 thereby pushing shifting slider 451 in a generally outward direction. Conversely, when toggle 450 is in the second position, rotation of the gear cluster causes toggle 450 to strike second protrusion 454 thereby pushing shifting slider 451 in a generally inward direction. In other words, actuator 448 and toggle 450 are configured to selectively transition shifting slider 451 in a radial direction between two positions, e.g., along the arrow in FIG. 11.

A retention spring 459 is configured to provide a biasing force on toggle 450, such that toggle 450 is retained in a neutral position resting against lever 461 when toggle 450 is not engaging first or second protrusions 452, 454. Retention spring 459 and toggle 450 are configured such that the neutral position of toggle 450 corresponds to the toggle being between generally between first and second protrusions 452, 454. In the neutral position, toggle 450 does not engage (i.e., strike) either the first or second protrusions. In other words, when toggle 450 is in the neutral position, the gear ratio of the corresponding gear cluster is not changed. Additionally, retention spring 459 enables toggle 450 to stay generally immobile when gearbox 400 is agitated or otherwise jolted.

Figure 54:
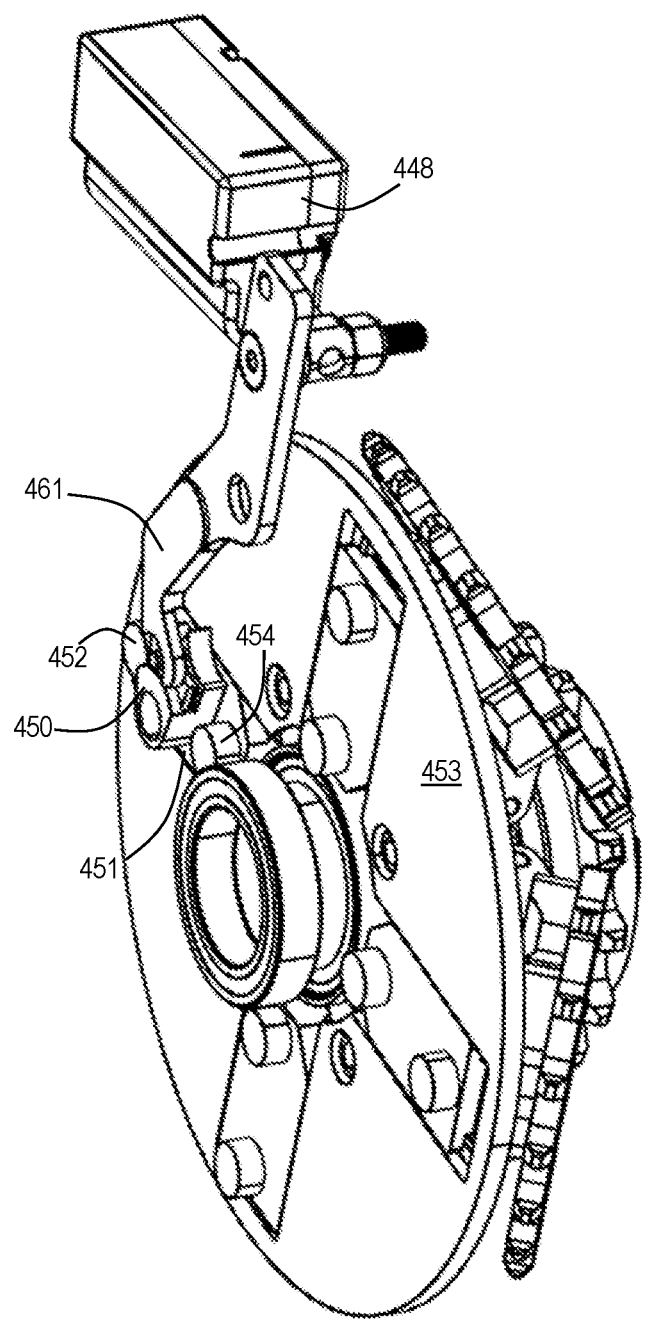
FIG. 54 is an isometric view of the shifting system of FIG. 53 further depicting an illustrative gear cluster.
Figure 55:
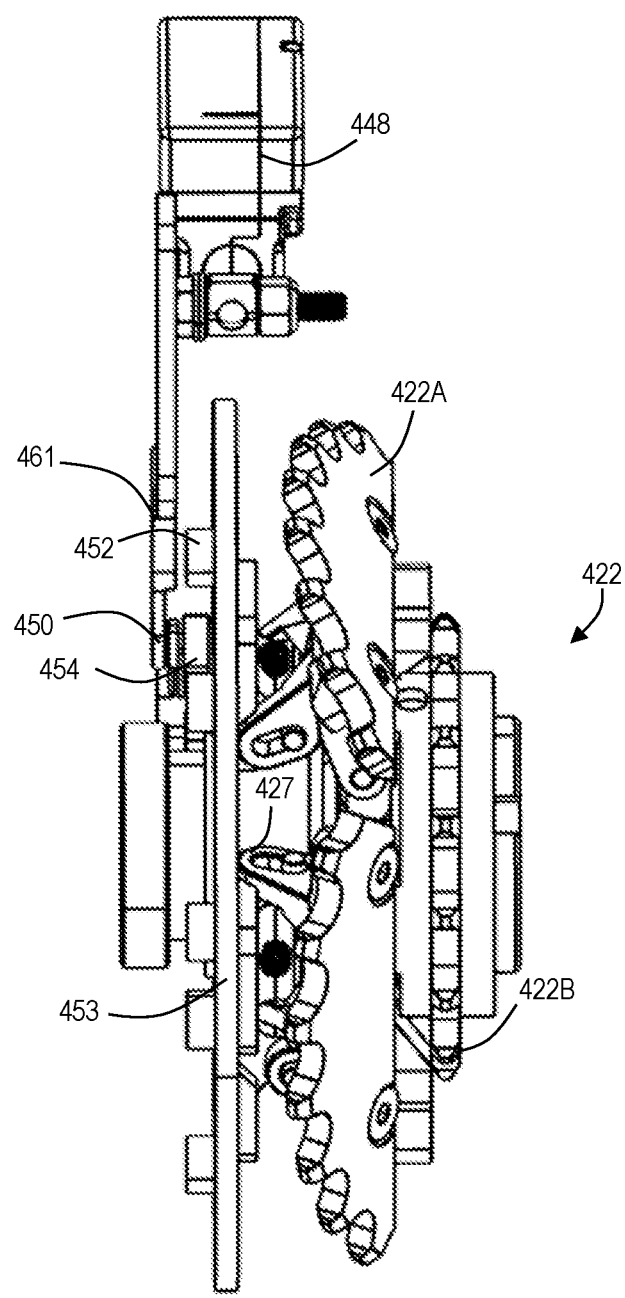
FIG. 55 is a front view of the shifting system of FIG. 53 further depicting a gear cluster.

After shifting slider 451 is transitioned to either of the two positions, the protrusions pass toggle 450 and the biasing force of retention spring 459 returns toggle 450 to the neutral position. As shown in FIGS. 54 and 55, each shifting slider 451 is coupled to a gear segment of the segmented gears. The linear translation of shifting slider 451 between the two positions causes the respective gear segment to rotate between the coplanar and pivoted positions described above. In the example depicted in FIGS. 51-55, the first position of toggle 450 corresponds to the coplanar position of the segmented gears. Accordingly, the second position of toggle 450 corresponds to the pivoted position of the segmented gears.

Figure 56:
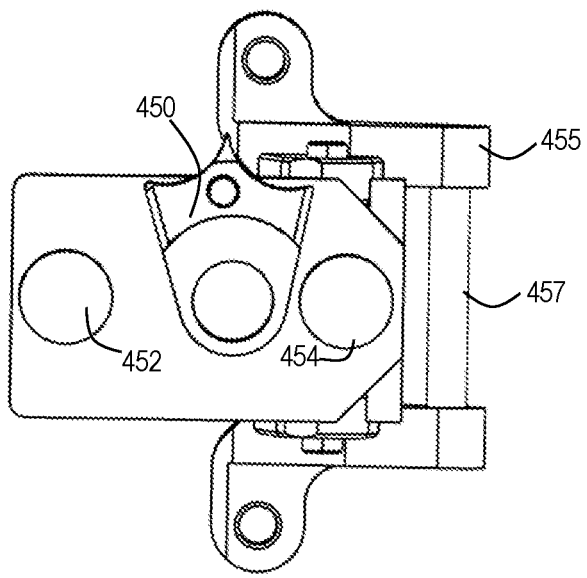
FIG. 56 is a front view of an illustrative shifting slider and toggle of the shifting system of FIG. 9.
Figure 57:
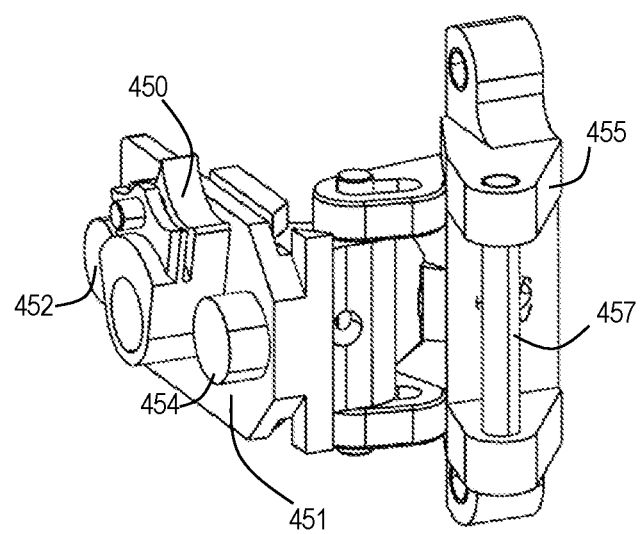
FIG. 57 is an isometric view of the shifting slider and toggle of FIG. 56.

As shown in FIGS. 56 and 57, each shifting slider 451 is coupled to a hinge 455 having a hinge pin 457. Shifting slider 451 and hinge 455 have a fixed relationship such that linear translation of shifting slider 451 causes rotation of hinge 455. Each hinge knuckle of the corresponding gear segments (i.e., hinge knuckles 411, 417, 426, 427) is configured to couple to hinge pin 457. This configuration enables the transition of the segmented gears between the coplanar and pivoted positions by the translation of the shifting slider as described above.

FIGS. 58-69 depict the first, second, third, and fourth gear clusters in isolation.

Figure 58:
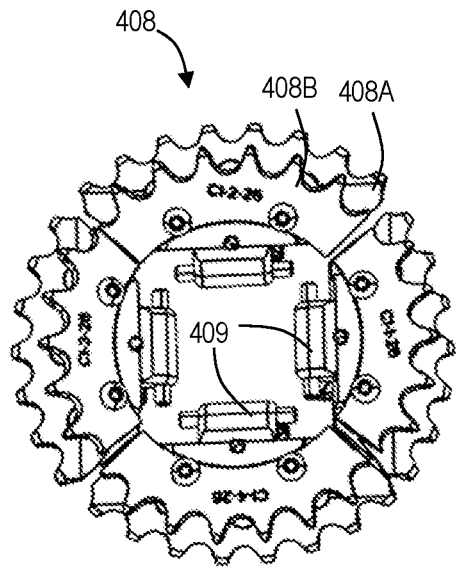
FIG. 58 is a front view of an illustrative first gear cluster in accordance with aspects of the present disclosure.
Figure 59:
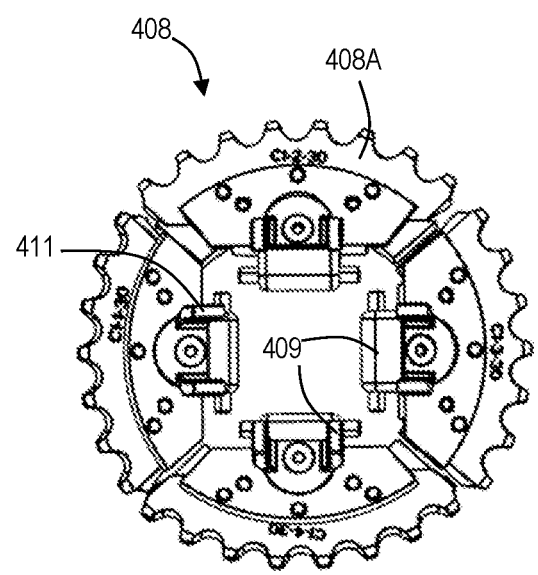
FIG. 59 is a rear view of the gear cluster of FIG. 58.
Figure 60:
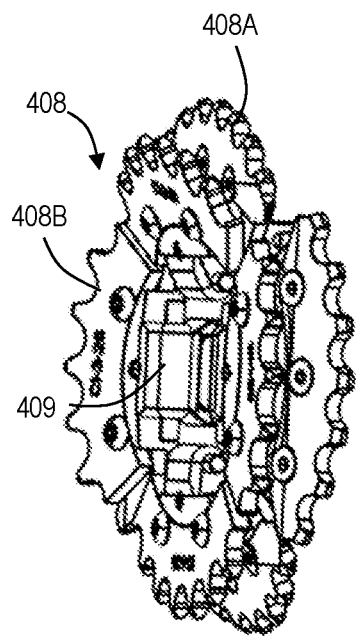
FIG. 60 is an isometric view of the gear cluster of FIG. 58.

As shown in FIGS. 58-60, first gear cluster 408 comprises a plurality of segmented gears having different diameters. In the current example, first gear cluster 408 comprises two gears (one inboard and one outboard). In another example, the first gear cluster may comprise more or fewer gears. Gears are arranged within first gear cluster 408 from largest-diameter gear to smallest-diameter gear. Each segment of the segmented gear 408A shares a hinge with a corresponding segment of segmented gear 408B.

Figure 61:
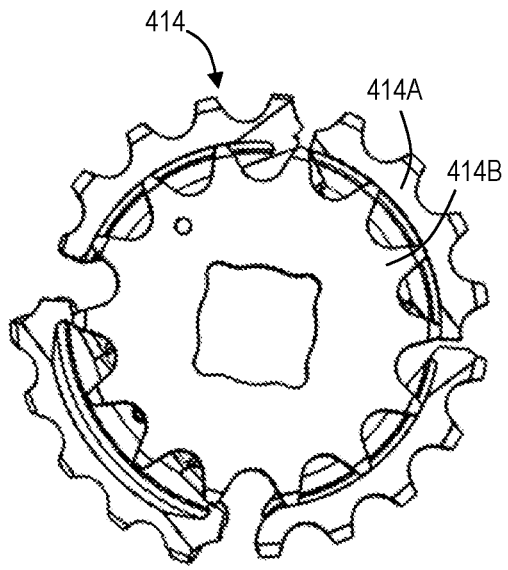
FIG. 61 is a front view of an illustrative second gear cluster in accordance with aspects of the present disclosure.
Figure 62:
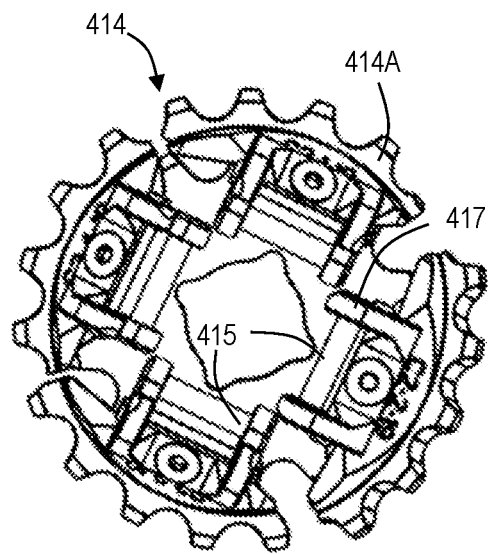
FIG. 62 is a rear view of the gear cluster of FIG. 61.
Figure 63:
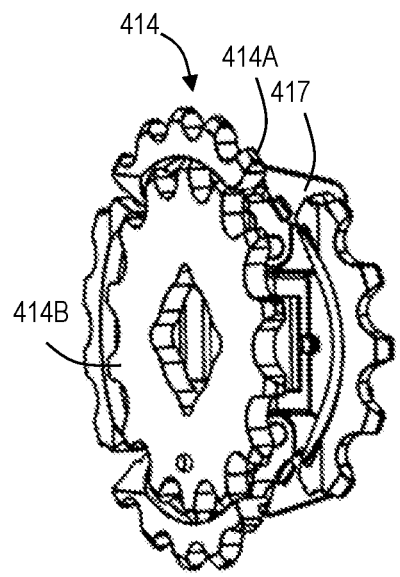
FIG. 63 is an isometric view of the gear cluster of FIG. 61.

As shown in FIGS. 61-63, second gear cluster 414 comprises a sprocket or cog (e.g., a single non-segmented gear) having a first diameter and a segmented gear having a second (larger) diameter, the segmented gear being capable of transitioning into and out of the same plane as the smaller sprocket.

Figure 65:
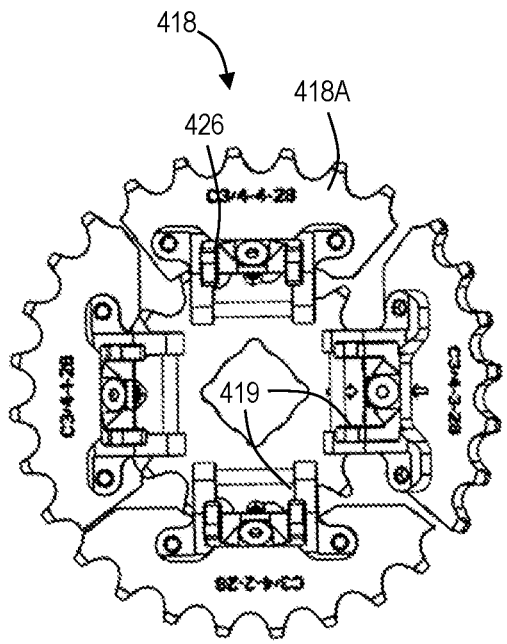
FIG. 65 is a rear view of the gear cluster of FIG. 64.
Figure 66:
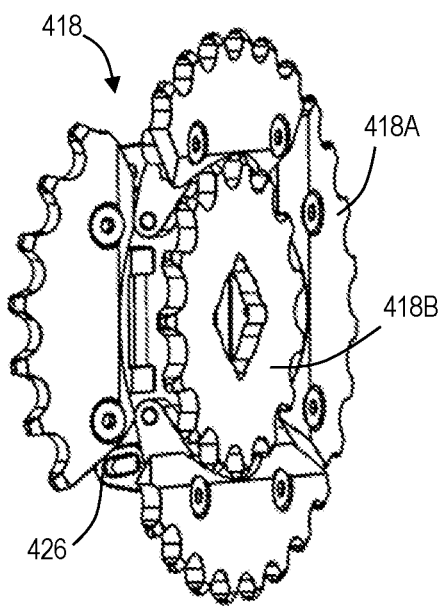
FIG. 66 is an isometric view of the gear cluster of FIG. 64.
Figure 67:
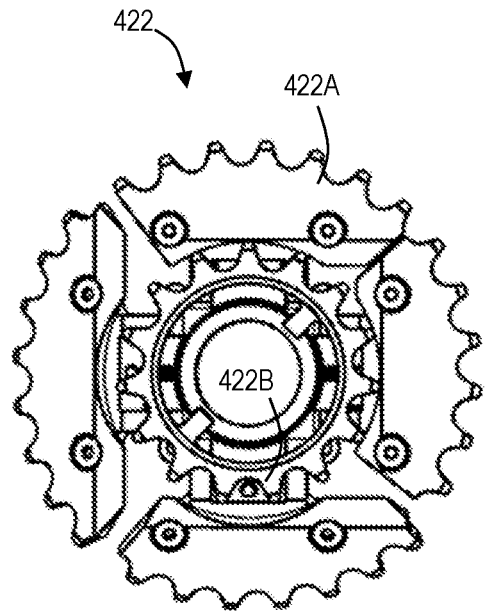
FIG. 67 is a front view of an illustrative fourth gear cluster in accordance with aspects of the present disclosure.
Figure 68:
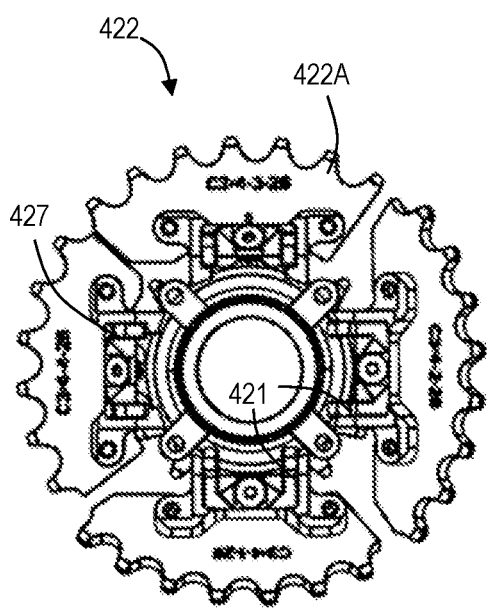
FIG. 68 is a rear view of the gear cluster of FIG. 67.
Figure 69:
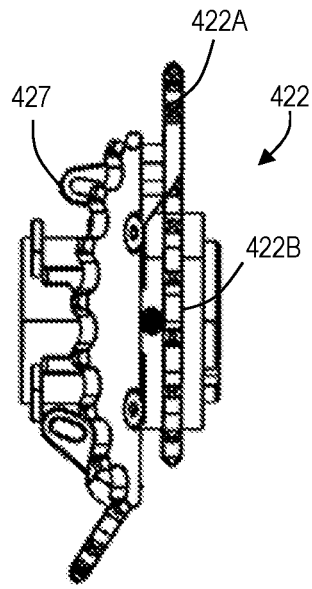
FIG. 69 is an isometric view of the gear cluster of FIG. 67.

As shown in FIGS. 64-66, third gear cluster 418 includes a non-segmented cog or sprocket having a first diameter and a segmented gear having a second (larger) diameter, the segmented gear being capable of transitioning into and out of the same plane as the smaller sprocket.

As shown in FIGS. 65-69, fourth gear cluster 422 comprises a cog having a first diameter and a segmented gear having a second (larger) diameter, the segmented gear being capable of transitioning into and out of the same plane as the smaller sprocket.

In the current example, gearbox 400 includes two gear options for first gear cluster 408, corresponding to gears 408A and 408B. These options may be identified as A1 and A2, respectively. In the current example, gearbox 400 includes two gear options for second gear cluster 414, corresponding to gears 414A and 414B. These options may be identified as B1 and B2, respectively. In the current example, gearbox 400 includes two gear options for third gear cluster 418, corresponding to gears 418A and 418B. These options may be identified as C1 and C2, respectively. In the current example, gearbox 400 includes two gear options for fourth gear cluster 422, corresponding to gears 422A and 422B. These options may be identified as D1 and D2, respectively.

A combination of any one of the gear options of the first gear cluster 408, any one of the gear options of second gear cluster 414, any one of the gear options for third gear cluster 418, and any one of the gear options for fourth gear cluster 422 determines a gear ratio of gearbox 400. Each combination of the available options may be referred to as a "gear" and/or "speed" of the vehicle that includes gearbox 400.

An operator of the vehicle may switch between gear ratios by switching any of the selected options to another available option. For example, if the selected options are presently A1, B1, C2, and D2, the operator may change the present gear ratio by switching D2 to D1. Alternatively, or additionally, the operator may change A1 to A2, and/or may change C2 to C1. Switching gear ratios is typically achieved by actuating a mechanical and/or electronic control to pivot the gear segments of a segmented gear, thereby engaging the chain with a different gear.

E. Illustrative Shifting System

This section describes a shifting system 510. See FIGS. 70-74. Shifting system 510 is configured to be utilized in gearbox 100, gearbox 200 and/or gearbox 400 as a direct replacement for shifting system 110, shifting system 210 and shifting system 410, respectively. Shifting system 510 is analogous to shifting system 410, with differences described below. Additionally, or alternatively, shifting system 510 may be utilized with any drivetrain including a pivoting segmented gear and/or segmented gear cluster (i.e., independent of a gearbox). For example, shifting system 510 may be utilized in the drivetrain of a bicycle, electric bicycle, or motorcycle having one or more segmented chainrings and/or cassette cogs.

The shifting system includes a pivoting toggle configured to interact with a respective segment actuator of each of the segments of the inboard gear of a given gear cluster. This toggle causes each of the segments of the gear to selectively transition into and out of the plane of the belt or chain, such that the belt or chain is switched to a different gear (e.g., having a different diameter) without displacing the belt or chain out of its plane. In this example, the toggle is selectively pivoted using a linear actuator and lever arm, although other methods may be utilized. The segment actuators rotate with the segmented gear, while the toggle does not, instead pivoting about an axis that is stationary with respect to the rotating gear.

In the present example, each segment actuator includes a slider configured to translate radially in a guide plate that rotates with the gear cluster, the slider being coupled to the respective gear segment by a slip joint or slotted hinge mechanism. Radial translation of the slider is caused when one or more pegs or protrusions of the slider rotate into contact with the toggle, and a ramped face or edge of the toggle urges the peg (and therefore the slider) in a radial direction. Because the slider is connected to the segment by the slotted hinge, this translation causes the segment to pivot on its pivot axis (see FIGS. 71-74).

As with other shifting systems described herein, the toggle is disposed such that each segment actuator interfaces with (and is repositioned by) the toggle at a rotational position that pivots the segment when the segment is unloaded, i.e., not encumbered by the belt or chain. Furthermore, the toggle in this example need not be repositioned between segment actuations or after all segments have been pivoted into or out of the plane. The toggle simply remains in its existing configuration until further pivoting of the segments is called for. Accordingly, each gear cluster may be operated without a need for position sensors or other methods of ascertaining the rotational position of the gear cluster or of the tilted state of the gear segments.

Shifting system 510 includes one or more actuators 548 coupled to a mounting plate and one or more toggles 550 (also referred to as wedges) manipulated by the actuators to cause shifting of the gear segments. In some examples, the mounting plate is disposed at a central location in gearbox 500, such that one actuator corresponds to each of the four gear clusters (e.g., see FIG. 46 and corresponding mounting plate 449 above). Each actuator 548 may include any suitable actuator configured to shift the associated toggle between two or more positions, as described below. In the present example, actuator 548 includes a linear actuator (e.g., under control of an electronic controller and/or a user) coupled to the toggle by a pivoting lever 561. In some examples, actuator 548 is an electro-mechanical linear actuator. Actuator 548 may include a piezoelectric linear actuator, a screw-type actuator, a cylinder and piston, a step motor, a pneumatic actuator, and/or the like.

Figure 70:
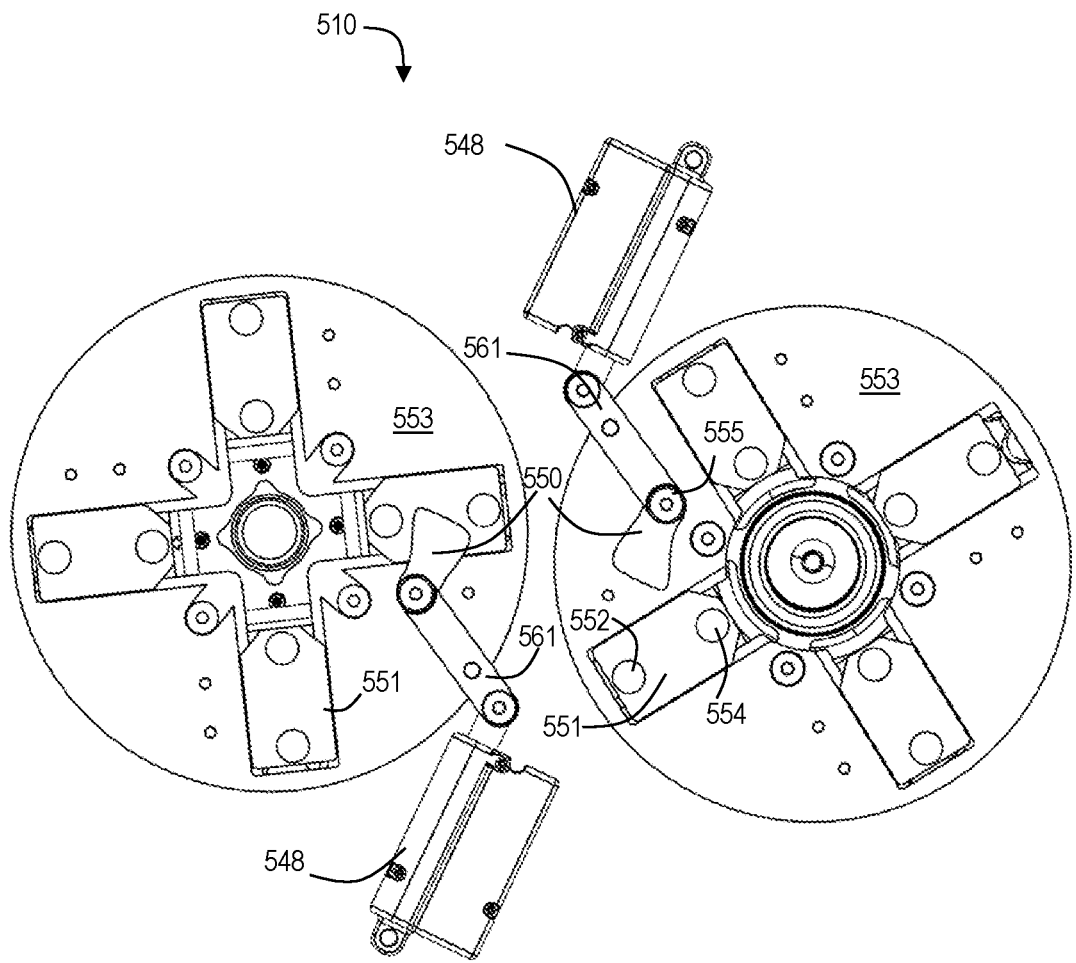
FIG. 70 depicts an illustrative shifting system for use with gearboxes of the present disclosure.

As shown in FIG. 70, actuator 548 is configured to engage and manipulate toggle 550 via lever 561. Toggle 550 and lever 561 pivot or rotate together about a fixed pivot 555, such that extending and retracting actuator 548 causes toggle 550 to transition between two operative positions. In some examples, toggle 550 and lever 561 are unitary and/or formed as a single piece. In some examples, toggle 550 and lever 561 are coupled together, e.g., by way of a third structure. Toggle 550 is configured to selectively mechanically interface with corresponding portions of a plurality of shifting sliders 551 seated within a rotating guiding plate 553, as described further below. Pivot 555 has an axis of rotation generally parallel to the axis of rotation of the guiding plate.

Figure 71:
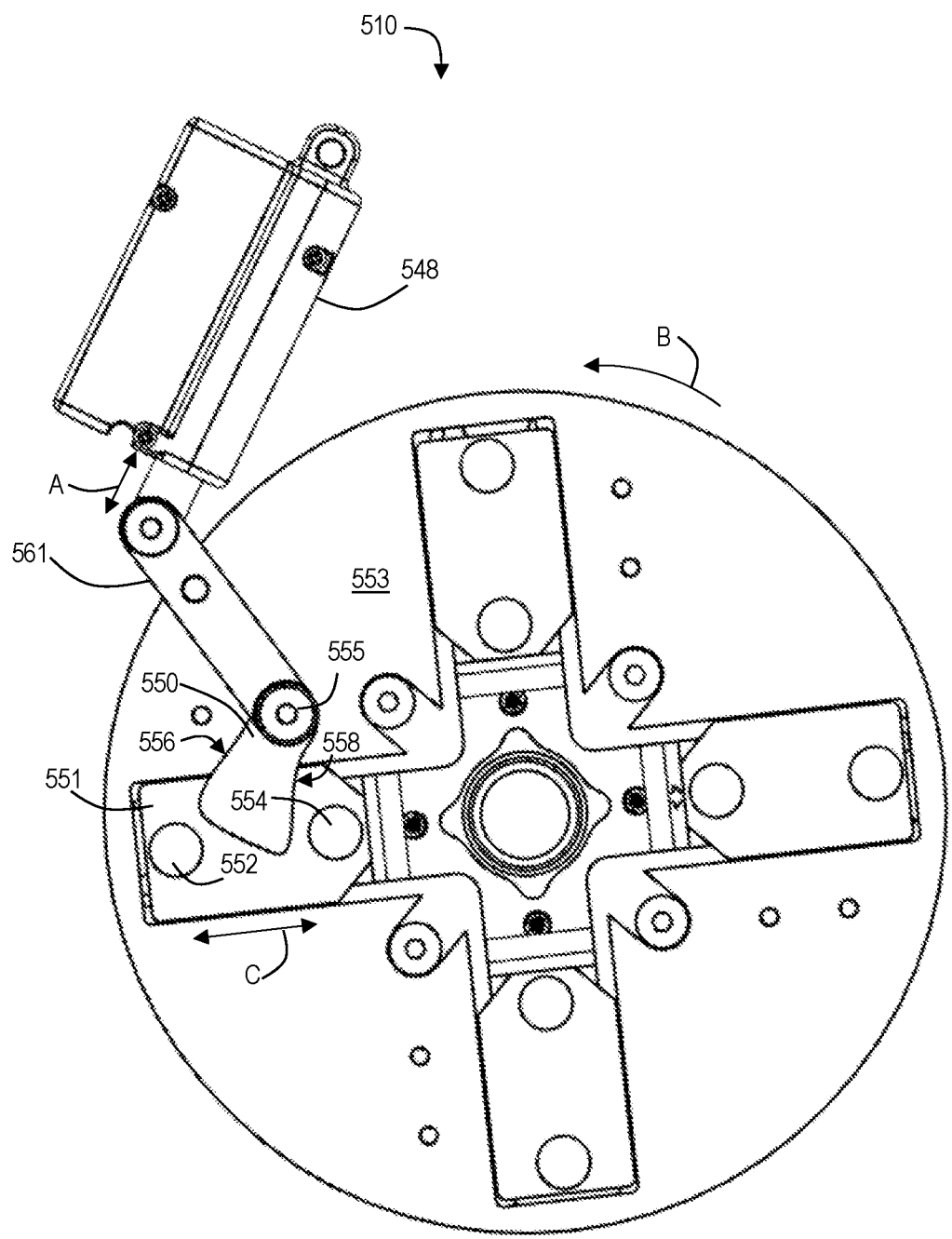
FIG. 71 depicts the shifting system of FIG. 70 for use with a single gear cluster in a first position.
Figure 72:
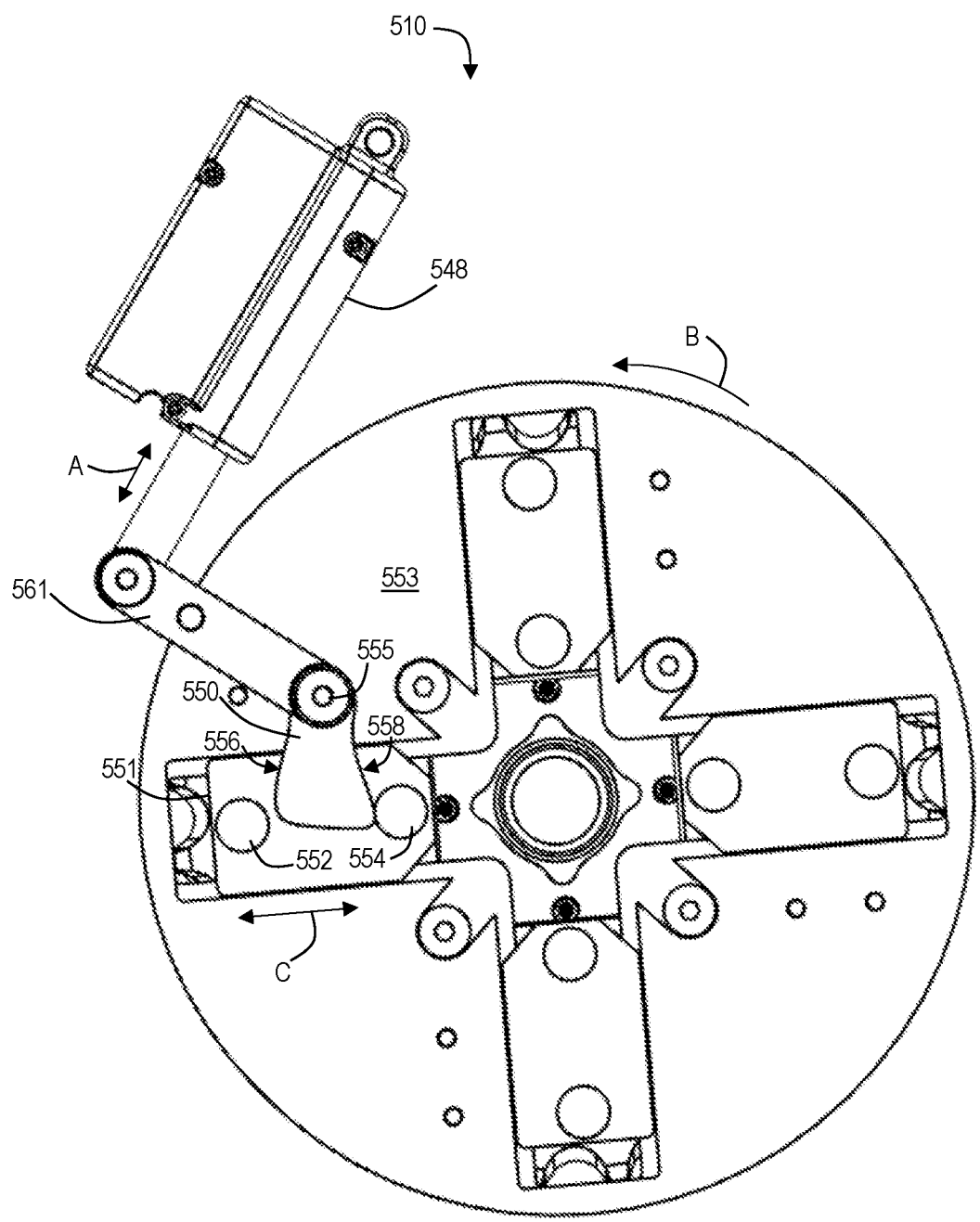
FIG. 72 depicts the shifting system of FIG. 70 for use with a single gear cluster in a second position.

Turning to FIGS. 71 and 72, system 510 is shown in FIG. 71 with toggle 550 in a first configuration or position, and in FIG. 72 with toggle 550 in a second configuration or position. Toggle 550 includes a pair of ramped faces referred to herein as a first ramped face 556 and a second ramped face 558. In the example depicted in FIGS. 71 and 72, toggle 550 has an asymmetrical lobe profile with lateral edges generally configured to have a curvilinear contour, in which opposing edges form the first and second faces. In operation, the extension of linear actuator 548 along the direction indicated by arrow A causes lever 561 and toggle 550 to pivot about fixed pivot 555, thereby causing a change in the position and orientation of toggle 550 (and therefore first and second faces 556, 558).

Fixed pivot 555 may be rotatably fixed to the mounting plate, a housing of the gearbox, or both, such that the pivot remains at a fixed location in the gearbox, even when other components (such as guiding plate 553) are rotated. Toggle 550 may be selectively positioned in this manner into one of two states, herein referred to as a first state and a second state. For reference, toggle 550 is shown in its first state in FIG. 71 and its second state in FIG. 72.

Each shifting slider 551 includes a pair of protrusions, first protrusion 552 and second protrusion 554, manipulated by the toggle to operably translate the shifting slider in the direction indicated by arrow C. First and second protrusions 552, 554 disposed at distally opposite locations on the slider such that the first and second protrusions are brought to opposing sides of toggle 550 as the gear cluster is rotated in the direction indicated by arrow B. First and second protrusions 552, 554 and shifting slider 551 may be unitary and/or formed as a single piece. In some examples, the shifting slider and protrusions comprise a durable plastic (e.g., polyethylene, polyvinyl chloride (PVC), polyethylene terephthalate (PET), etc.), metal/metallic alloy (aluminum, titanium, steel, etc.), and/or another suitably durable material.

Similar to the description in Section D, with respect to FIGS. 52-57, each shifting slider 551 is coupled to a hinge of a respective gear segment of each of the segmented gears (e.g., segmented gears 408A, 414A, 418A, and 422A of gearbox 400). Each shifting slider 551 and respective gear segment have a defined relationship such that linear translation of shifting slider 551 causes a pivot of the gear segment, described in more depth below with respect to FIGS. 73, 74. The shifting slider and the hinge mechanism may be collectively referred to as a segment actuator or an actuator of the gear segment.

This enables the transition of the segmented gear between the coplanar and pivoted configurations via the translation of the shifting sliders. Accordingly, the shifting sliders may be selectively transitioned between a first position, corresponding to the coplanar configuration of the segmented gear, and a second position, corresponding to the pivoted configuration of the segmented gear. For reference, the shifting sliders are shown in the first position in FIG. 71 and the second position in FIG. 72.

A description of shifting system 510 causing the selective transitioning of the segmented gear between its two configurations (coplanar and pivoted) is now provided.

Consider shifting sliders 551 in their second position and toggle 550 in its first state. In this configuration, toggle 550 is oriented such that first face 556 is in the path of first protrusion 552. A rotation of the gear cluster (e.g., by a user) in the direction indicated by arrow B thereby causes first protrusion 552 to strike first face 556 causing shifting slider 551 to translate in a generally outward direction along the path indicated by arrow C. In some examples, protrusion 552 follows the contour of face 556, in the manner of a cam and follower mechanism, thereby guiding slider 551 outwards gently, so as to not cause any unnecessary force on the slider or the toggle.

As the gear cluster continues to rotate, the first protrusion of each subsequent slider 551 strikes first face 556 until all four of the shifting sliders have been translated outwards into their first position, as reflected in FIG. 71. After all the sliders have translated outwards in this manner, the segmented gear has been fully shifted into its coplanar configuration. Additionally, since the sliders have been translated outwards, the toggle is no longer in the path of any of the first protrusions. Accordingly, the gear cluster may rotate freely without any further shifting.

Now consider toggle 550 has been pivoted by actuator 548 into its second state. In this configuration, toggle 550 is oriented such that second face 558 is in the path of second protrusion 554. A rotation of the gear cluster in the direction indicated by arrow B thereby causes second protrusion 554 to strike second face 558 causing shifting slider 551 to translate in a generally inward direction along the path indicated by arrow C. In some examples, protrusion 554 follows the contour of face 558, in the manner of a cam and follower mechanism.

As the gear cluster continues to rotate, the second protrusion of each subsequent slider 551 strikes second face 558 until all four of the shifting sliders have been translated inwards into their second position, as reflected in FIG. 72. After all the sliders have translated inwards in this manner, the segmented gear has been fully shifted into its pivoted configuration. Additionally, since the sliders have been translated inwards, the toggle is no longer in the path of any of the second protrusions. Accordingly, the gear cluster may rotate freely without any further shifting.

Figure 73:
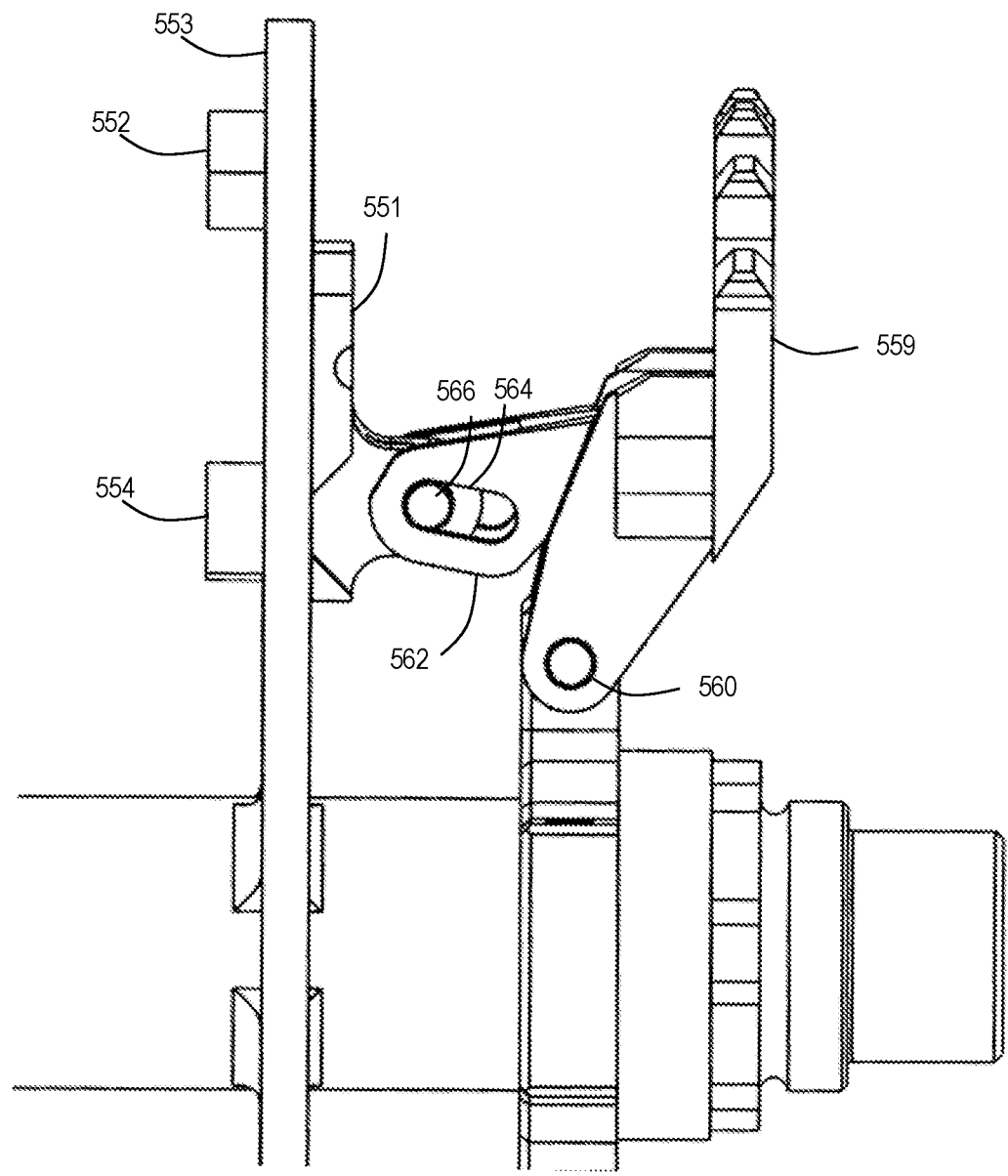
FIG. 73 is another view of the shifting system of FIG. 70 in the first position, corresponding to FIG. 71.
Figure 74:
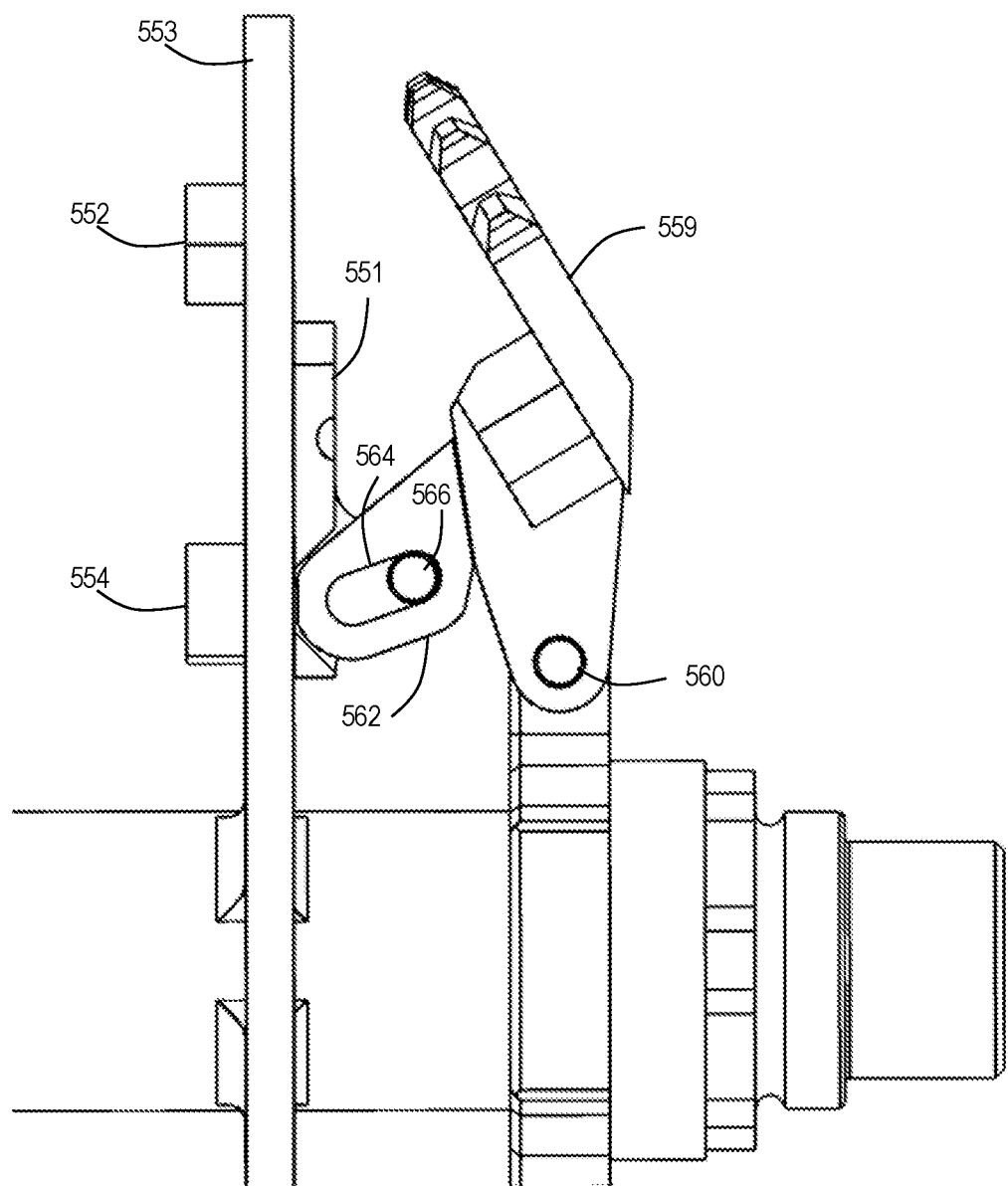
FIG. 74 is another view of the shifting system of FIG. 70 in the second position, corresponding to FIG. 72.

Turning to FIGS. 73 and 74, the relationship between the linear motion of slider 551 and the pivoting of the corresponding gear segment is now described further. For reference, shifting slider 551 is shown in the first position in FIG. 73 (corresponding to FIG. 71 and the coplanar position of the segmented gear) and shown in the second position in FIG. 74 (corresponding to FIG. 72 and the pivoted position of the segmented gear).

FIGS. 73 and 74 are side views depicting the operational engagement between shifting slider 551 and a single segment 559 of a segmented gear in the coplanar and pivoted positions, respectively. In the example of FIGS. 73 and 74, the depicted gear segment is analogous to the segmented gear of third gear cluster 418 (i.e., segmented gear 418A), although the underlying principle is the same for each of the segmented gears described herein.

Gear segment 559 is pivotally attached via a hinge knuckle to the layshaft at pivot 560, defining an axis of rotation. Pivot 560 corresponds to hinge pin 457 described above with respect to FIGS. 56 and 57. The gear segment is configured to rotate about this axis of rotation between the coplanar and pivoted positions. Furthermore, the gear segment includes an extension 562 having a slot or elongated aperture 564 formed therein. Shifting slider 551 is coupled to the gear segment via an actuating structure disposed on an opposite side of the guiding plate 553 from toggle 550 and first and second protrusions 552 and 554, by way of a pin 566 seated slidingly within aperture 564.

As shown in FIG. 74, when shifting slider 551 is translated radially inward from the first position to the second position, pin 566 slides within aperture 564 and urges the gear segment is from the coplanar position, rotating about the axis of rotation of pivot 560 into the pivoted position. Conversely, as shown in FIG. 73, when shifting slider 551 is translated radially outward from the second position to the first position, pin 566 again slides within aperture 564 and urges the gear segment from the pivoted position into the coplanar position.

As described above, this transitioning of the gear segment is performed at a time when the segment is unloaded (i.e., free of the chain/belt), such that shifting may be performed under load without negative consequences. Multiple segmented sprockets of the gearbox may be simultaneously shifted in this manner, if desired.

A method describing steps for shifting a segmented gear (e.g., describing the operation of system 510) is laid out below. Aspects of the gearboxes and shifting systems described above may be utilized in the method steps described below. Although various method steps are described below, the steps need not necessarily all be performed, and in some cases may be performed simultaneously or in a different order than the order described.

A first step includes rotating a gear cluster comprising a first gear and a coaxial second gear using a power transfer mechanism (e.g., a belt or a chain), wherein the power transfer mechanism defines a plane and is wrapped partially around the first gear, and wherein the first gear has a plurality of gear segments independently movable (e.g., pivotable or translatable) into and out of the plane. In some examples, the second gear is unsegmented. In some examples, the second gear is segmented and each segment of the second gear has a fixed relationship with each corresponding segment of the first gear, such that pivoting one segment of the first gear automatically pivots the corresponding segment of the second gear.

In some examples, the second gear is concentric with the first gear and/or nested within the first gear. In some examples, the teeth of the second gear are coplanar with teeth of the first gear.

A second step includes rotating a plurality of radially transitionable sliders in tandem with the first gear, each of the sliders having one or more protrusions and coupled to a corresponding one of the gear segments of the first gear. In some examples, each of the sliders is coupled to the corresponding one of the segments by a slotted hinge. In some examples, the slotted hinge is on an opposite side of the slider with respect to the one or more protrusions. In some examples, the sliders are disposed in a common guide plate disposed adjacent the first gear.

A third step includes pivoting a toggle into a first position such that a first ramped face of the toggle is in a path of the one or more protrusions of the sliders.

A fourth step includes sequentially moving each segment of the first gear out of the plane of the power transfer mechanism by urging the slider radially when the one or more protrusions strike the first ramped face of the toggle, such that the power transfer mechanism wraps at least partially around the second gear. In some examples, sequentially moving each segment includes pivoting each segment (e.g., on a pivot axis) transversely (for example, orthogonally) with respect to the plane of the power transfer mechanism. Sequentially moving each segment may be performed at a position where each segment is unloaded, i.e., substantially free of the power transfer mechanism.

To shift the gear cluster again, a fifth step includes pivoting a toggle into a second position such that a second ramped face of the toggle is in a path of the one or more protrusions of the sliders.

A sixth step includes sequentially moving each segment of the first gear into the plane of the power transfer mechanism by urging the slider radially within the guide plate when the one or more protrusions strike the second ramped face of the toggle, such that the power transfer mechanism wraps at least partially around the first gear.

F. Illustrative Chain Tensioner

This section describes an illustrative chain tensioner 600. Chain tensioner 600 is configured to be utilized in any of the gearboxes described above, for example as a direct replacement for chain tensioner 432 or 434. In general, chain tensioner 600 may be utilized with a roller-chain, bar-link chain, and/or other drive chains. Alternatively, chain tensioner 600 may be utilized with a belt drive or other suitable power transmission mechanisms.

Figure 75:
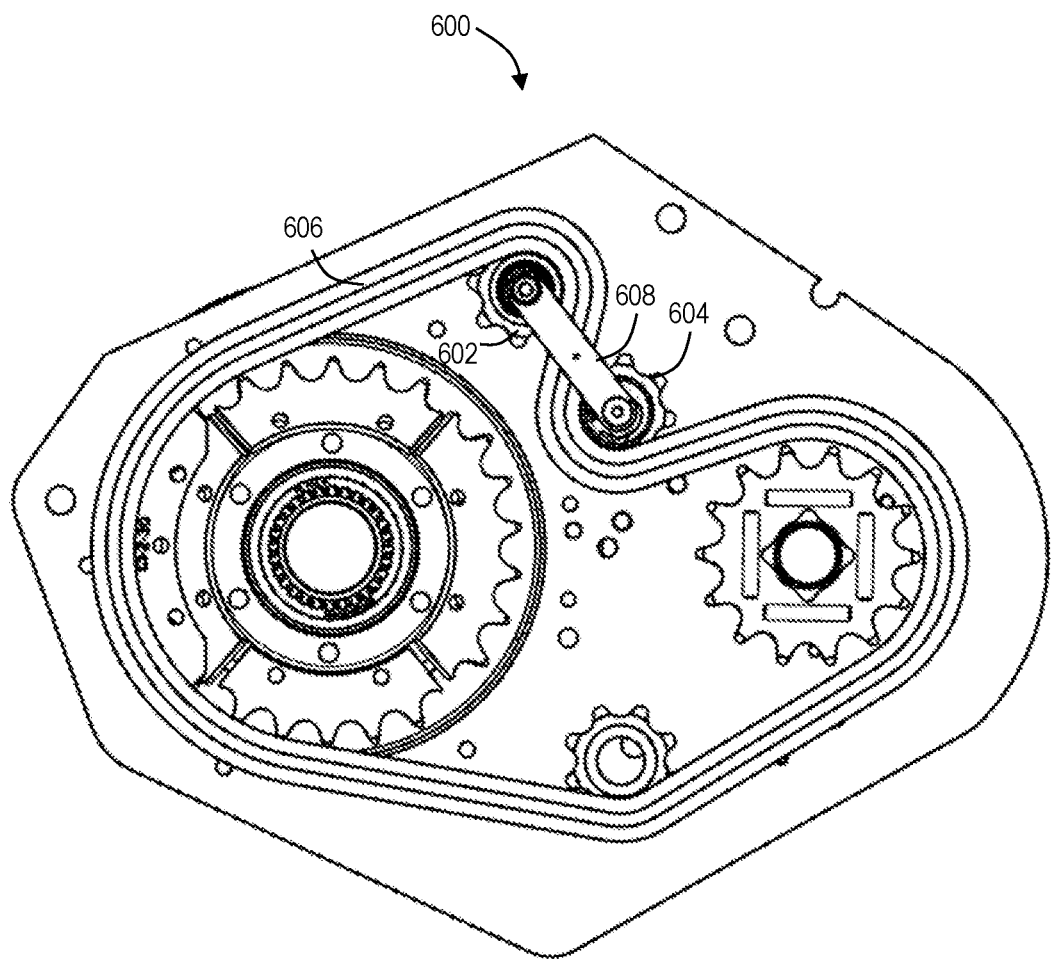
FIG. 75 is a profile view of an illustrative chain tensioner for use with gearboxes of the present disclosure.

As shown in FIG. 75, chain tensioner 600 includes first gear 602 and second gear 604 disposed on opposing sides of chain 606 and positively engaged to one another via retention bar 608. Retention bar is disposed at a fixed location in the gearbox and mounted to a rigid portion of the gearbox (e.g., mounting plate 449 of gearbox 400). In some examples, retention bar 608 had an adjustable length, such that the distance between first and second gears 602, 604 may be adjusted, thereby causing a change in the tension of the chain. In some examples, the angle/orientation of retention bar 608 may be adjustable to selectively change the tension of chain 608. In some examples, retention bar 608 may include a biasing mechanism (not shown) such as a torsion spring, leaf spring, etc., to increase the tension on chain 606. In some examples, the location of tension bar may be adjustable (for example, through the adjustment of one or more set screws), such that the chain tensioner may be fine-tuned to the plane of the chain.

G. Illustrative Combinations and Additional Examples

This section describes additional aspects and features of the gearbox systems described herein, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A gearbox for a vehicle, the gearbox comprising:
   a drive spindle;
   a first gear cluster coaxially fastened to the spindle such that the first gear cluster rotates with the spindle, wherein an inboard gear of the first gear cluster includes a plurality of pivotable inboard segments, each of which has a respective pin protruding transversely from an inboard face;
   a second gear cluster having one or more gears coaxially fastened to a layshaft spaced from and parallel to the spindle, such that the layshaft rotates with the second gear cluster;
   a continuous first belt or chain coupling the first gear cluster to the second gear cluster, such that the first gear cluster drives the second gear cluster and the first belt or chain defines a first plane, wherein the segments of the inboard gear of the first gear cluster are each pivotable into and out of the first plane;
   a third gear cluster having one or more gears coaxially fastened to the layshaft and spaced from the second gear cluster, such that the third gear cluster rotates with the layshaft;
   a fourth gear cluster having one or more gears coupled to a sleeve coaxially mounted over the spindle such that the sleeve rotates independently of the spindle;
   a continuous second belt or chain coupling the third gear cluster to the second gear cluster, such that the third gear cluster drives the fourth gear cluster and the second belt or chain defines a second plane parallel to the first plane;
   a chainring fastened to the sleeve, such that the chainring rotates with the fourth gear cluster; and
   a shifting system including a first shifting wedge transitionable between:
      (a) a first configuration, in which a first ramped face of the wedge is in line with the pin of each segment of the inboard gear of the first gear cluster when the segment is out of the first plane, such that rotating the pin into the first ramped face is configured to urge the segment into the first plane, and
      (b) a second configuration, in which a second ramped face of the wedge is in line with the pin of each segment of the inboard gear of the first gear cluster when the segment is in the first plane such that rotating the pins into the second ramped face is configured to urge the segment out of the first plane.

A1. The gearbox of A0, wherein the first gear cluster, second gear cluster, first belt or chain, third gear cluster, fourth gear cluster, and second belt or chain are enclosed in a housing.

A2. The gearbox of A0 or A1, wherein an outboard gear of the first gear cluster is nested within the inboard gear, such that the outboard gear is in line with the first plane.

A3. The gearbox of A2, wherein the outboard gear is a non-segmented gear.

A4. The gearbox of A0 or A1, wherein an outboard gear of the first gear cluster includes a plurality of pivotable outboard segments arranged in pairs with the inboard segments, each pair of outboard and inboard segments being mounted to a common hinge, such that pivoting the inboard segment of the pair out of the first plane automatically pivots the outboard segment of the pair into the first plane.

A5. The gearbox of any one of paragraphs A0 through A4, wherein the drive spindle is coupled to a crankset configured to rotate the spindle.

A6. The gearbox of any one of paragraphs A0 through A5, wherein the drive spindle is coupled to an electric motor configured to rotate the spindle.

A7. The gearbox of any one of paragraphs A0 through A6, wherein an inboard gear of the second gear cluster includes a plurality of pivotable segments, each of which has a respective pin protruding transversely from an inboard face.

A8. The gearbox of A7, the shifting system further comprising a second shifting wedge configured to pivot the segments of the inboard gear of the second gear cluster.

A9. The gearbox of any one of paragraphs A0 through A8, wherein a respective inboard gear of each of the third and fourth gear clusters includes a plurality of pivotable segments, each of which has a respective pin protruding transversely from an inboard face.

B0. A gearbox for a vehicle, the gearbox comprising:
a drive spindle;
a first gear cluster coaxially fastened to the spindle such that the first gear cluster rotates with the spindle, the first gear cluster including an outboard gear and an inboard gear, wherein the inboard gear is physically divided into a plurality of segments;
a second gear cluster having one or more gears coaxially fastened to a layshaft spaced from and parallel to the spindle, such that the layshaft rotates with the second gear cluster;
a continuous first belt or chain coupling the first gear cluster to the second gear cluster, such that the first gear cluster drives the second gear cluster and the first belt or chain defines a first plane, wherein the segments of the inboard gear of the first gear cluster are each movable into and out of the first plane;
a third gear cluster having one or more gears coaxially fastened to the layshaft and spaced from the second gear cluster, such that the third gear cluster rotates with the layshaft;
a fourth gear cluster having one or more gears coupled to a sleeve coaxially mounted over the spindle such that the sleeve rotates independently of the spindle;
a continuous second belt or chain coupling the third gear cluster to the second gear cluster, such that the third gear cluster drives the fourth gear cluster;
a chainring fastened to the sleeve, such that the chainring rotates with the fourth gear cluster; and
a shifting system including an actuator configured to urge the segments of the inboard gear of the first gear cluster into and out of the first plane, such that a gear ratio of the gearbox is changeable without displacing the first belt or chain out of the first plane.

B1. The gearbox of B0, wherein the segments of the inboard gear of the first gear cluster are configured to translate into and out of the first plane along the spindle.

B2. The gearbox of B0, wherein the segments of the inboard gear of the first gear cluster are configured to pivot into and out of the first plane.

B3. The gearbox of B2, wherein the outboard gear of the first gear cluster includes a plurality of pivotable outboard segments arranged in pairs with the inboard segments, each pair of outboard and inboard segments being mounted to a common hinge, such that pivoting the inboard segment of the pair out of the first plane automatically pivots the outboard segment of the pair into the first plane.

B4. The gearbox of B2, wherein each of the segments of the inboard gear has a respective pin protruding transversely from an inboard face; and
the actuator of the shifting system includes a shifting wedge transitionable between:

(a) a first configuration, in which a first ramped face of the wedge is in line with the pin of each segment of the inboard gear of the first gear cluster when the segment is out of the first plane, such that rotating the pin into the first ramped face is configured to urge the segment into the first plane, and (b) a second configuration, in which a second ramped face of the wedge is in line with the pin of each segment of the inboard gear of the first gear cluster when the segment is in the first plane such that rotating the pins into the second ramped face is configured to urge the segment out of the first plane.

B5. The gearbox of B2, wherein a respective inboard gear of each of the second, third, and/or fourth gear clusters includes a plurality of pivotable segments.

B6. The gearbox of B5, the actuator of the shifting system further comprising a second shifting wedge configured to pivot the segments of the inboard gear of the second gear cluster.

B7. The gearbox of any one of paragraphs B0 through B6, wherein the first gear cluster, second gear cluster, first belt or chain, third gear cluster, fourth gear cluster, and second belt or chain are enclosed in a housing.

B8. The gearbox of any one of paragraphs B0 through B2, wherein an outboard gear of the first gear cluster is nestable with the inboard gear.

B9. The gearbox of B8, wherein the outboard gear is a non-segmented gear.

C0. A gearbox for a vehicle, the gearbox comprising:
a drive spindle;
a layshaft spaced from and parallel to the spindle;
a first gear cluster coaxially fastened to one of the spindle or the layshaft and rotatable therewith, the first gear cluster including an outboard gear and an inboard gear, wherein the inboard gear is physically divided into a plurality of segments;
a second gear cluster coaxially fastened to the other of the spindle or the layshaft and rotatable therewith, the second gear cluster having one or more gears;
a continuous belt or chain coupling the first gear cluster to the second gear cluster, such that the belt or chain defines a plane, wherein the segments of the inboard gear of the first gear cluster are each movable into and out of the first plane;
a chainring coupled to the layshaft, such that the chainring rotates with the layshaft; and
a shifting system including an actuator configured to urge the segments of the inboard gear of the first gear cluster into and out of the plane of the belt or chain, such that a gear ratio of the gearbox is changeable without displacing the belt or chain out of the plane.

C1. The gearbox of C0, wherein the segments of the inboard gear of the first gear cluster are configured to translate axially into and out of the plane of the belt or chain.

C2. The gearbox of C0, wherein the segments of the inboard gear of the first gear cluster are configured to pivot into and out of the plane of the belt or chain.

C3. The gearbox of C2, wherein the outboard gear of the first gear cluster includes a plurality of pivotable outboard segments arranged in pairs with the inboard segments, each pair of outboard and inboard segments being mounted to a common hinge, such that pivoting the inboard segment of the pair out of the plane automatically pivots the outboard segment of the pair into the plane.

C4. The gearbox of C2, wherein each of the segments of the inboard gear has a respective pin protruding transversely from an inboard face; and wherein the actuator of the shifting system includes a shifting wedge transitionable between:
- (a) a first configuration, in which a first ramped face of the wedge is in line with the pin of each segment of the inboard gear of the first gear cluster when the segment is out of the plane, such that rotating the pin into the first ramped face is configured to urge the segment into the plane, and
- (b) a second configuration, in which a second ramped face of the wedge is in line with the pin of each segment of the inboard gear of the first gear cluster when the segment is in the plane such that rotating the pins into the second ramped face is configured to urge the segment out of the plane.

C5. The gearbox of C2, wherein a respective inboard gear of the second gear cluster includes a plurality of pivotable segments.

C6. The gearbox of C5, the actuator of the shifting system further comprising a second shifting wedge configured to pivot the segments of the inboard gear of the second gear cluster.

C7. The gearbox of any one of paragraphs C0 through C6, wherein the first gear cluster, second gear cluster, and belt or chain are enclosed in a housing.

C8. The gearbox of any one of paragraphs C0 through C2, wherein an outboard gear of the first gear cluster is nestable with the inboard gear.

C9. The gearbox of C8, wherein the outboard gear is a non-segmented gear.

D0. A vehicle drivetrain comprising:
a rotatable gear coupled to a continuous chain or belt defining a plane, the gear divided into a plurality of pivotable segments, such that an outer edge of each of the pivotable segments is transitionable into and out of the plane;
a plurality of segment actuators, each of the segment actuators rotatable with and coupled to a respective one of the pivotable segments;
a linear actuator coupled to a toggle, wherein the linear actuator is configured to transition the toggle between:
- (a) a first position, in which a first ramped face of the toggle is disposed in a path of the segment actuator of each segment when the segment is out of the plane of the chain or belt, such that rotating the segment actuator into the first ramped face urges the segment into the plane, and
- (b) a second position, in which a second ramped face of the toggle is disposed in the path of the segment actuator when the segment is in the plane of the chain or belt, such that rotating the segment actuator into the second ramped face urges the segment out of the plane.

D1. The drivetrain of D0, wherein the linear actuator does not rotate with respect to the rotatable gear.

D2. The drivetrain of paragraph D0 or D1, each of the segment actuators comprising a slider coupled to the respective segment by a hinge, each slider having two spaced-apart protrusions, wherein the toggle is configured to selectively interact with the protrusions to translate the slider and pivot the segment.

D3. The drivetrain of D2, wherein the slider is disposed in a guiding plate configured to rotate with the rotatable gear.

D4. The drivetrain of D2 or D3, wherein each hinge includes a pin transversely movable within a slot.

D5. The drivetrain of any one of paragraphs D0 through D4, wherein the toggle is coupled to the linear actuator by a lever arm, such that linear motion of the linear actuator is translated into pivoting motion of the toggle.

D6. The drivetrain of any one of paragraphs D0 through D5, wherein the linear actuator is controlled by an electronic controller.

E0. A method for shifting a segmented gear, the method comprising:
rotating a gear cluster comprising a first gear and a coaxial second gear using a power transfer mechanism (e.g., a belt or a chain), wherein the power transfer mechanism defines a plane and is wrapped partially around the first gear, and wherein the first gear has a plurality of gear segments independently movable (e.g., pivotable or translatable) into and out of the plane;
rotating a plurality of radially transitionable sliders in tandem with the first gear, each of the sliders having one or more protrusions and coupled to a corresponding one of the gear segments of the first gear;
pivoting a toggle into a first position such that a first ramped face of the toggle is in a path of the one or more protrusions of the sliders;
sequentially moving each segment of the first gear out of the plane of the power transfer mechanism by urging the slider radially when the one or more protrusions strike the first ramped face of the toggle, such that the power transfer mechanism wraps at least partially around the second gear.

E1. The method of E0, wherein each of the sliders is coupled to the corresponding one of the segments by a slotted hinge.

E2. The method of E1, wherein the slotted hinge is on an opposite side of the slider with respect to the one or more protrusions.

E3. The method of any one of paragraphs E0 through E2, wherein sequentially moving each segment comprises pivoting each segment (e.g. on a pivot axis) transversely (for example, orthogonally) with respect to the plane of the power transfer mechanism.

E4. The method of any one of paragraphs E0 through E3, wherein the second gear is unsegmented.

E5. The method of any one of paragraphs E0 through E3, wherein the second gear is segmented and each segment of the second gear has a fixed relationship with each corresponding segment of the first gear, such that pivoting one segment of the first gear automatically pivots the corresponding segment of the second gear.

E6. The method of any one of paragraphs E0 through E5, wherein sequentially moving each segment is performed at a position where each segment is unloaded, i.e. substantially free of the power transfer mechanism.

E7. The method of any one of paragraphs E0 through E6, wherein the second gear is concentric with the first gear.

E8. The method of any one of paragraphs E0 through E7, wherein the second gear is nested within the first gear.

E9. The method of any one of paragraphs E0 through E8, wherein teeth of the second gear are coplanar with teeth of the first gear.

E10. The method of any one of paragraphs E0 through E9, further comprising:
pivoting a toggle into a second position such that a second ramped face of the toggle is in a path of the one or more protrusions of the sliders;
sequentially moving each segment of the first gear into the plane of the power transfer mechanism by urging the slider radially within the guide plate when the one or more protrusions strike the second ramped face of the toggle, such that the power transfer mechanism wraps at least partially around the first gear.

E11. The method of any one of paragraphs E0 through E10, wherein the sliders are disposed in a common guide plate disposed adjacent the first gear.

Advantages, Features, and Benefits

The different embodiments and examples of the gearbox systems described herein provide several advantages over known solutions for shifting gear ratios of a bicycle. For example, illustrative embodiments and examples described herein allow a lower weight and greater flexibility in gearing choices relative to known systems.

Additionally, and among other benefits, illustrative embodiments and examples described herein allow for at least as many gear ratios as in known systems (e.g., 12 speeds) in a smaller package.

Additionally, and among other benefits, illustrative embodiments and examples described herein allow for a gear box that is simpler than known systems and/or easier to work on.

Additionally, and among other benefits, illustrative embodiments and examples described herein are able to function without the need for any sensors relating to rotational position of the gear and/or pivoting position of the gear segment(s). For example, shifting system 510 is configured to function properly independent of any information regarding rotational and/or pivoting positions of the segmented gear.

Additionally, and among other benefits, illustrative embodiments and examples described herein allow for selectively installing gear clusters having different numbers of gears in a gear box. Accordingly, gear clusters having more gears or fewer gears may be installed as desired. For example, gear clusters having fewer gears could be used when a lighter weight is desired, and gear clusters having more gears could be used when a greater number of gear ratios is desired.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A vehicle drivetrain comprising:
 a rotatable gear coupled to a continuous chain or belt defining a plane, the gear divided into a plurality of pivotable segments, such that an outer edge of each of the pivotable segments is transitionable into and out of the plane;
 a plurality of segment actuators, each of the segment actuators rotatable with and coupled to a respective one of the pivotable segments;
 a linear actuator coupled to a toggle, wherein the linear actuator is configured to transition the toggle between:
  (a) a first position, in which a first ramped face of the toggle is disposed in a path of the segment actuator of each segment when the segment is out of the plane of the chain or belt, such that rotating the segment actuator into the first ramped face urges the segment into the plane, and
  (b) a second position, in which a second ramped face of the toggle is disposed in the path of the segment actuator when the segment is in the plane of the chain or belt, such that rotating the segment actuator into the second ramped face urges the segment out of the plane.

2. The drivetrain of claim 1, wherein the linear actuator does not rotate with respect to the rotatable gear.

3. The drivetrain of claim 1, each of the segment actuators comprising a slider coupled to the respective segment by a hinge, each slider having two spaced-apart protrusions, wherein the toggle is configured to selectively interact with the protrusions to translate the slider and pivot the segment.

4. The drivetrain of claim 3, wherein the slider is disposed in a guiding plate configured to rotate with the rotatable gear.

5. The drivetrain of claim 3, wherein each hinge includes a pin transversely movable within a slot.

6. The drivetrain of claim 1, wherein the toggle is coupled to the linear actuator by a lever arm, such that linear motion of the linear actuator is translated into pivoting motion of the toggle.

7. The drivetrain of claim 1, wherein the linear actuator is controlled by an electronic controller.

8. A gearbox for a vehicle, the gearbox comprising:
 a drive spindle;
 a first gear cluster coaxially fastened to the spindle such that the first gear cluster rotates with the spindle, wherein an inboard gear of the first gear cluster includes a plurality of pivotable inboard segments, each of which is coupled to a respective actuator;
 a second gear cluster having one or more gears coaxially fastened to a layshaft spaced from and parallel to the spindle, such that the layshaft rotates with the second gear cluster;
 a continuous first belt or chain coupling the first gear cluster to the second gear cluster, such that the first gear cluster drives the second gear cluster and the first belt or chain defines a first plane, wherein the segments of the inboard gear of the first gear cluster are each pivotable into and out of the first plane;
 a third gear cluster having one or more gears coaxially fastened to the layshaft and spaced from the second gear cluster, such that the third gear cluster rotates with the layshaft;
 a fourth gear cluster having one or more gears coupled to a sleeve coaxially mounted over the spindle such that the sleeve rotates independently of the spindle;
 a continuous second belt or chain coupling the third gear cluster to the second gear cluster, such that the third gear cluster drives the fourth gear cluster and the second belt or chain defines a second plane parallel to the first plane;

a chainring fastened to the sleeve, such that the chainring rotates with the fourth gear cluster; and a shifting system including a first shifting toggle transitionable between:
  (a) a first position, in which a first ramped face of the toggle is disposed in a path of the actuator of each segment of the inboard gear of the first gear cluster when the segment is out of the first plane, such that rotating the actuator into the first ramped face is configured to urge the segment into the first plane, and
  (b) a second position, in which a second ramped face of the toggle is disposed in the path of the actuator of each segment of the inboard gear of the first gear cluster when the segment is in the first plane such that rotating the actuator into the second ramped face is configured to urge the segment out of the first plane.

9. The gearbox of claim 8, the actuator of each segment comprising a slider coupled to the segment and having two spaced-apart protrusions, wherein the toggle is configured to selectively interact with the protrusions to translate the slider and urge the segment into and out of the first plane.

10. The gearbox of claim 8, wherein the toggle is coupled to a linear actuator, such that the linear actuator is configured to transition the toggle between the first position and the second position.

11. The gearbox of claim 10, wherein the toggle is coupled to the linear actuator by a lever arm, such that linear motion of the linear actuator is translated into pivoting motion of the toggle.

12. The gearbox of claim 10, further comprising an electronic controller configured to control the linear actuator.

13. The gearbox of claim 8, wherein the first gear cluster, the second gear cluster, and the first belt or chain are enclosed in a housing.

14. A gearbox for a vehicle, the gearbox comprising:
  a drive spindle;
  a first gear cluster coaxially fastened to the spindle such that the first gear cluster rotates with the spindle, the first gear cluster including an outboard gear and an inboard gear, wherein the inboard gear is physically divided into a plurality of segments;
  a second gear cluster having one or more gears coaxially fastened to a layshaft spaced from and parallel to the spindle, such that the layshaft rotates with the second gear cluster;
  a continuous first belt or chain coupling the first gear cluster to the second gear cluster, such that the first gear cluster drives the second gear cluster and the first belt or chain defines a first plane, wherein the segments of the inboard gear of the first gear cluster are each movable into and out of the first plane;
  a third gear cluster having one or more gears coaxially fastened to the layshaft and spaced from the second gear cluster, such that the third gear cluster rotates with the layshaft;
  a fourth gear cluster having one or more gears coupled to a sleeve coaxially mounted over the spindle such that the sleeve rotates independently of the spindle;
  a continuous second belt or chain coupling the third gear cluster to the second gear cluster, such that the third gear cluster drives the fourth gear cluster;
  a chainring fastened to the sleeve, such that the chainring rotates with the fourth gear cluster; and
  a shifting system including a pivoting toggle configured to interact with a segment actuator of each of the segments of the inboard gear of the first gear cluster, selectively transitioning each of the segments of the inboard gear of the first gear cluster into and out of the first plane, such that a gear ratio of the gearbox is changeable without displacing the first belt or chain out of the first plane.

15. The gearbox of claim 14, wherein each of the segment actuators includes a slider coupled to the segment and having two spaced-apart protrusions, wherein the toggle is configured to selectively interact with the protrusions to translate the slider and urge the segment into and out of the first plane.

16. The gearbox of claim 14, wherein the toggle is coupled to a linear actuator, such that the linear actuator is configured to transition the toggle between a first position and a second position.

17. The gearbox of claim 16, wherein the toggle is coupled to the linear actuator by a lever arm, such that linear motion of the linear actuator is translated into pivoting motion of the toggle.

18. The gearbox of claim 16, further comprising an electronic controller configured to control the linear actuator.

19. The gearbox of claim 14, wherein each of the segment actuators includes a slider coupled to the segment and having two spaced-apart protrusions;
  wherein the toggle is coupled to a linear actuator, such that the linear actuator is configured to transition the toggle between:
    a first position, in which the toggle is configured to selectively interact with the protrusions to translate the slider and urge the segment into the first plane, and
    a second position, in which the toggle is configured to selectively interact with the protrusions to translate the slider and urge the segment out of the first plane.

20. The gearbox of claim 19, wherein the toggle is coupled to the linear actuator by a lever arm, such that linear motion of the linear actuator is translated into pivoting motion of the toggle.

* * * * *